United States Patent
Murakami et al.

(10) Patent No.: US 6,188,504 B1
(45) Date of Patent: Feb. 13, 2001

(54) OPTICAL SCANNER

(75) Inventors: Kenji Murakami, Tachikawa; Hiroshi Miyajima, Hachioji, both of (JP)

(73) Assignee: Olympus Optical Co., Ltd., Tokyo (JP)

( * ) Notice: Under 35 U.S.C. 154(b), the term of this patent shall be extended for 0 days.

(21) Appl. No.: 09/213,062

(22) Filed: Dec. 16, 1998

Related U.S. Application Data

(63) Continuation-in-part of application No. 08/840,596, filed on Apr. 22, 1997.

(30) Foreign Application Priority Data

| Jun. 28, 1996 | (JP) | 8-169832 |
| Sep. 11, 1996 | (JP) | 8-240558 |
| Oct. 22, 1996 | (JP) | 8-279340 |
| Dec. 26, 1997 | (JP) | 9-358901 |
| Sep. 16, 1998 | (JP) | 10-261270 |

(51) Int. Cl.[7] .................... G02B 26/08
(52) U.S. Cl. .............. 359/224; 359/198; 359/199; 359/223
(58) Field of Search ............... 359/223, 224, 359/198, 199, 846, 848; 310/36

(56) References Cited

U.S. PATENT DOCUMENTS

| 5,606,447 | * | 2/1997 | Asada et al. | 359/224 |
| 5,629,790 | * | 5/1997 | Neukermans et al. | 359/224 |
| 5,907,425 | * | 5/1999 | Dickensheets et al. | 359/224 |

FOREIGN PATENT DOCUMENTS

| 63-82165 | 4/1988 | (JP) . |
| 5-100175 | 4/1993 | (JP) . |
| 6-46207 | 2/1994 | (JP) . |

OTHER PUBLICATIONS

I. Kawakubo et al; "Packaged Silicon Micro Optical Deflector Using Electromagnetic Force"; 1995; pp. 17–20; Technical Digest of the 13th Sensor Symposium.

* cited by examiner

Primary Examiner—James Phan
(74) Attorney, Agent, or Firm—Frishauf, Holtz, Goodman, Langer & Chick, P.C.

(57) ABSTRACT

An optical scanner comprises a support member for fixation on a given member, a movable plate provided with a reflection surface for reflecting light, an elastic member coupling the movable plate and the support member, the elastic member comprising a plurality of laminated organic elastic insulating layers, an actuator, provided at least on the movable plate, for producing a driving force between the movable plate and the support member, and an electric element for applying a predetermined electric signal to the actuator and thus producing the driving force, thereby elastically deforming the elastic member and deflecting the movable plate. The electric element is provided between the organic elastic insulating layers of the elastic member.

20 Claims, 44 Drawing Sheets

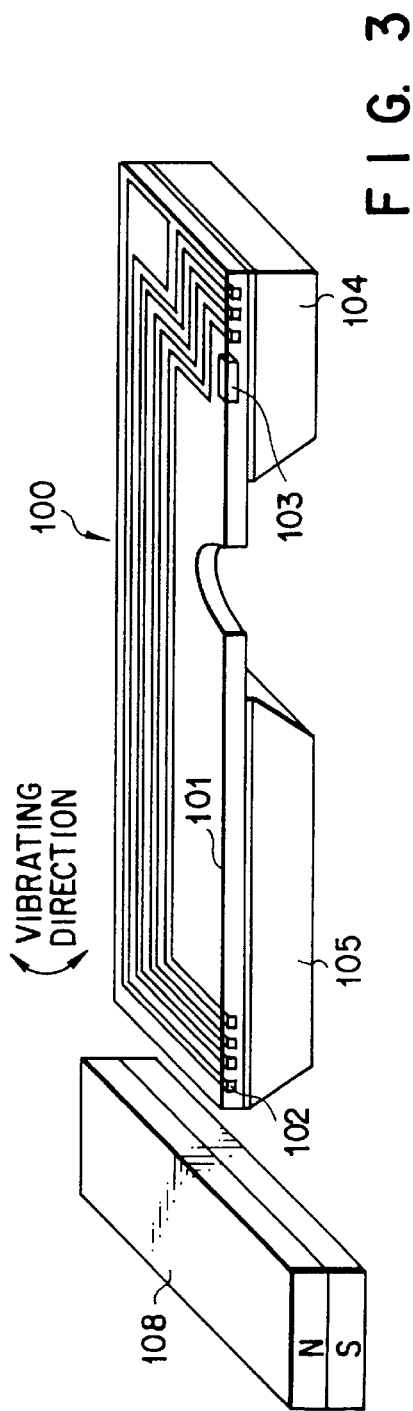
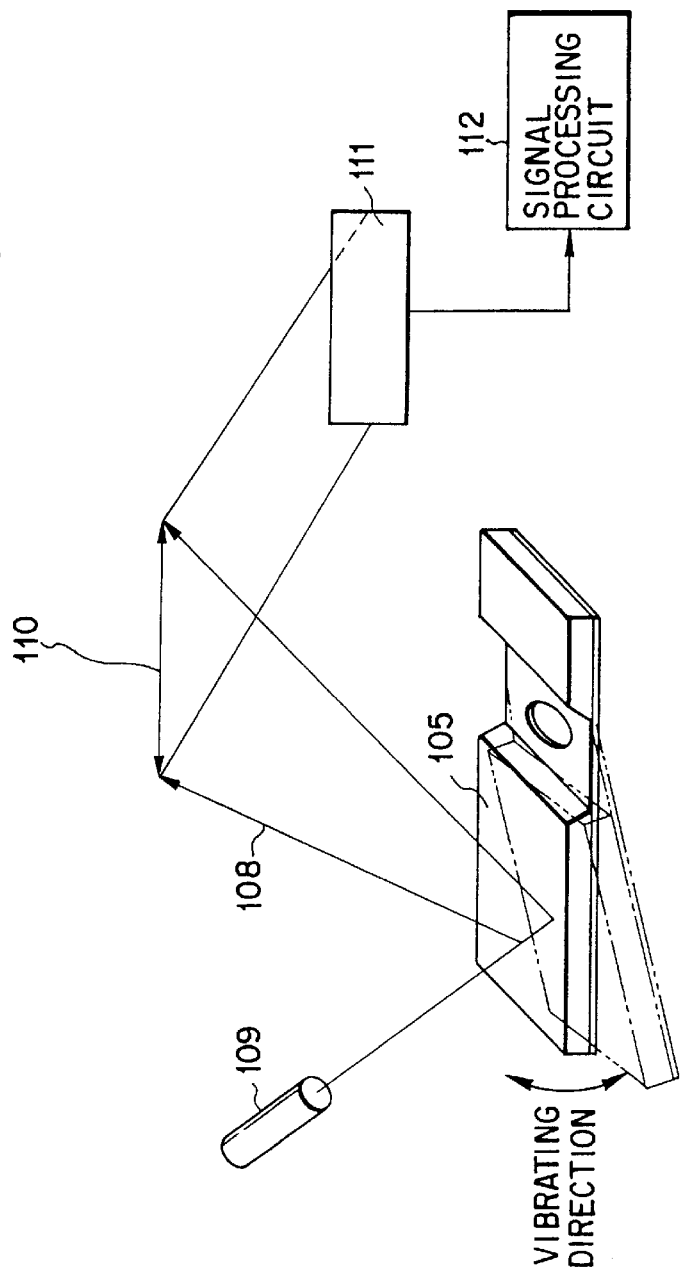

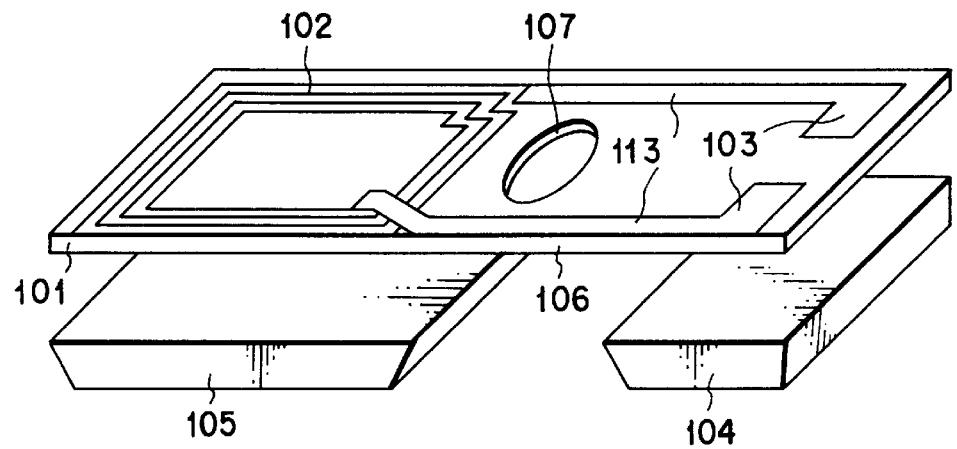
F I G. 5
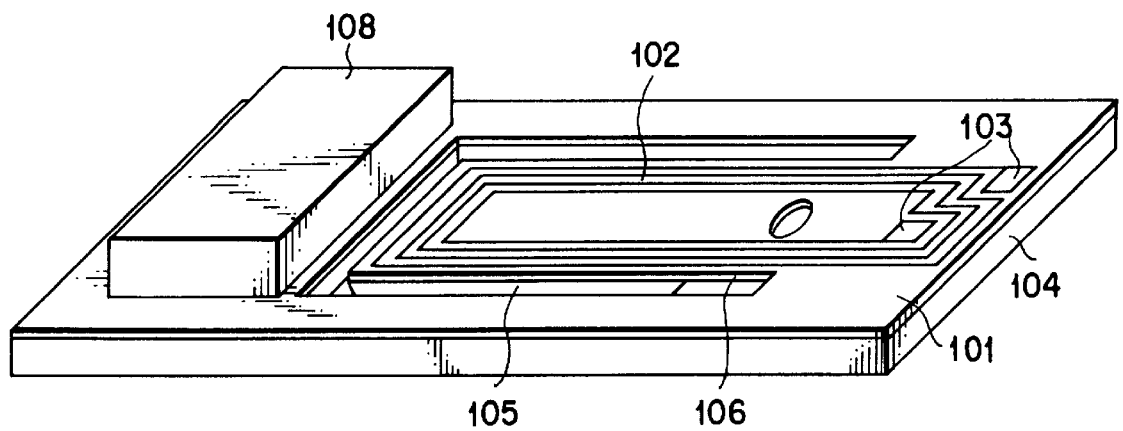
F I G. 6

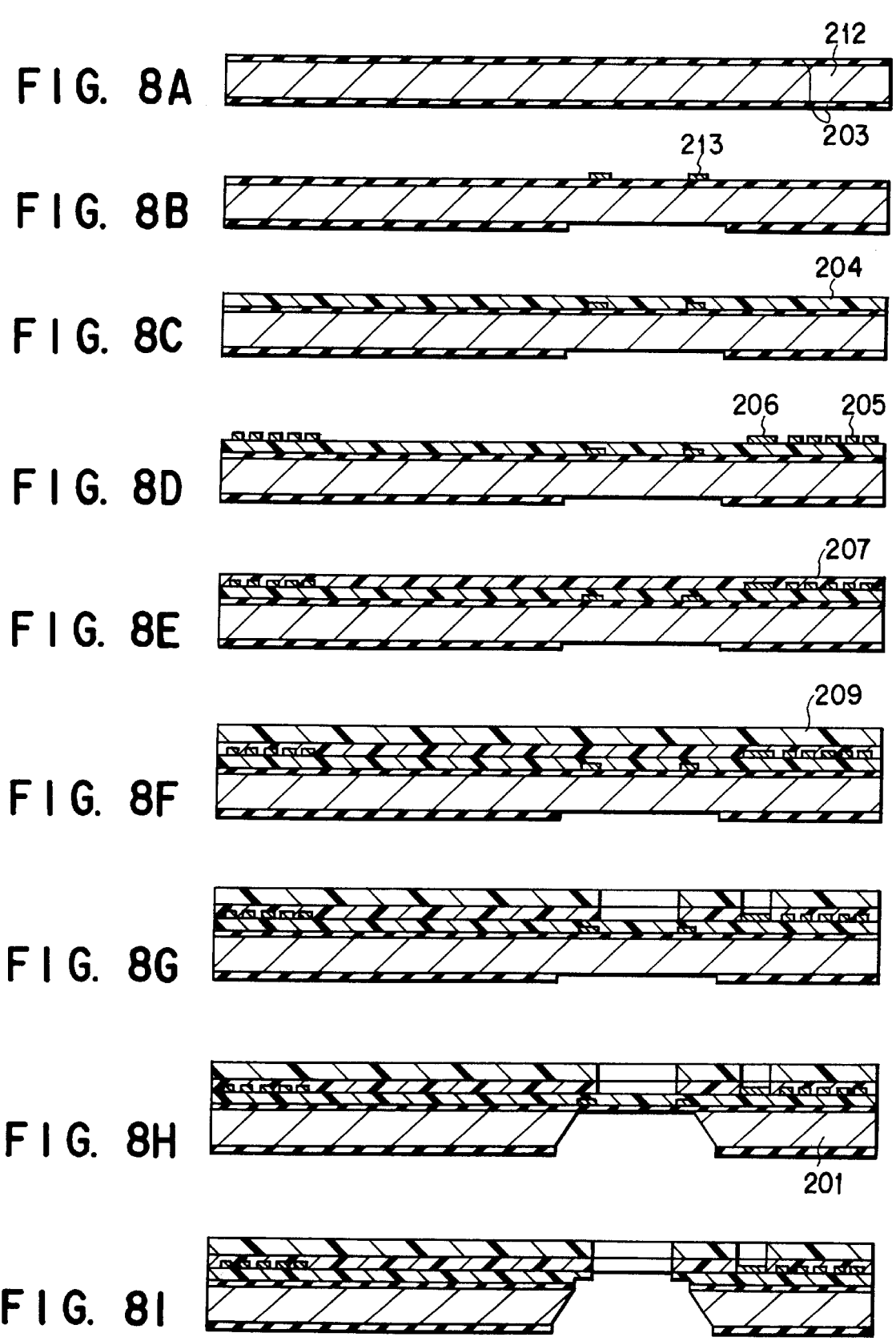

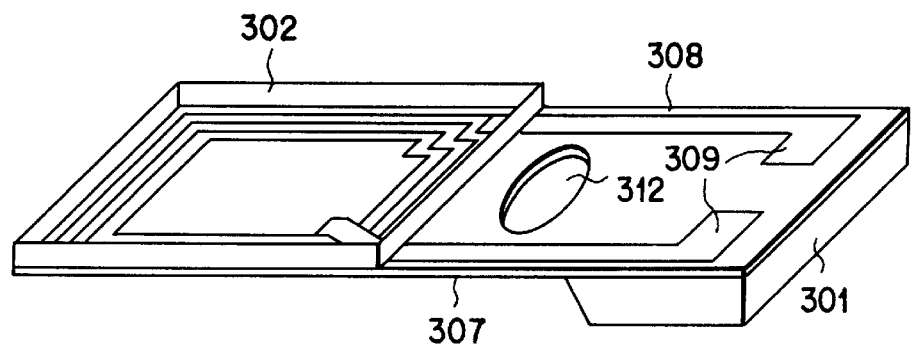
F I G. 13
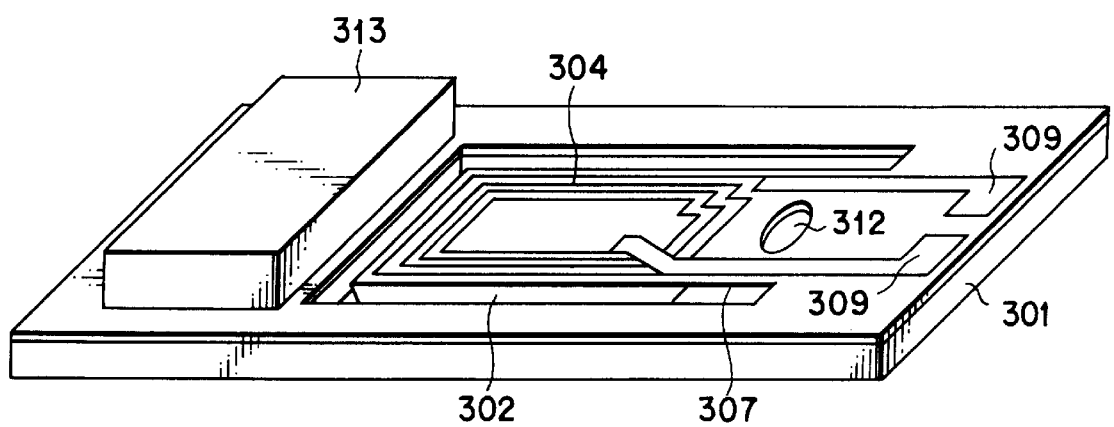
F I G. 14

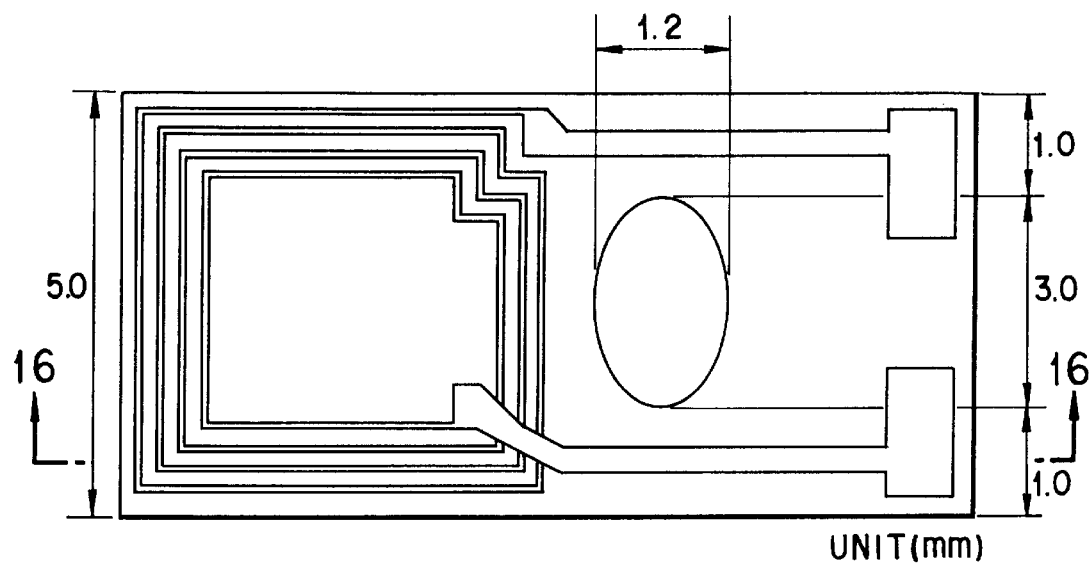
F I G. 15
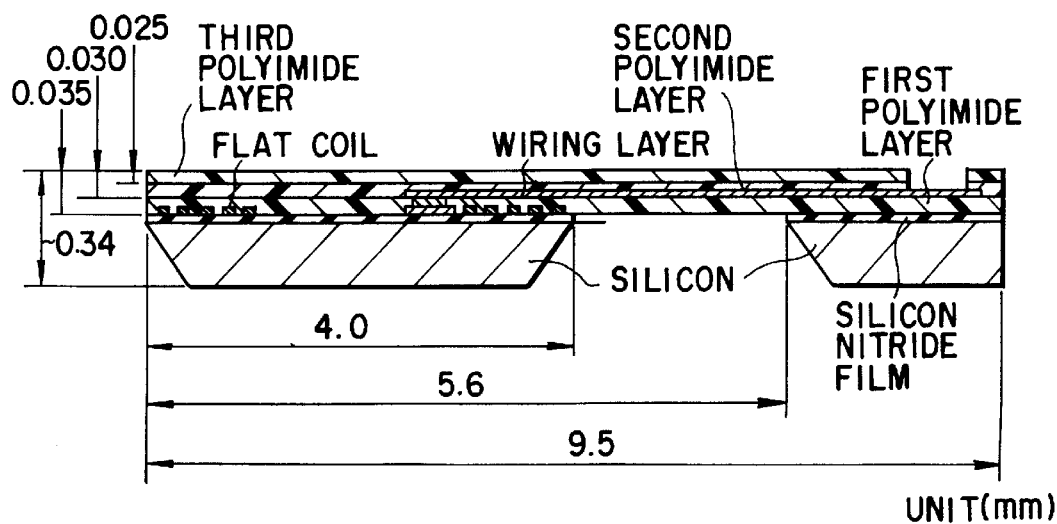
F I G. 16

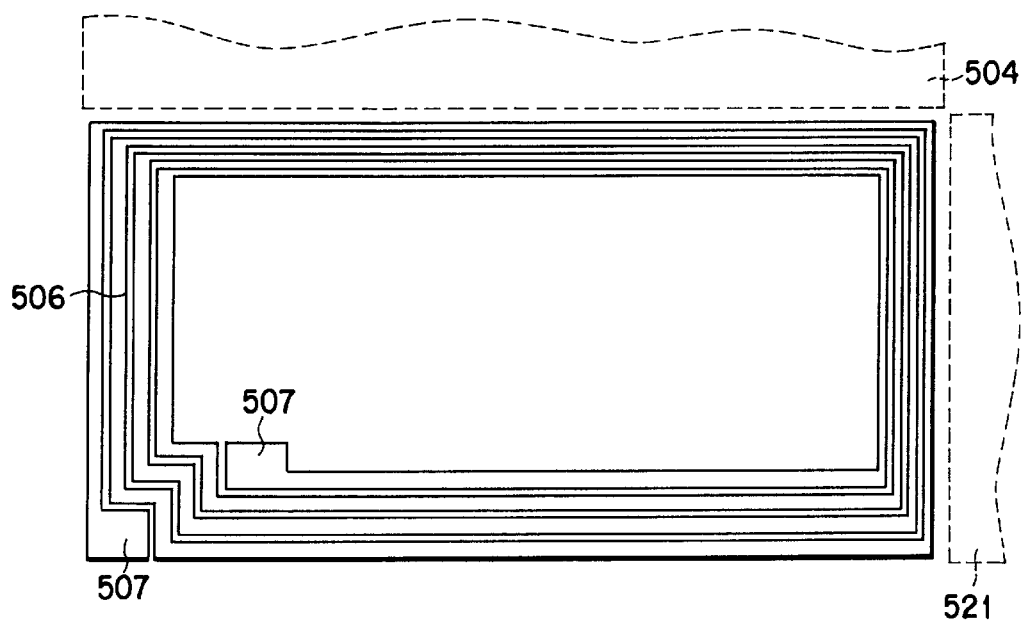
F I G. 30A
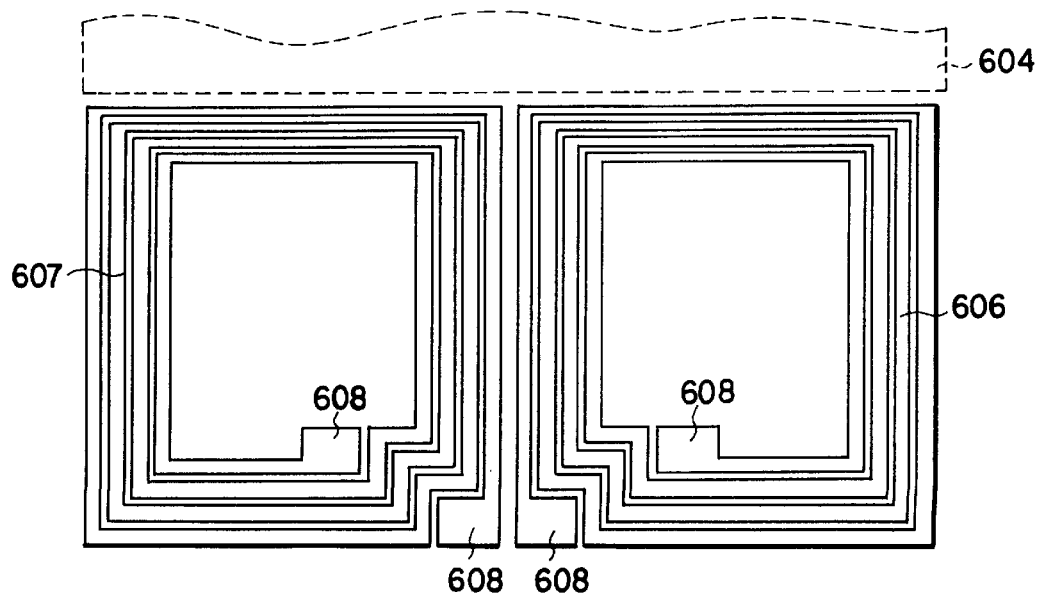
F I G. 30B

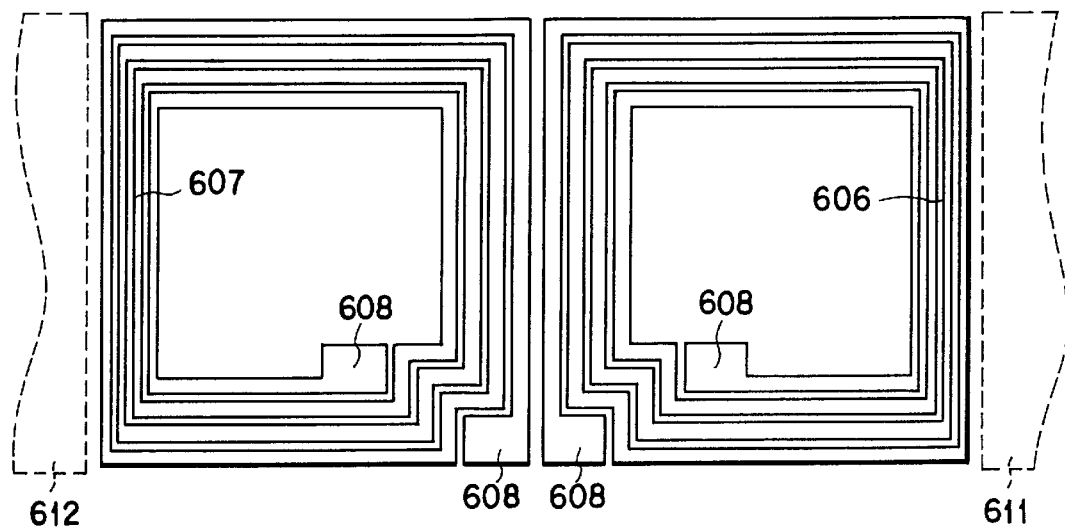
F I G. 32A
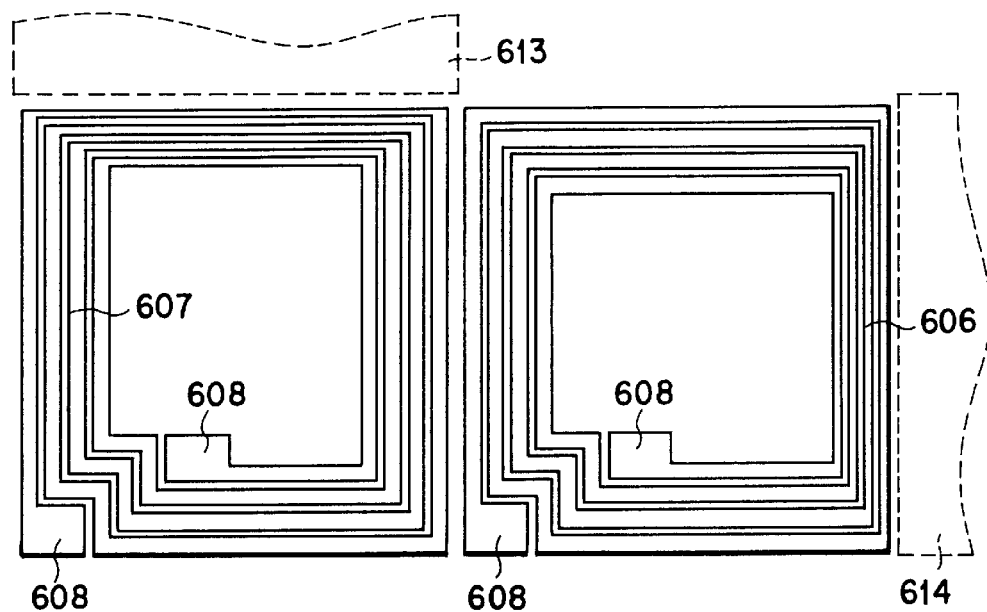
F I G. 32B

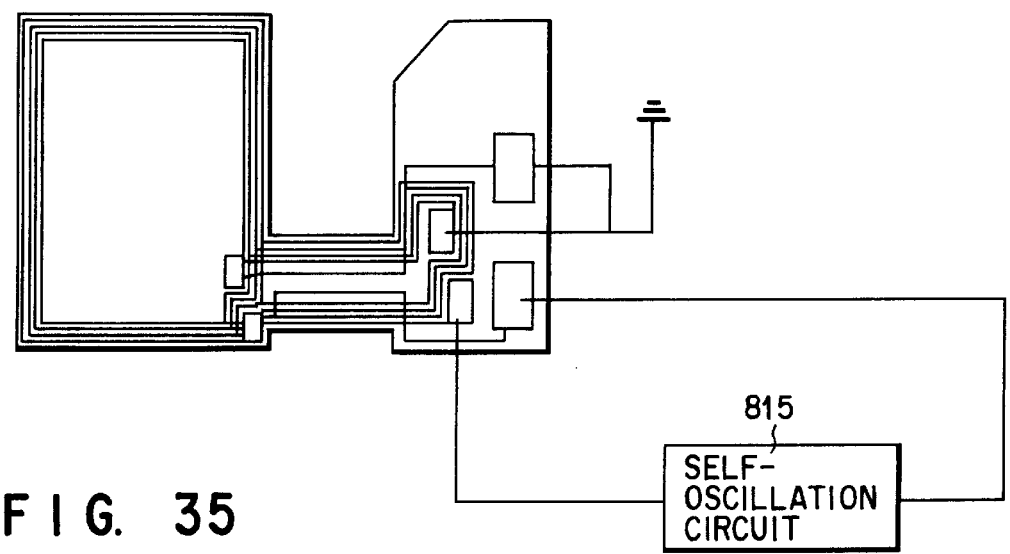
F I G. 35
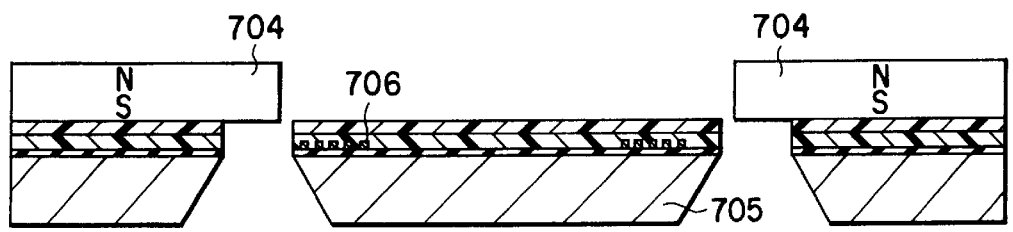
F I G. 38
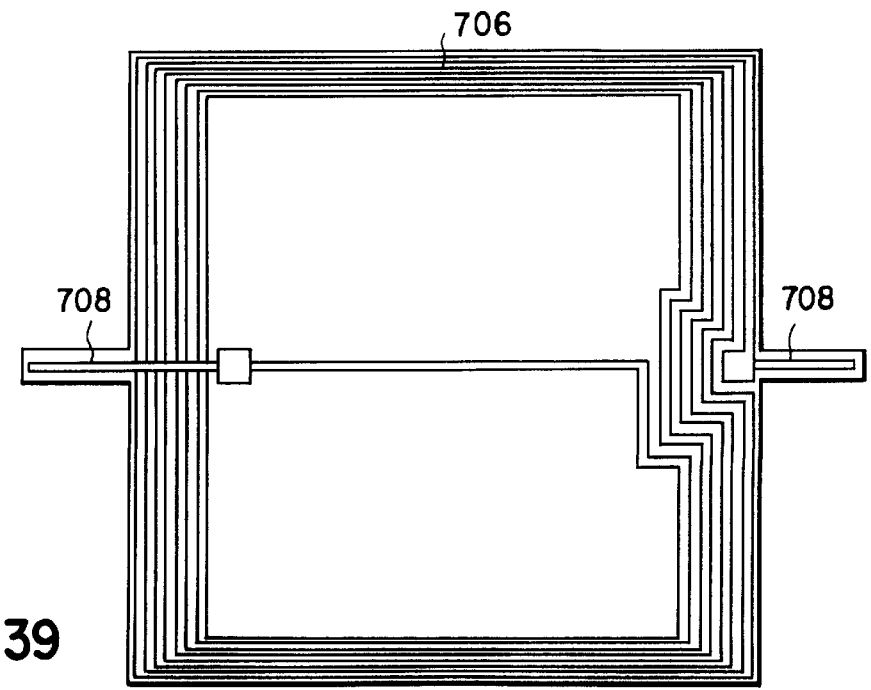
F I G. 39

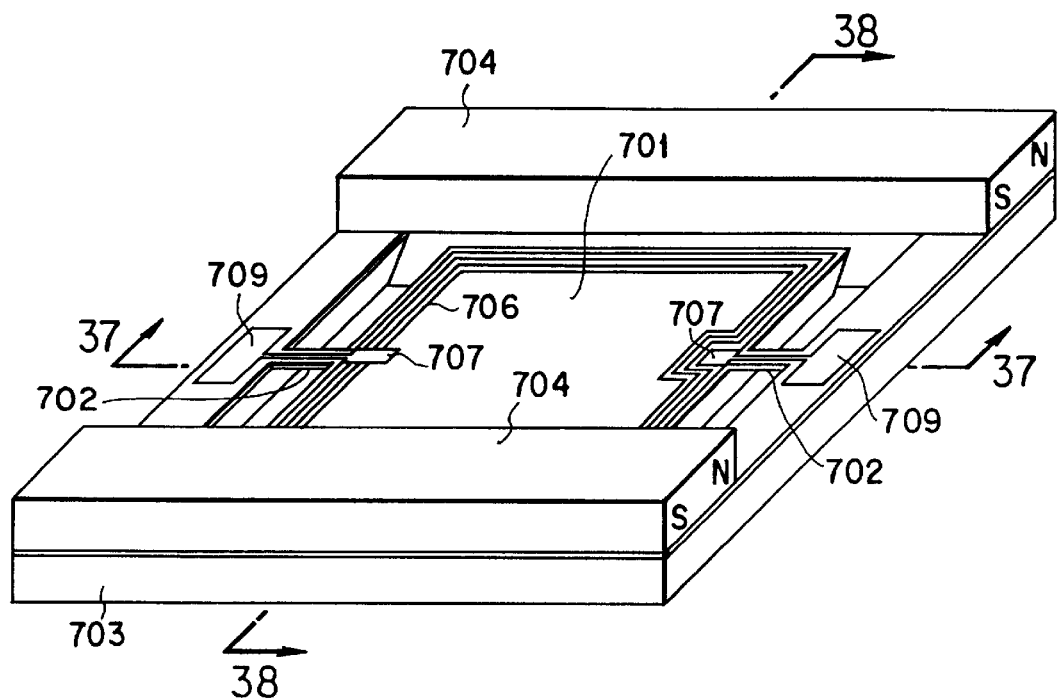
F I G. 36
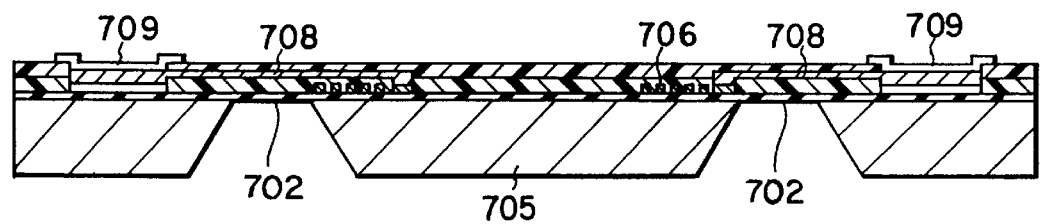
F I G. 37

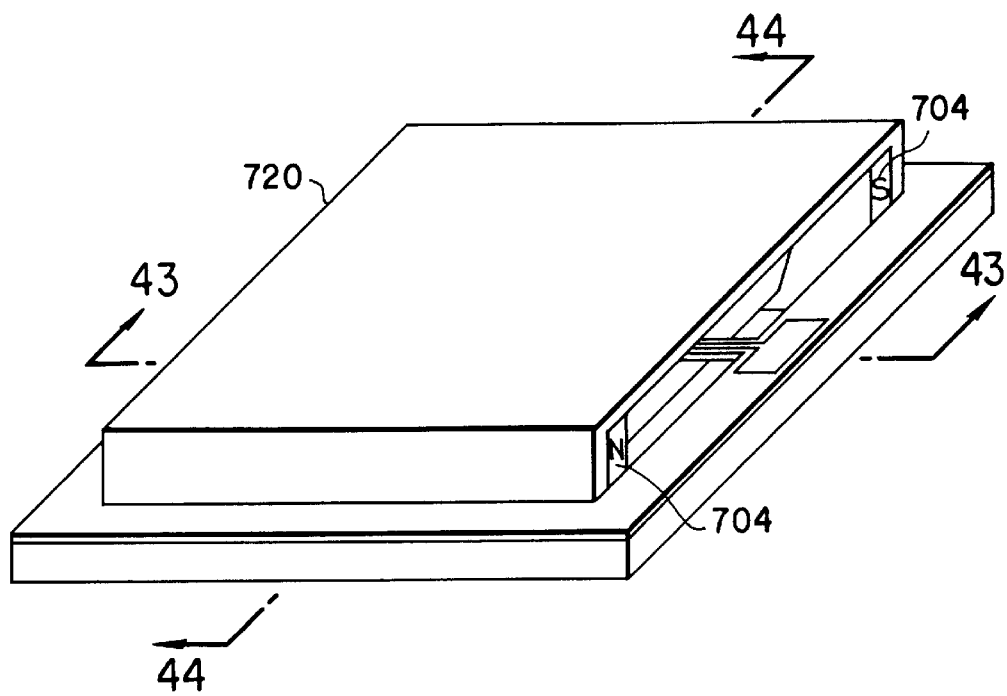
F I G. 42
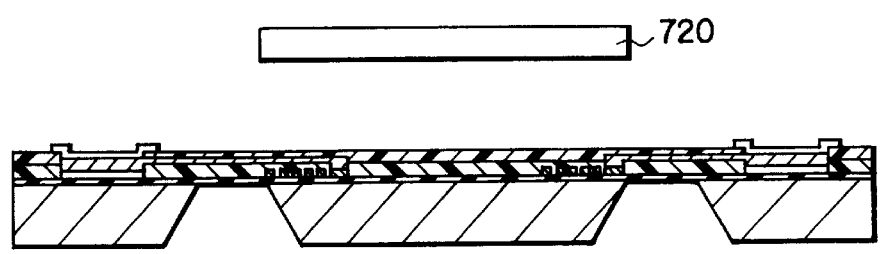
F I G. 43

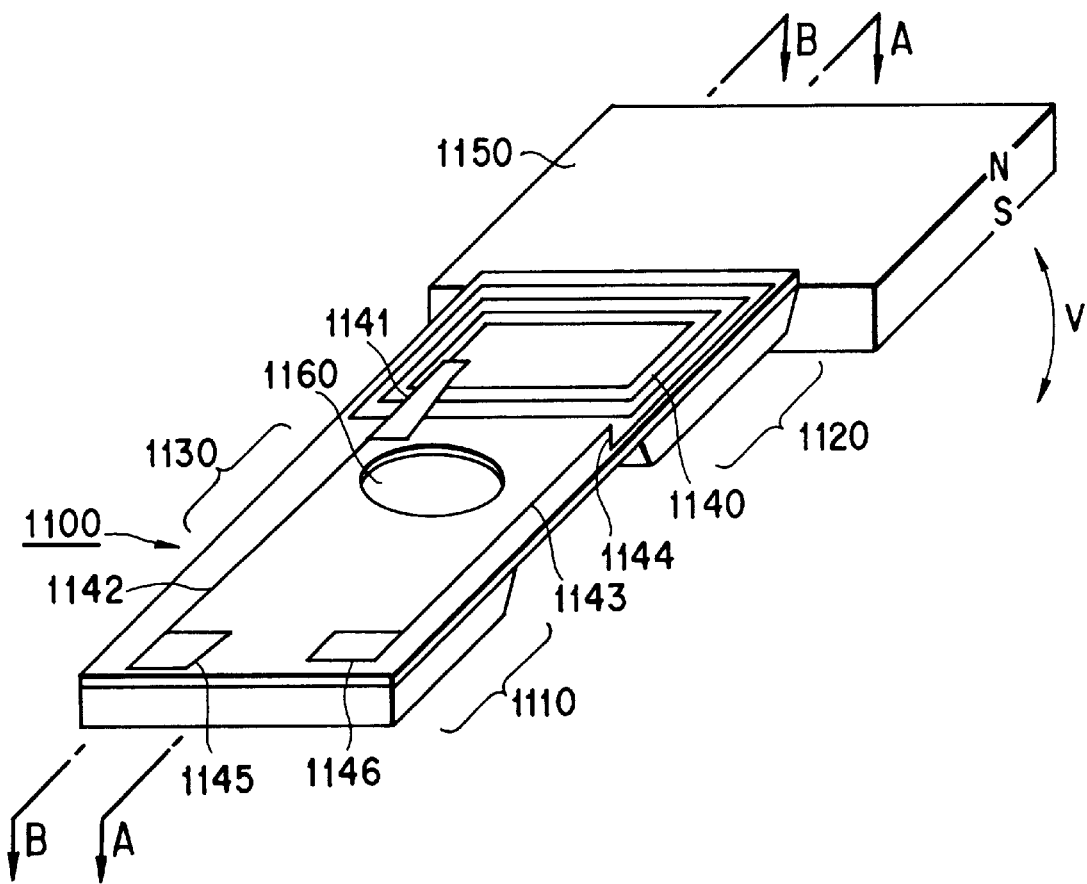
F I G. 49

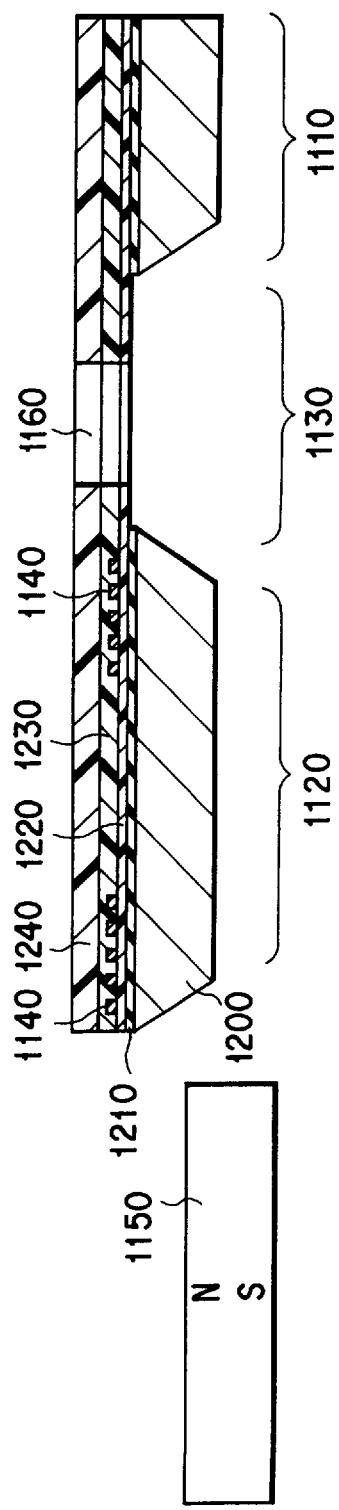
F I G. 50
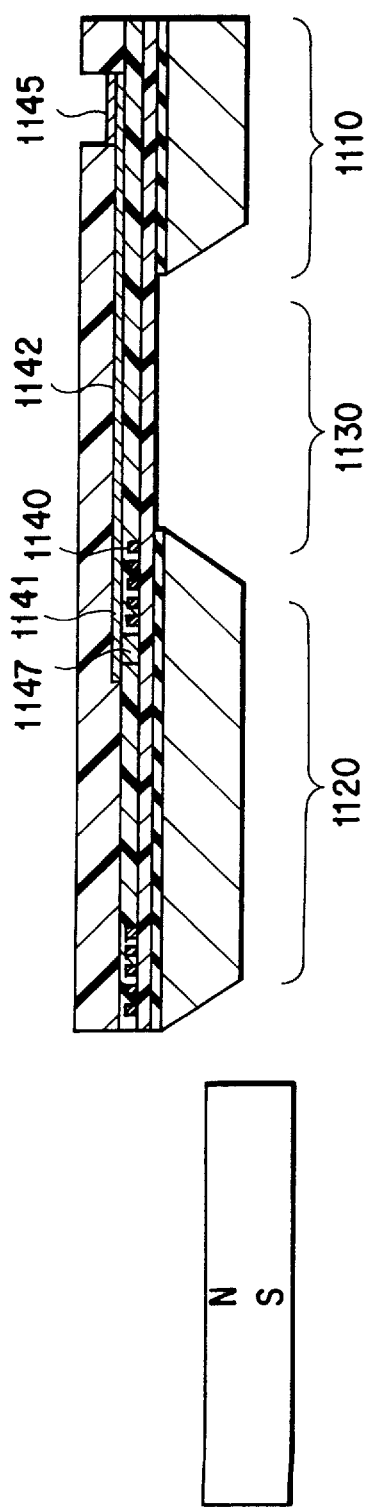
F I G. 51

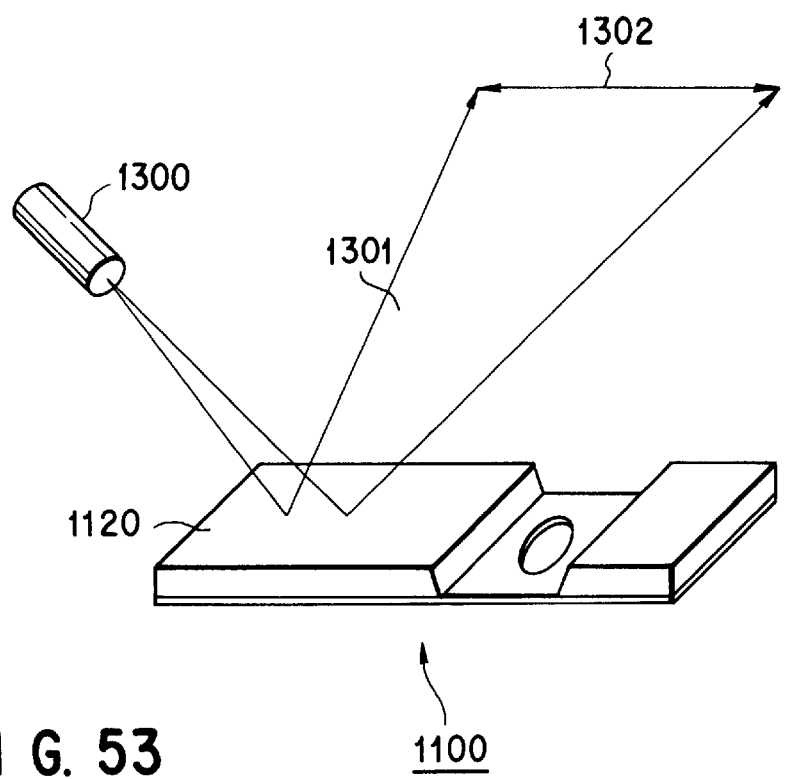
F I G. 53
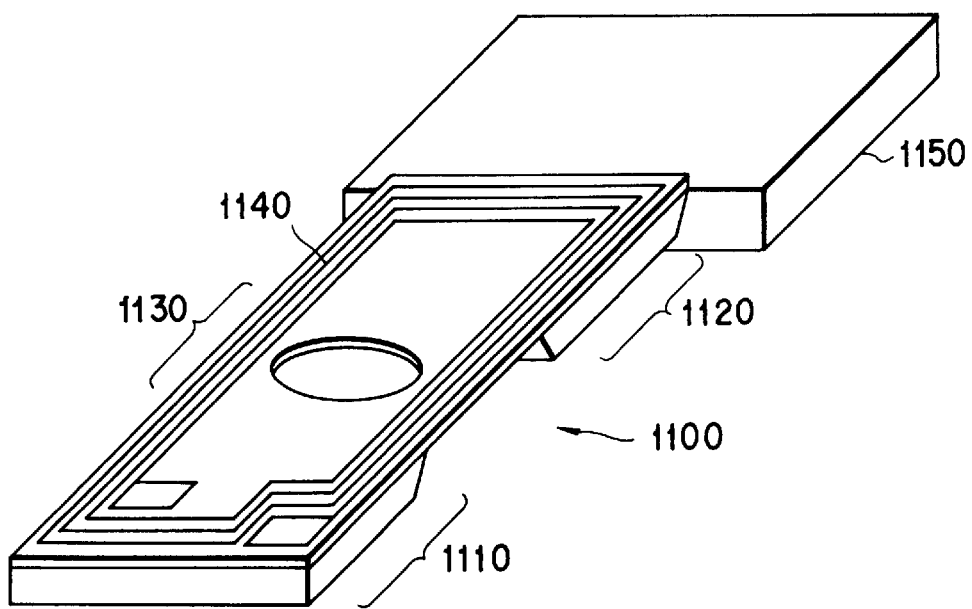
F I G. 54

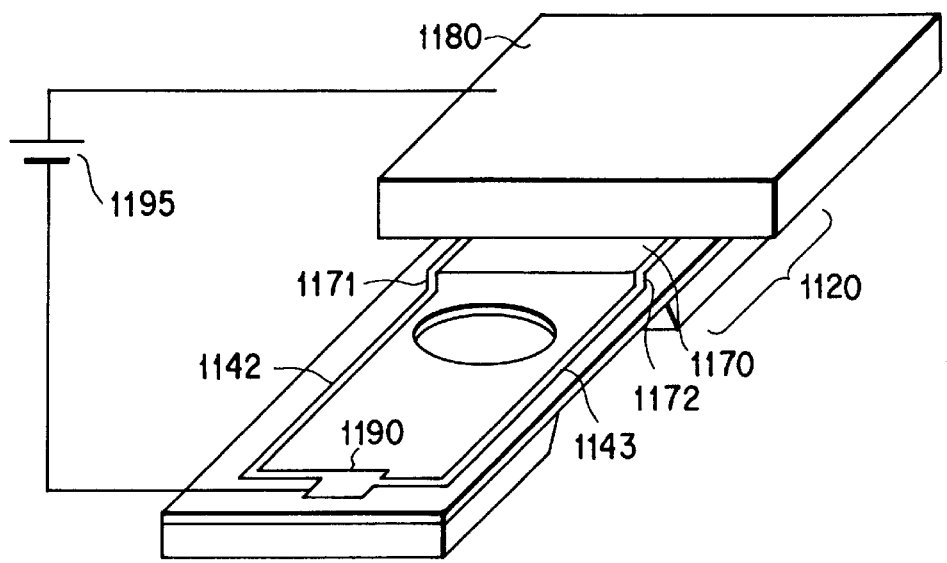
F I G. 55
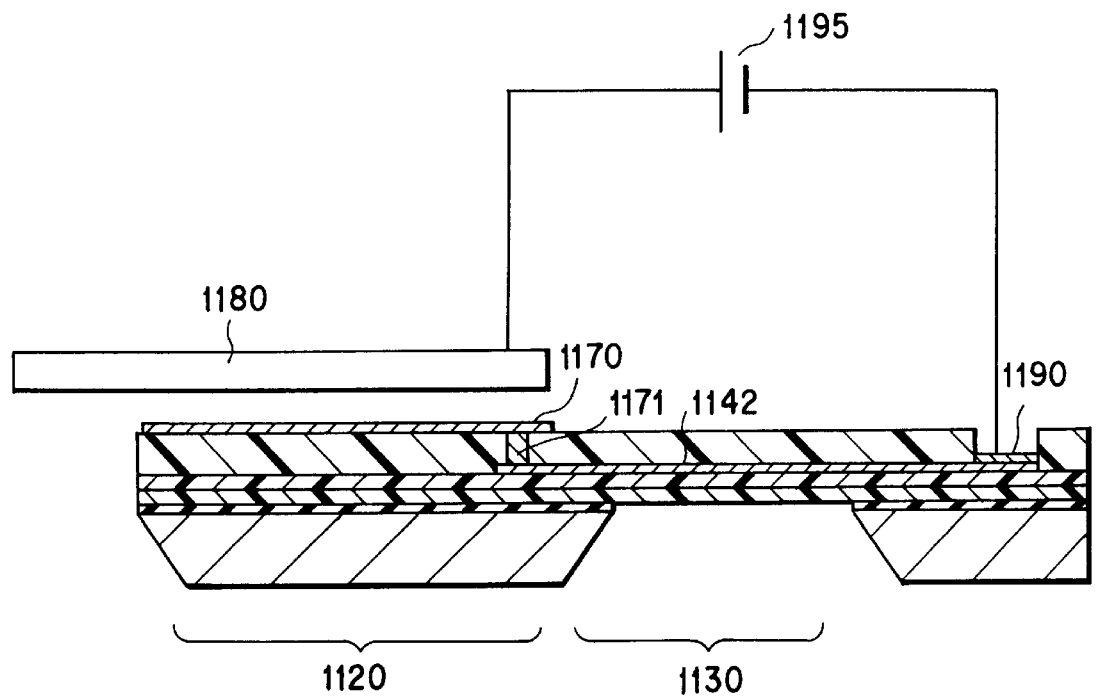
F I G. 56

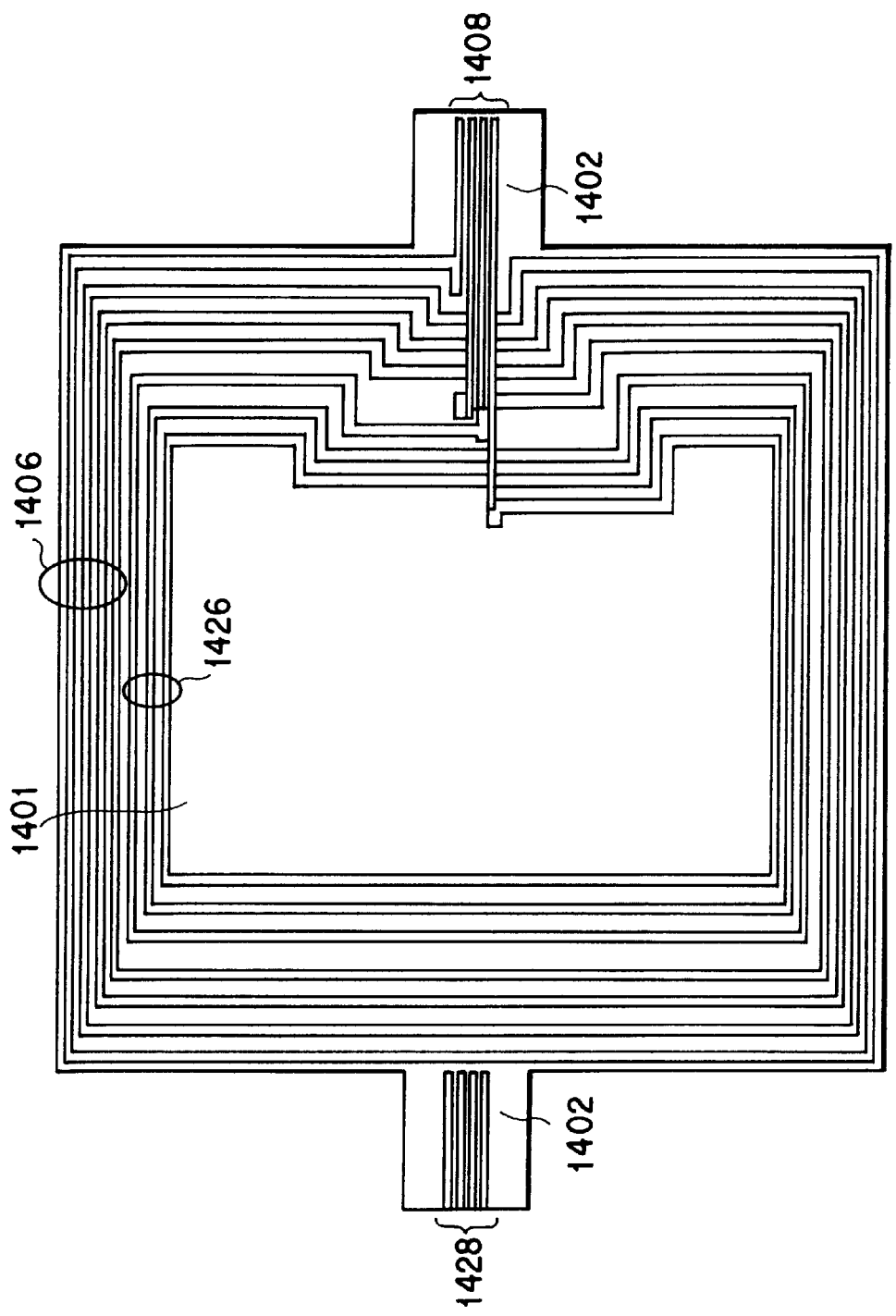
F I G. 60

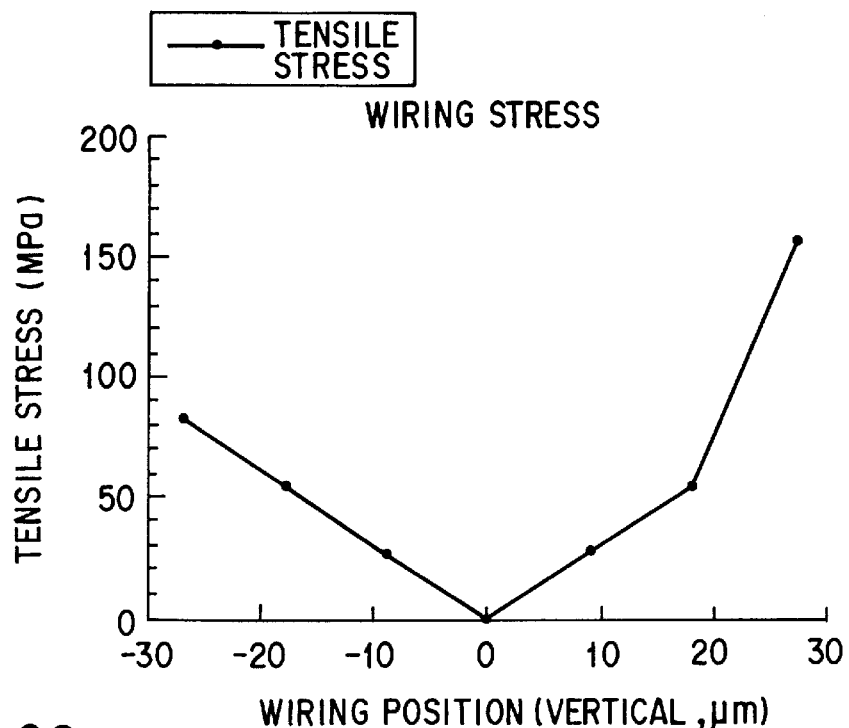
F I G. 62
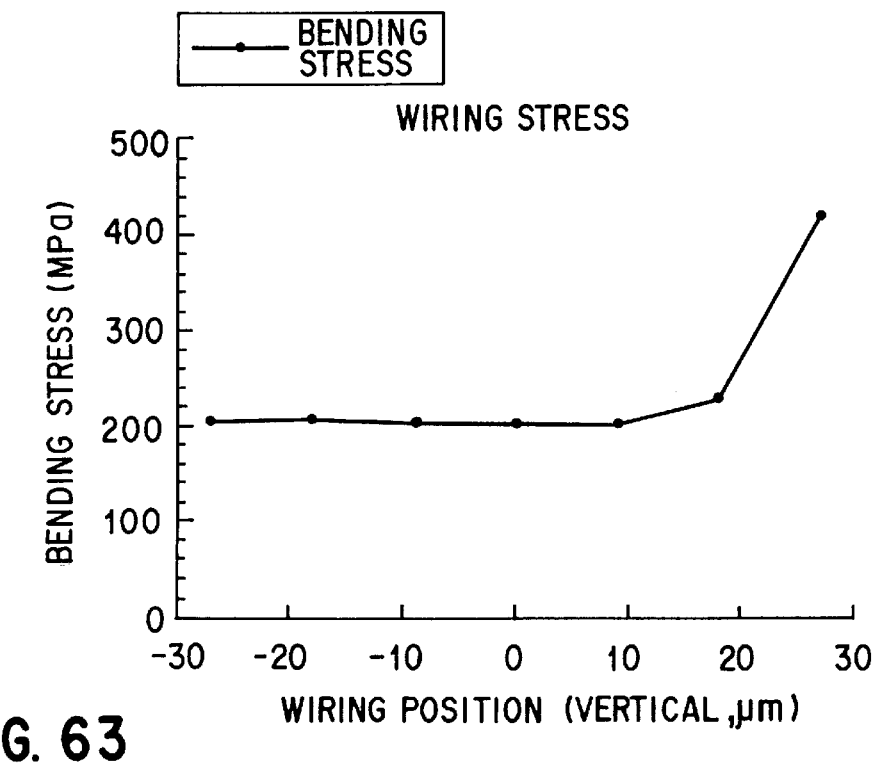
F I G. 63

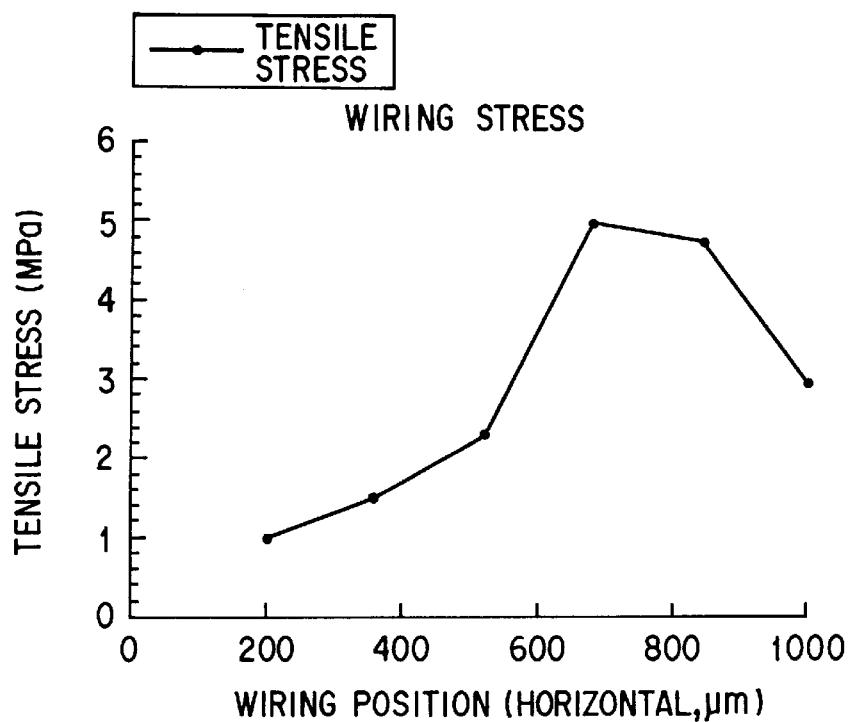
F I G. 64
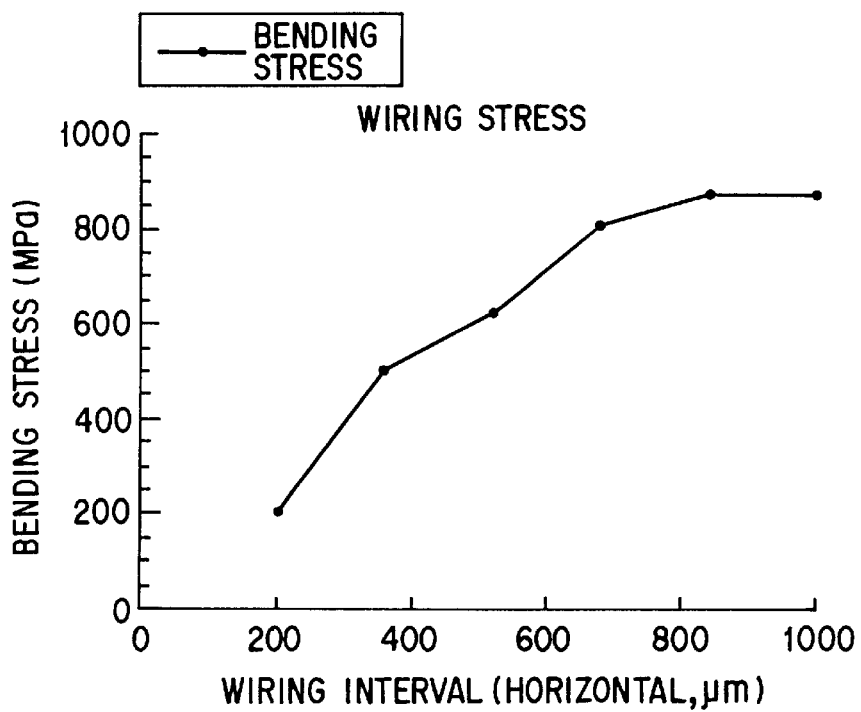
F I G. 65

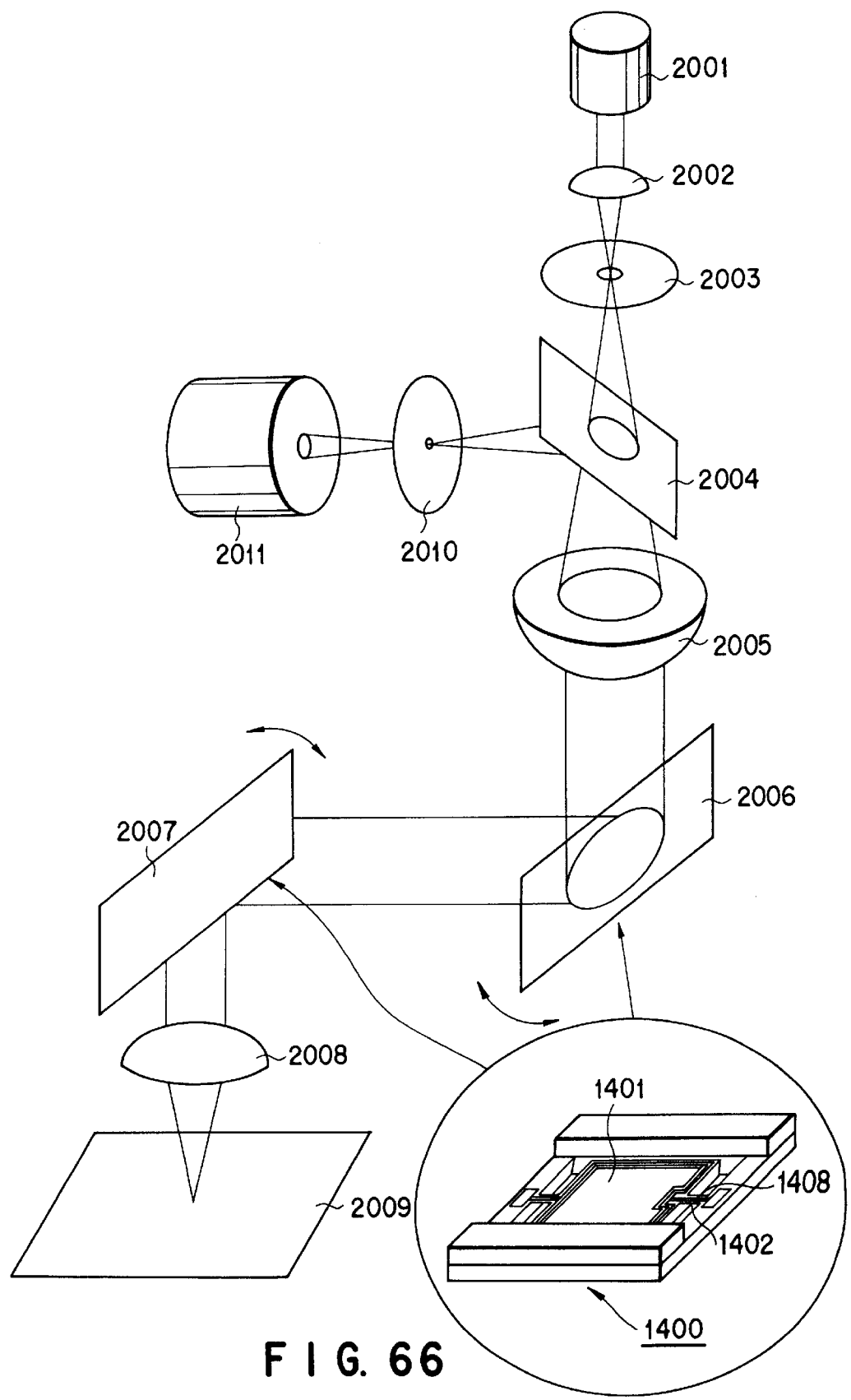
F I G. 66

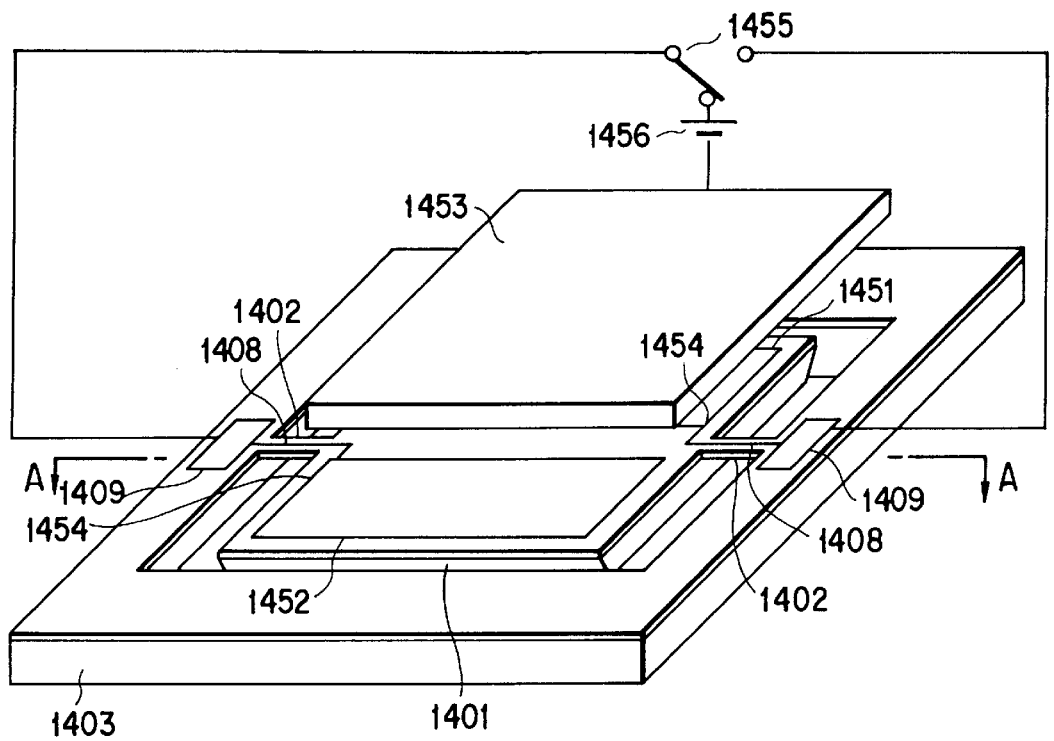
F I G. 67
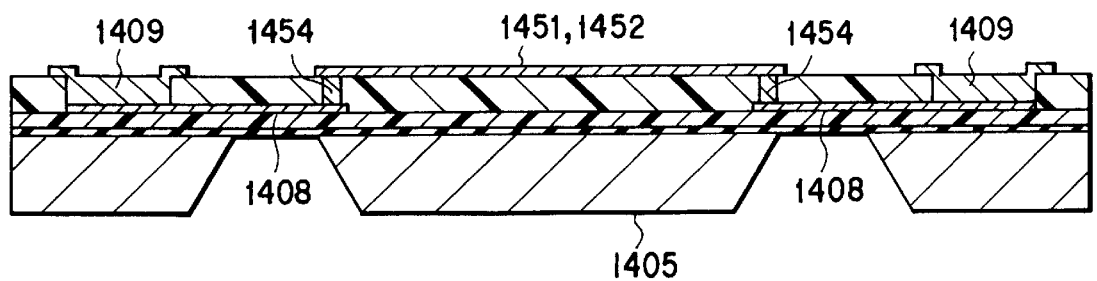
F I G. 68

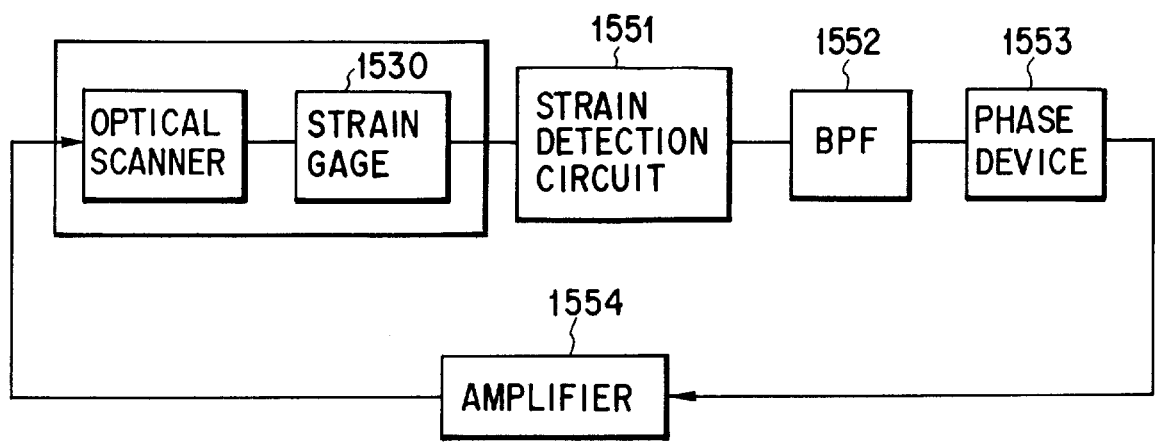
F I G. 71

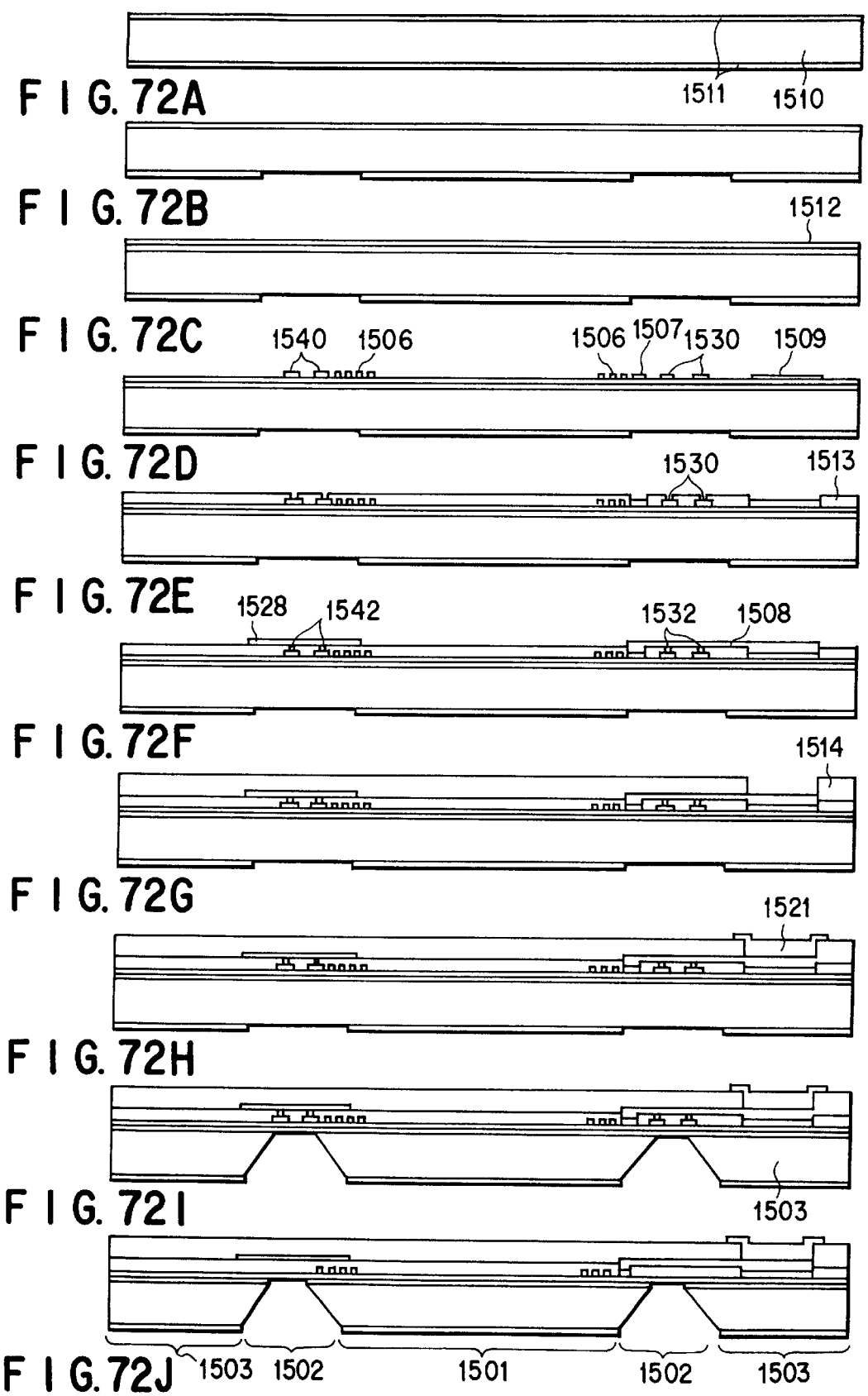

OPTICAL SCANNER

CROSS-REFERENCE TO RELATED APPLICATIONS

This is a Continuation-in-Part application of U.S. patent application Ser. No. 08/840,596, filed Apr. 22, 1997, the entire contents of which are incorporated herein by reference.

BACKGROUND OF THE INVENTION

The present invention relates to an optical scanner which reflects light from a light source and scans the reflected light.

<First Prior Art>

As a conventional optical scanner, Jpn. Pat. Appln. KOKAI Publication No. 63-82165 discloses an optical scanner having an arrangement like the one shown in FIGS. 45A and 45B, i.e., a deflector 300.

As shown in FIG. 45B, the deflector 300 includes a large york 328, a coil 329 wound around the york 328, and an optical deflecting element 310 placed in the space inside the york 328.

As shown in FIG. 45A, the optical deflecting element 310 includes a mirror 312, a driving coil 311, and ligaments 313 and 314. These components are integrally formed and supported by a support frame 315.

In the deflector 300, the ligaments 313 and 314 are twisted by the force exerted on the driving coil 311 owing to the interaction between a current flowing in the driving coil 311 and a magnetic field generated by the york 328 and the coil 329. As a result, the mirror 312 is vibrated at a predetermined frequency.

Light is irradiated on the mirror 312, and the reflected light is scanned one-dimensionally.

<Second Prior Art>

As another conventional optical scanner, Jpn. Pat. Appln. KOKAI Publication No. 6-46207 discloses an optical scanner designed to vibrate its reflecting surface by using a piezoelectric element.

As shown in FIG. 46, in this optical scanner, a cantilever constituted by a carrier material 2 and an electrode 3 is supported on a silicon substrate 1.

This cantilever constitutes a unimorph piezoelectric actuator 6. The unimorph piezoelectric actuator 6 is manufactured by sequentially forming the carrier material 2 and the electrode 3 on the upper surface of the silicon substrate 1, and forming a space 7 by etching.

A strain gage 9 is placed on the cantilever. Another strain gage 10 is placed at the fixed end of the cantilever.

The strain gage 9 is used to measure the deformation amount of the unimorph piezoelectric actuator 6. The strain gage 10 is used to obtain a reference signal for the measuring operation.

According to this optical scanner, the deformation-free distal end portion of the cantilever functions as a reflecting surface, on which light is irradiated.

The cantilever is vibrated by the unimorph piezoelectric actuator 6. As a result, light reflected by the distal end portion of the cantilever is scanned one-dimensionally.

The optical scanner as the first prior art disclosed in Jpn. Pat. Appln. KOKAI Publication No. 63-82165 requires the large york 328 and the coil 329 to obtain a sufficient driving force. The overall structure of this device is large.

Recently, demands have arisen for compact optical scanners. However, as the overall size of a scanner is reduced to meet such demands, the driving force is reduced, and hence the deflection angle of a scan beam becomes insufficient. In addition, this scanner requires a cumbersome mechanical assembly process.

The optical scanner as the second prior art disclosed in Jpn. Pat. Appln. KOKAI Publication No. 6-46207 is smaller in size than the above optical scanner. However, the deflection angle of a scan beam is not large enough to meet the future demands.

In addition, as the electric elements of this optical scanner, e.g., the electrode 3 and the electrodes of the strain gages 9 and 10 are exposed, no countermeasures are taken against aging. That is, a problem is posed in terms of maintenance of stable performance.

<Third Prior Art>

Still another known compact optical scanner includes a vibration input portion formed by bonding a scan portion for reflecting light, an elongated elastic deformation portion, and a piezoelectric actuator. The reflecting portion is vibrated two-dimensionally by the piezoelectric actuator to scan light.

Such an optical scanner is disclosed, for example, in Jpn. Pat. Appln. KOKAI Publication No. 5-100175.

FIGS. 47A and 47B show the structure of a silicon substrate 1 disclosed in Jpn. Pat. Appln. KOKAI Publication No. 5-100175.

This optical scanner 1 comprises a thin plate 6 and a piezoelectric actuator 21.

On the plate 6, a vibration input portion 5, an elastic deformation portion 2, a scan portion 3, and a weight portion 3W are integrally formed.

The piezoelectric actuator 21 is formed by bonding a strain conversion element 23 to a multilayered piezoelectric element 22.

The scan portion 3 has a mirror surface 4 for reflecting a light beam.

In the optical scanner 1 having the above structure, when a voltage is applied to the piezoelectric actuator 21 bonded to the vibration input portion 5 to vibrate the vibration input portion 5, the elastic deformation portion 2 resonates, and the scan portion 3 pivots about an axial center P in FIG. 47A within the range of an angle $\theta_T$. At the same time, the scan portion 3 pivots about an axial center Q in FIG. 47B within the range of an angle $\theta_B$.

In this case, the piezoelectric actuator 21 vibrates the vibration input portion 5 in a vibration mode in which vibrations having a resonant frequency of a torsional deformation mode are superimposed on vibrations having a resonant frequency of a bending deformation mode. As a result, the torsional deformation mode and the bending deformation mode are amplified by the elastic deformation portion 2, and the torsional vibrations and the bending vibrations are synthesized at the scan portion 3.

In the optical scanner 1 having the above structure, two-dimensional optical scanning is realized by controlling the voltage applied to the piezoelectric actuator 21 using a driving circuit (not shown).

<Fourth Prior Art>

Still another known compact optical scanner uses a silicon semiconductor substrate and a helical torsion spring. This optical scanner uses an optical deflecting element for scanning light by swinging a reflector using an electromagnetic force.

Such an optical scanner is disclosed, for example, in "TECHNICAL DIGEST OF THE SENSOR SYMPOSIUM", 1995, pp. 17–20.

FIGS. 48A and 48B show the structure of the optical scanner disclosed in this reference.

This optical scanner has a reflector 34 and helical torsion springs 33, formed on a silicon semiconductor substrate 31, together with a fixing frame 50 for supporting them. These components are integrated into an optical deflecting element.

Flat coils 35 are arranged around the peripheral portion of the reflector 34. The flat coils 35 are electrically connected to electrodes 36 on the fixing frame 50 through the helical torsion springs 33.

In addition, circular permanent magnets 38 are located through a spacer insulating substrate 40 such that the direction of magnetization of each permanent magnet 38 is parallel to the reflector 34 and makes an angle of about 45° with the axial direction of the helical torsion spring 33.

When an AC current is applied to the flat coil 35, a Lorentz force is generated therein owing to the interaction between the current and the magnetic field generated by the permanent magnet 38.

This Lorentz force causes the reflector 34 to swing in the twisting direction of the helical torsion spring 33.

When a current having the same frequency as the resonant frequency defined by the elastic properties of the helical torsion spring 33 and the mass and center of gravity of the reflector 34 is applied to the flat coil 35, the maximum amplitude at the current value can be obtained.

In this case, the reflector 34 is vacuum-sealed to reduce the damping coefficient.

Referring to FIGS. 48A and 48B, reference numeral 39 denotes a gas absorbent; 41, a front cover insulating substrate; 42, a lower surface insulating substrate and 32, a movable plate.

In the third and fourth prior-art techniques, there is no description concerning the durability of electric elements such as wiring layers for the optical scanner which vibrates at large deflection angles. Moreover, in the third prior art, there is no description concerning the protection of the electric elements against the atmosphere.

<Fifth Prior Art>

As a conventional optical scanner, there is also known a light deflecting element disclosed, for example, Jpn. Pat. Appln. KOKOKU Publication No. 60-57052. In this light deflecting element, as shown in FIG. 73, a spring portion 1002 and a movable portion 1003 supported by the spring portion 1002 are formed of a single insulating substrate 1001. The movable portion 1003 is provided with a reflection mirror 1004 and a coil pattern 1005. The spring portion 1002, movable portion 1003, reflection mirror 1004 and coil pattern 1005 are formed by photolithography and etching technique. According to this light deflecting element, the spring portion 1002 is torsion-vibrated and thereby reflected light can be scanned in a predetermined direction.

In this conventional optical scanner, wiring for supplying current to the coil pattern 1005 is formed on a surface of the spring portion 1002 or an elastic member. The reason is that in the conventional optical scanner, like the light deflecting element described in Jpn. Pat. Appln. KOKOKU Publication No. 60-57052, the spring portion 1002 is formed of single insulating substrate 1001 and thus there is no choice but to provide wiring on the surface of the spring portion 1002. In the structure wherein wiring is formed on the surface of spring portion 1002, however, there arises such a problem that when the spring portion 1002 is bent or torsion-vibrated, the wiring is adversely affected by a great stress occurring at the surface of the spring portion 1002. In general, optical scanners are so controlled that they may be reciprocally moved over and over. If a great stress acts on the wiring repeatedly, the wiring will degrade and, in a worst case, such fault as breakage of wiring will occur.

BRIEF SUMMARY OF THE INVENTION

The first object of the present invention is to provide an optical scanner which can set the deflection angle of a scan beam to a large angle.

It is the second object of the present invention to provide an optical scanner which has the above advantage and allows electric elements to have high durability.

It is the third object of the present invention to provide an optical scanner which has the above advantages and allows mass production at a low cost.

It is the fourth object of the present invention to provide an optical scanner which has the above advantages and further includes deflection angle detection means.

In order to achieve the above objects, according to the present invention, there is provided an optical scanner comprising a support member for fixing the scanner to a given member, a movable plate with a mirror surface for reflecting light, an elastic member formed of a plurality of organic elastic insulating layers for connecting the support member and the movable plate, an actuator, provided at least on the movable plate, for producing a driving force between the movable plate and the support member, and an electric element for applying a predetermined electric signal to the actuator, thereby producing the driving force, the electric element being provided between the organic insulating layers of the elastic member.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3 is a partially sectional perspective view showing the optical scanner in FIG. 1;

FIG. 4 is a view showing an applied example of the optical scanner according to the first embodiment;

FIG. 5 is an exploded perspective view showing a structure as a modification of the optical scanner according to the first embodiment of the present invention;

FIG. 6 is a perspective view showing the structure of another modification of the optical scanner according to the first embodiment of the present invention;

FIGS. 8A to 8I are sectional views for explaining the manufacturing process for the structure of the optical scanner in FIG. 7;

FIG. 13 is a perspective view showing a structure as a modification of an optical scanner according to the third embodiment of the present invention;

FIG. 14 is a perspective view showing the structure of another modification of the optical scanner according to the third embodiment of the present invention;

FIG. 15 is a top view showing the dimensions of a structure used in an experiment;

FIG. 16 is a sectional view taken along a line XVI—XVI of the structure in FIG. 15;

FIGS. 30A and 30B are plan views respectively showing the structures of driving coils in modifications of the fifth and sixth embodiments of the present invention;

FIGS. 32A and 32B are plan views respectively showing the structures of driving coils in the first and second modifications of the sixth embodiment of the present invention;

FIG. 35 is a view showing an application example of the optical scanner according to the seventh embodiment of the present invention;

FIG. 36 is a perspective view showing the structure of an optical scanner according to the eighth embodiment of the present invention;

FIG. 37 is a sectional view taken along a line 37–37' in the eighth embodiment shown in FIG. 36;

FIG. 38 is a sectional view taken along a line 38–38' in the eighth embodiment shown in FIG. 36;

FIG. 39 is a plan view showing the structure of a driving coil in the eighth embodiment of the present invention;

FIG. 42 is a perspective view showing the structure of a modification of the optical scanner according to the eighth embodiment of the present invention;

FIG. 43 is a sectional view taken along a line 43–43' in the modification of the eighth embodiment of the present invention in FIG. 42;

FIG. 49 is a perspective view showing the structure of an optical scanner according to a ninth embodiment of the invention;

FIG. 50 is a sectional view taken along a line A—A or a central axis of the optical scanner in FIG. 49;

FIG. 51 is a sectional view taken along a line B—B of the optical scanner in FIG. 49;

FIG. 53 is a view showing the state of use of the optical scanner according to the ninth embodiment;

FIG. 54 is a perspective view showing a modification of the optical scanner according to the ninth embodiment;

FIG. 55 is a perspective view showing a modification of the optical scanner according to the ninth embodiment;

FIG. 56 is a perspective view showing a modification of the optical scanner according to the ninth embodiment;

FIG. 60 is a plan view showing a movable plate and an elastic member of the optical scanner according to the tenth embodiment;

FIG. 62 shows a simulation result of a stress acting on the wiring of the optical scanner according to the tenth embodiment;

FIG. 63 shows a simulation result of a stress acting on the wiring of the optical scanner according to the tenth embodiment;

FIG. 64 shows a simulation result of a stress acting on the wiring of the optical scanner according to the tenth embodiment;

FIG. 65 shows a simulation result of a stress acting on the wiring of the optical scanner according to the tenth embodiment;

FIG. 66 shows an example of the optical scanner of the tenth embodiment, which is applied to a laser scanning microscope;

FIG. 67 is a perspective view showing a modification of the optical scanner according to the tenth embodiment;

FIG. 68 is a perspective view showing a modification of the optical scanner according to the tenth embodiment;

FIG. 71 is a block diagram showing a control circuit of the optical scanner according to the eleventh embodiment;

FIGS. 72A to 72J are views showing the manufacturing process for the optical scanner according to the eleventh embodiment.

DETAILED DESCRIPTION OF THE INVENTION

Figure 1:
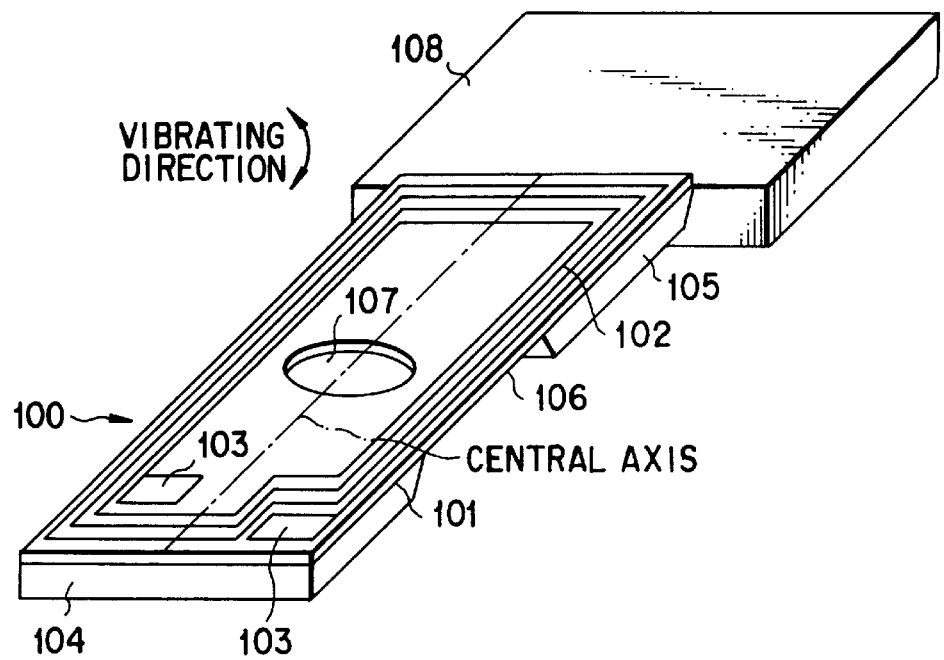
FIG. 1 is a perspective view showing the structure of an optical scanner according to the first embodiment of the present invention.

Reference will now be made in detail to the presently preferred embodiments of the invention as illustrated in the accompanying drawings, in which like reference characters designate like or corresponding parts throughout the several drawings.

Optical scanner devices according to the embodiments of the present invention will be described below with reference to the accompanying drawings.

(First Embodiment)

An optical scanner according to the first embodiment of the present invention will be described with reference to FIGS. 1 to 4.

As shown in FIGS. 1 and 3, the optical scanner includes a structure 100 whose free end is vibrated, and a permanent magnet 108 placed near the free end of the structure 100.

Figure 2:
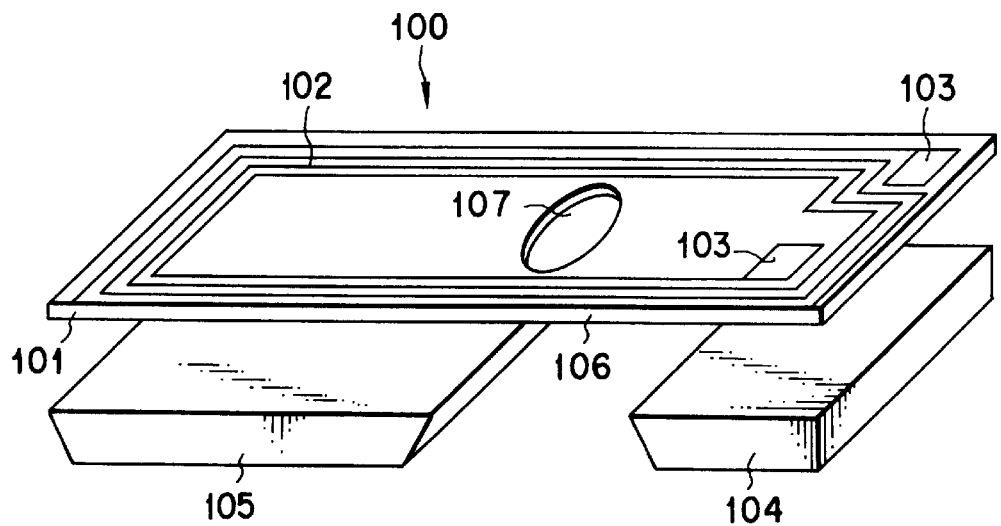
FIG. 2 is an exploded perspective view showing a structure as part of the optical scanner in FIG. 1.

As shown in FIGS. 1 to 3, the structure 100 includes a support member 104 serving as a support portion which is a fixed end, a flexible substrate 101 which is an elastically deformable elastic portion, and a movable plate 105 having a reflecting surface serving as a mirror.

The support member 104 and the movable plate 105 are fixed to the two end portions of the flexible substrate 101 by bonding.

In this case, the flexible substrate is a thin plate member consisting of an organic insulating material.

In order to obtain high linearity in the scanning direction of light (i.e., in order to make the path of a scan light beam reciprocate on the same straight line without shifting), the support member 104 and the movable plate 105 are bonded to the flexible substrate 101 such that the central axis of the movable plate 105 coincides with that of the support member 104.

In this case, the direction in which the structure 100 extends from the support member 104 to the movable plate 105 is defined as the longitudinal direction, and a direction perpendicular thereto is defined as the widthwise direction.

In the following embodiment, the longitudinal and widthwise directions are defined in the same manner.

The flexible substrate 101, the support member 104, and the movable plate 105 have the same width. The above bonding can be easily realized by bonding the movable plate 105 and the support member 104 as the two ends of each member in the widthwise direction are aligned with the two ends of the flexible substrate 101 in the widthwise direction.

The flexible substrate 101 incorporates a flat coil 102 surrounding the inside of the periphery of the flexible substrate 101. The two end portions of the flat coil 102 are connected to electrode pads 103. The electrode pads 103 are exposed on the upper surface of the flexible substrate 101 so that the flat coil 102 can be electrically connected to external parts.

The movable plate 105 has a reflecting surface on the opposite side to the surface bonded to the flexible substrate 101.

The material to be used for the movable plate 105 is determined by the performance of an optical scanner.

If, for example, scanning is to be performed at a low frequency, the mass of the movable plate 105 is preferably large. A high-density material such as a metal is therefore suited for the movable plate 105.

In contrast to this, if scanning is to be performed at a high frequency, the mass of the movable plate 105 is preferably small. A low-density material such as plastic is therefore suited for the movable plate 105.

If the movable plate 105 consists of a plastic material, the reflecting surface of the movable plate 105 is obtained by forming a film consisting of a material having a high reflectance such as a metal by electroless plating.

The support member 104 is used to fix the structure 100 with a die cast or the like, and hence preferably consists of a thick plate having a high strength such as a metal plate, e.g., a thick plate consisting of stainless steel.

If the support member 104 is not firmly fixed to the structure 100 with a die cast, the operation of the optical scanner is adversely affected. For this reason, the support member 104 is preferably bonded to the structure 100 firmly with a die cast.

The portion between the support member 104 and the movable plate 105 on the flexible substrate 101 serves as an elastic portion, i.e., a leaf spring portion 106, which supports the movable plate 105 to make it displaceable with respect to the support member 104.

The flexible substrate 101 has a through hole 107 in the middle of the leaf spring portion 106, i.e., the inside of the flat coil 102.

The through hole 107 helps the displacement of the movable plate 105.

In order to realize a one-dimensional scanning operation with high linearity, the center of the through hole 107 is preferably located in the middle of the leaf spring portion 106 in the widthwise direction, and the through hole 107 preferably has a shape symmetrical about a central axis perpendicular to the widthwise direction.

In addition, the through hole 107 is preferably shaped to prevent stress from concentrating on a specific portion upon displacement of the movable plate 105.

For the above reasons, the through hole 107 preferably has a circular shape, an elliptic shape, or a polygonal shape with round corners.

The permanent magnet 108 is positioned such that its direction of magnetization is almost parallel to the vibrating direction of the movable plate 105, and the distal end of the permanent magnet upper portion is set at an arbitrary position at about 45° in the upward or downward direction with respect to the flat coil 102 located at the distal end portion of the movable plate 105.

The operation of the optical scanner having the above structure will be described next.

Alternating currents are supplied from a power supply (not shown) to the flat coil 102 through the electrode pads 103.

When a current flows in the flat coil 102, a portion of the flat coil 102 near the free end of the structure 100, i.e., a portion of the flat coil 102 which extends parallel to the side of the free end of the structure 100, mainly receives a force generated by the interaction between the current and the magnetic field generated by the permanent magnet 108.

Since the current flowing in the flat coil 102 is an alternating current, the direction of the force exerted on the above portion of the flat coil 102 periodically changes.

The movable plate 105 therefore vibrates in the direction of thickness.

The resonant frequency of the vibration of the structure 100 is uniquely determined by the shapes and materials of the movable plate 105 and the leaf spring portion 106. When the alternating current supplied to the flat coil 102 has the same frequency as the resonant frequency, the vibration of the movable plate 105 has the maximum amplitude.

This resonant frequency, the gain at the time of resonance, and the deflection angle of the movable plate 105 are approximately given by equations (1), (2), and (3) below. These equations are used as models for actual design.

When light from a light source is reflected by the movable plate 105 to be scanner, the deflection angle of the light is twice the deflection angle of the movable plate 105.

$$fr = \{6Ep \; Ip\pi la^3/(mass + 0.23 \; mcp)\}^{1/2} \quad (1)$$

$$gain = 1/[\{1.0 - (f/fr)^2\}^2 + (2.0 \; dp \cdot f^2/fr)]^{1/2} \quad (2)$$

$$i_{max} = gain \cdot w[(lb^2/2Es \; Is) + \{(la+lb)^2 - lb2\}/2Ep \; Ip] \quad (3)$$

where fr is the resonant frequency, Ep is the Young's modulus of the leaf spring portion 106, Ip is the second moment of area of the leaf spring portion 106, mass is the mass of the movable plate 105, mcp is the mass of the leaf spring portion 106, gain is the gain at the time of resonance, I is an arbitrary frequency, dp is the damping coefficient, $i_{max}$ is the deflection angle at the time of resonance, w is the momentum generated in the flat coil 102, Es is the Young's modulus of the movable plate 105, Is is the second moment of area of the movable plate 105, lb is the length of the leaf spring portion 106, and la is the length of the movable plate 105.

The optical scanner according to this embodiment is used in a state, for example, as shown in FIG. 4. If a collimated laser beam from a laser light source 109 is radiated on the reflection surface of the vibrating movable plate 105, a laser beam 108 reflected by the reflection surface of the movable plate 105 is scanned one-dimensionally. As a result, a scan line 110 is obtained. If a predetermined current is applied to the flat coil 102 (see FIG. 1) as a drive signal at a predetermined frequency, scanning can be performed at desired frequency and amplitude. Optical characteristics obtained along the scan line 110 are detected by a light-receiving element 111, and a detection signal is output to a signal processing circuit 112. The signal processing circuit 112 reads the optical characteristics on the scan 110. Since this scanner can be remarkably reduced in size, compared to the conventional scanner, it is suitably applied to small-sized devices and the power consumption can be reduced.

In this embodiment, the flat coil 102 surrounds the periphery of the flexible substrate 101 within the range from the movable plate 105 to the support member 104.

Since the portion influenced by the magnetic flux generated by the permanent magnet 108 is substantially only a portion of the flat coil 102 which is formed parallel to the end portion of the movable plate 105, the vibration is stabile, and modes other than the longitudinal vibration mode hardly occur.

In addition, since wiring layers other than the flat coil 102 are not required, this optical scanner can be easily manufactured, thus realizing high productivity.

Furthermore, in this optical scanner, electric elements such as wiring layers are integrally formed on the flexible substrate 101. For this reason, the flat coil 102 and the like need not be handled as discrete components.

Since the flat coil 102 used in this case, in particular, consists of a thin film to realize a compact optical scanner, the flat coil 102 is difficult to handle. For this reason, the flat coil 102 is formed in the flexible substrate 101 to be handled together with the flat coil 102, thereby greatly improving the productivity.

This optical scanner requires only a small number of assembly steps, and can be completed by only bonding the support member 104 and the movable plate 105 to the flexible substrate 101.

Since this optical scanner requires only a small number of assembly steps, the optical scanner is almost free from unstable vibrations due to problems in terms of assembly.

The direction of the scanner in use is not fixed, and the scanner must be so designed as to be used in any direction. The problem in this case is that the vibrating portion of the optical scanner is twisted depending on the direction of the optical scanner. In this embodiment, an analysis of this problem has led to the finding that the formation of the through-hole 107 in the middle of the leaf spring portion 106 can realize a structure which is resistant to the twist and provides a large deflection angle. With the provision of the through-hole 107, the strength characteristics of the leaf spring portion 106 are improved.

Note that since stress concentrates on the four corners of the through hole 107, the four corners have curvatures to disperse the stress around the corners.

By using the flexible substrate 101 mainly consisting of an organic material for the leaf spring portion 106, the leaf spring portion 106 is resistant to brittle fracture and attains a large deflection angle while maintaining the minimum necessary strength.

In addition, since the flat coil 102 is formed in the flexible substrate 101, the flat coil 102 is almost free from aging due to humidity.

Furthermore, the flexible substrate 101 serves to insulate the wiring layers of the flat coil 102 from each other.

As is apparent, each arrangement of this embodiment can be variously modified and changed.

FIG. 5 shows a modification of this embodiment.

As shown in FIG. 5, the flat coil 102 surrounds the area in which the movable plate 105 is bonded, and the end portions of the flat coil 102 are electrically connected to the electrode pads 103, which are arranged on the portion to which the support member 104 is bonded, through wiring layers 113.

Although the wiring layer 113 connected to the end portion of the flat coil 102 which is located on the front side in FIG. 5 extends over the flat coil 102, this portion is properly insulated by the organic film of the flexible substrate 101.

The flexible substrate 101 therefore has a multilayered structure consisting of the flat coil 102, the insulating organic film, the wiring layers 113, the electrode pads 103, and the organic films sandwiching these components.

The strength of a leaf spring portion 106 having wiring layers extending therein can be controlled more easily than a leaf spring portion 106 having a flat coil extending therein. In addition, since the overall resistance of the flat coil 102 can be reduced, the power consumed by the optical scanner can be reduced.

FIG. 6 shows another modification of this embodiment.

As shown in FIG. 6, the support member 104 surrounds the movable plate 105, and the permanent magnet 108 is fixed to the support member 104.

The portion of the support member 104 to which the permanent magnet 108 is fixed is cut by about 20 μm by etching or the like. The bonding surface of the permanent magnet 108 is coated with an adhesive or the like and bonded to the etched portion.

In this structure, since the mounting position of the permanent magnet 108 is specified by etching, the permanent magnet 108 can always be mounted at the same position. In addition, the permanent magnet 108 can be easily mounted within a short period of time.

<Second Embodiment>

FIGS. 7 and 8A to 8I show an optical scanner according to the second embodiment of the present invention.

Figure 7:
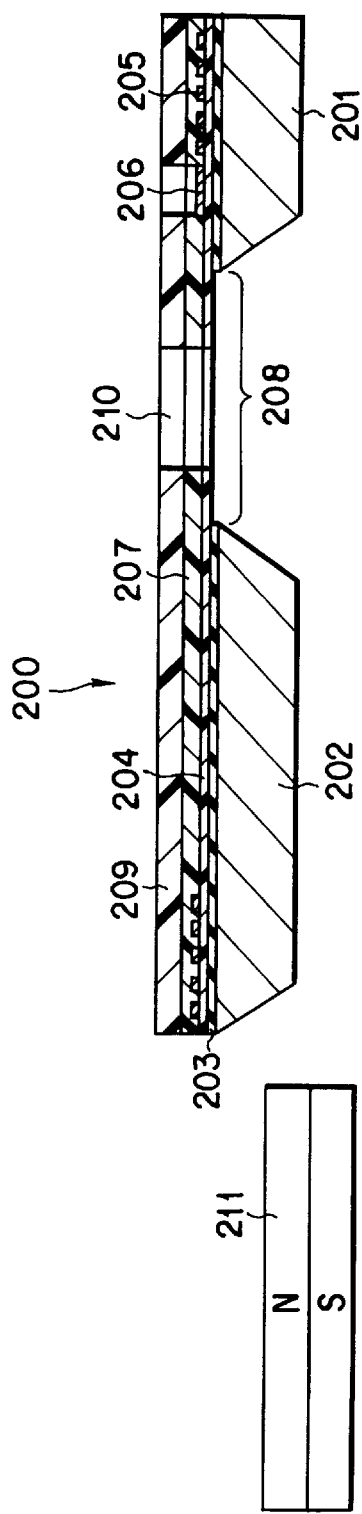
FIG. 7 is a sectional view showing the structure of an optical scanner according to the second embodiment of the present invention.

The outer appearance of a structure 200 of this embodiment in FIG. 7 is the same as that of the structure 100 of the first embodiment in FIGS. 1 to 3. However, the structure 200 of this embodiment differs from the structure 100 in that the former is integrally manufactured by a semiconductor manufacturing technique.

Referring to FIG. 7, a support member 201 and a movable plate 202 are formed from a single substrate.

In this case, a single-crystal silicon substrate having a (100) plane is used for this substrate. Silicon nitride films 203 are formed on the silicon substrate.

A first polyimide layer 204 is formed on the silicon nitride film 203. A flat coil 205 is formed on the first polyimide layer 204.

In forming the flat coil 205, an aluminum film is formed by sputtering and processed into a coil pattern by etching.

The flat coil 205 surrounds a portion near the periphery of the structure 200. The two ends of the flat coil 205 are connected to electrode pads 206 which are used for electric connection to external parts.

The underlayer of the electrode pad 206 is formed together with the flat coil 205. Thereafter, aluminum is deposited on the underlayer by sputtering to increase the thickness of the layer.

A second polyimide layer 207 is formed on the flat coil 205.

The second polyimide layer 207 is part of a leaf spring portion 208 and serves as an insulating film between the coil wiring layers of the flat coil 205. The second polyimide layer 207 also serves to reduce the level differences produced by the flat coil 205.

A third polyimide layer 209 is formed on the second polyimide layer 207.

The first polyimide layer 204, the second polyimide layer 207, and the third polyimide layer 209 constitute the leaf spring portion 208 which supports the movable plate 202 to make it displaceable with respect to the support member 201.

The third polyimide layer 209 is formed, in particular, to match the spring property of the leaf spring portion 208 with the design value.

The second polyimide layer 207 and the third polyimide layer 209 are not formed on the electrode pads 206. That is, the electrode pads 206 are exposed and can be electrically connected to external parts.

Note that if the desired spring property of the leaf spring portion 208 can be obtained by the first and second polyimide layers, the third polyimide layer need not be formed.

A through hole 210 is formed in the leaf spring portion 208.

In order to realize a one-dimensional scanning operation with high linearity, the center of the through hole 210 is preferably located in the middle of the leaf spring portion 208 in the widthwise direction, and the through hole 107 preferably has a shape symmetrical about a central axis perpendicular to the widthwise direction.

In addition, the through hole 208 is preferably shaped to prevent stress from concentrating on a specific portion upon displacement of the movable plate 105.

For the above reasons, the through hole 210 preferably has a circular shape, an elliptic shape, or a polygonal shape with round corners.

A permanent magnet 211 is positioned such that its direction of magnetization is nearly parallel to the vibrating direction of the movable plate 202, and the distal end of the permanent magnet upper portion is set at an arbitrary position at about 45° in the upward or downward direction with respect to the flat coil 205 located at the distal end portion of the movable plate 202.

A method of manufacturing the structure 200 of the optical scanner of this embodiment will be described next with reference to FIGS. 8A to 8I.

As shown in FIG. 8A, a silicon substrate 212 is cleaned, and silicon nitride films 203 are formed on the surfaces of the silicon substrate 212 by using a low-pressure CVD apparatus.

The silicon nitride film 203 on the upper surface servers as an insulating layer between a flat coil 205 to be formed on the silicon nitride film 203, and the silicon substrate 212. The silicon nitride film 203 on the lower surface is used as a mask material when a movable plate 202 to be formed later is isolated from the support member 201.

As shown in FIG. 8B, for the above reason, the silicon nitride film 203 on the lower surface is patterned such that the silicon on the portion to be removed by dry etching is exposed.

A mask 213 used to form a through hole 210 in a leaf spring portion 208 is formed on the silicon nitride film 203 on the upper surface by using an aluminum film formed by sputtering.

As shown in FIG. 8C, a first polyimide layer 204 is formed on the silicon nitride film 203 on the upper surface.

The first polyimide layer is formed by coating the silicon nitride film 203 with a polyimide solution, uniformly forming a polyimide film by printing or spin coating, and sintering the film.

As shown in FIG. 8D, a flat coil 205 is formed on the first polyimide layer 204.

The flat coil 205 is formed by etching a sputtered aluminum film into a coil pattern.

Thereafter, an aluminum film is formed on only the portion corresponding to an electrode pad 206 by sputtering again to form an electrode pad 206 having a sufficient thickness.

As shown in FIG. 8E, a second polyimide layer 207 is formed on the first polyimide layer 204. Similar to the first polyimide layer 204, the second polyimide layer 207 is formed by coating the first polyimide layer 204 with a polyimide solution, uniformly forming a polyimide film by printing or spin coating, and sintering the film.

As shown in FIG. 8F, a third polyimide layer 209 is formed on the second polyimide layer 207.

In this case, the third polyimide layer 209 is formed to be thicker than the first polyimide layer 204 and the second polyimide layer 207 to increase the rigidity of a leaf spring portion 208 to be formed afterward.

Similar to the first polyimide layer 204, the third polyimide layer 209 is formed by coating the second polyimide layer 207 with a polyimide solution, uniformly forming a polyimide film by printing or spin coating, and sintering the film.

As shown in FIG. 8G, the portions of the second and third polyimide layers 207 and 209 which are located above a through hole 210 and the electrode pad 206 are selectively removed by dry etching.

As shown in FIG. 8H, the silicon substrate 212 is anisotropically etched from its lower surface side by using an alkaline solution and the patterned silicon nitride film 203 on the lower surface as a mask, thereby forming a movable plate 202 and a support member 201.

In this case, the silicon nitride film 203 under the first polyimide layer 204 serves as a masking layer for protecting the first polyimide layer 204 from this anisotropic etching.

As shown in FIG. 8I, the silicon nitride film 203 serving as the masking layer for the first polyimide layer 204 is removed by dry etching after the silicon is etched.

When the silicon nitride film 203 is removed, the mask 213 used to etch the first polyimide layer 204 appears under the leaf spring portion 208.

The first polyimide layer 204 is processed by using this mask 213 to form a through hole 210.

Finally, the mask 213 is removed by etching to obtain the structure 200 of the optical scanner of this embodiment described above.

The operation of the optical scanner of this embodiment will be described next.

Alternating currents are supplied from a power supply (not shown) to the flat coil 205 through the electrode pads 206.

When a current flows in the flat coil 205, a portion of the flat coil 205 near the free end of the structure 200, i.e., a portion of the flat coil 205 which extends parallel to the side of the free end of the structure 200, mainly receives a force generated by the interaction between the current and the magnetic field generated by the permanent magnet 211.

Since the current flowing in the flat coil 205 is an alternating current, the direction of the force exerted on the above portion of the flat coil 205 periodically changes.

The movable plate 202 therefore vibrates in the direction of thickness.

The resonant frequency of the vibration of the structure 200 is uniquely determined by the shapes and materials of the movable plate 202 and the leaf spring portion 208. When the alternating current supplied to the flat coil 205 has the same frequency as the resonant frequency, the vibration of the movable plate 202 has the maximum amplitude.

This resonant frequency, the gain at the time of resonance, and the deflection angle of the movable plate 202 are approximately given by equations (1), (2), and (3) described above. These equations are used as models for actual design.

When light from a light source is reflected by the movable plate 202 to be scanner, the deflection angle of the light is twice the deflection angle of the movable plate 202.

In this embodiment, since the structure 200 is integrally formed, no assembly step is required for this structure. Ultra-compact optical scanners can be mass-produced at a low cost.

In addition, since the structure 200 is formed by using the semiconductor manufacturing technique, a very high process precision can be ensured. The characteristics of the optical scanner are free from aging due to assembly errors.

The direction of the scanner in use is not fixed, and the scanner must be so designed as to be used in any direction. The problem in this case is that the vibrating portion of the optical scanner is twisted depending on the direction of the optical scanner. In this embodiment, an analysis of this problem has led to the finding that the formation of the through-hole 210 in the middle of the leaf spring portion 208 can realize a structure which is resistant to the twist and provides a large deflection angle. With the provision of the through-hole 210, the strength characteristics of the leaf spring portion 208 are improved.

Note that since stress concentrates on the four corners of the through hole 210, the four corners have curvatures to disperse the stress around the corners.

By using a polyimide as an organic insulating material for the leaf spring portion 208, the leaf spring portion 208 is resistant to brittle fracture and attains a large deflection angle while maintaining the minimum necessary strength. In addition, since the wiring layers are formed in the polyimide layer, the leaf spring portion 208 is almost free from aging due to humidity.

Furthermore, the polyimide layer serves to insulate the wiring layers of the flat coil 205 from each other.

As is apparent, each arrangement of this embodiment can be variously modified and changed.

Figure 9:
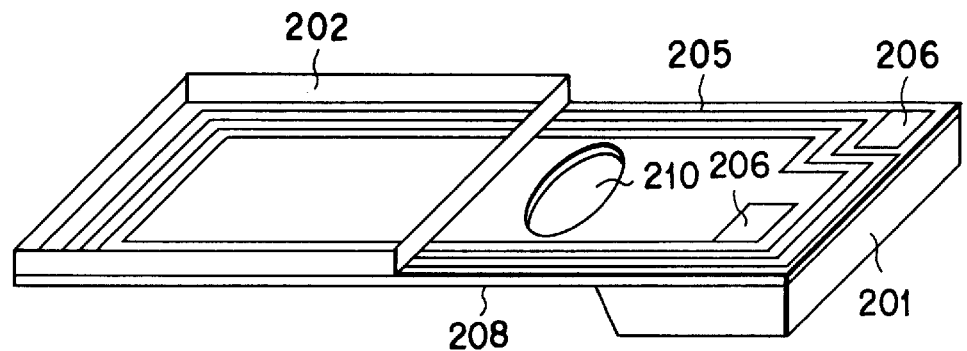
FIG. 9 is a perspective view showing a structure as a modification of an optical scanner according to the second embodiment of the present invention.

FIG. 9 shows a modification of this embodiment.

As shown in FIG. 9, the movable plate 202 is formed by using an organic film such as a polyimide layer.

Since the movable plate 202 consisting of a polyimide is smaller in mass than a plate consisting of silicon, an optical scanner using this plate can realize a large deflection angle.

The following description concerns the relationship between the mass of the movable plate 202 and the deflection angle.

As is apparent from equation (1) above, the mass of the movable plate 202 influences the resonant frequency.

In order to increase the scanning speed of light reflected by the optical scanner without changing the maximum deflection angle, the mass of the movable plate 202 may be decreased to increase the resonant frequency of the optical scanner.

If the material for the movable plate 202 is changed from silicon to a polyimide, the mass of the movable plate 202 decreases, and hence the resonant frequency increases.

If, however, the material for the movable plate 202 is changed from silicon to a polyimide, the difference in strength between the movable plate 202 and the leaf spring portion 208 decreases as compared with the case wherein silicon is used for the movable plate 202.

This is because the relative strength of the leaf spring portion 208 which supports the movable plate 202 increases.

In consideration of the manufacturing process by integral formation, it is difficult for a polyimide film to attain the thickness (300 to 500 μm) of a general silicon substrate. For this reason, the difference in strength between the movable plate 202 and the leaf spring portion 208 is reduced, and the movable plate 202 may deform during vibration.

Such a problem can be solved by reducing the rigidity of the leaf spring portion 208 to increase the difference in strength between the movable plate 202 and the leaf spring portion 208.

The strengths of the movable plate 202 and the leaf spring portion 208 are expressed by rigidities, and the rigidity of a rectangular parallelepiped member is expressed by:

$$G = E \cdot b \cdot h^3 / 12 \quad (4)$$

where G is the rigidity, E is the Young's modulus, b is the width, and h is the thickness.

As is apparent from equation (4), the difference in strength can be increased by increasing the difference in thickness between the movable plate 202 and the leaf spring portion 208.

In consideration of the limit of the formation of a thick polyimide film, the thickness of the leaf spring portion 208 is preferably reduced.

As is apparent from equation (1) above, when both the mass of the movable plate 202 and the rigidity of the leaf spring portion 208 are decreased, the influences of the decreases in mass and rigidity on the resonant frequency cancel each other out. As a result, no great influence is exerted on the resonant frequency.

As is apparent from equation (3) above, the decrease in the rigidity of the leaf spring portion 208 exerts a noticeable influence on changes in deflection angle.

As the rigidity of the leaf spring portion 208 decreases, the deflection angle can be increased.

According to another modification of this embodiment, the second polyimide layer 207 and the third polyimide layer 209 need not be formed.

In this structure, however, since the flat coil 205 is directly exposed to the atmosphere, the optical scanner is preferably used in a vacuum to prevent an anomalous discharge between the coil portion.

According to still another modification of this embodiment, the flat coil 205 may be formed by plating.

In order to exert a large force onto the structure, it is preferable that the number of turns of the flat coil 205 be increased, and the coil be finely processed.

If, however, the number of turns of the flat coil 205 is increased without changing its size, the width of the wiring layer of the coil decreases to increase the wiring resistance. As a result, the temperature of the optical scanner rises.

The strength characteristics of the leaf spring portion 208 are changed by this rise in temperature. As a result, the resonant frequency may become unstable.

In order to solve this problem, the thickness of the coil is preferably increased.

An aluminum coil pattern formed by using an electrolytic plating, sputtering, and etching is used as a seed layer to form a plating metal film.

According to still another modification of this embodiment, similar to the structure shown in FIG. 6, the shape of the support member 201 may be changed to surround the movable plate 202, and the permanent magnet 211 may be fixed to the support member 201.

The mounting portion for the permanent magnet is cut by about 20 μm by dry etching. The bonding surface of the permanent magnet is coated with an adhesive or the like and bonded to the etched portion.

In this structure, since the mounting position of the permanent magnet 211 is specified by etching, the perma-nent magnet 211 can always be mounted at the same position. In addition, the permanent magnet 211 can be easily mounted to shorten the time required for mounting.

<Third Embodiment>

An optical scanner according to the third embodiment of the present invention will be described with reference to FIGS. 10, 11, and 12A to 12J.

Figure 11:
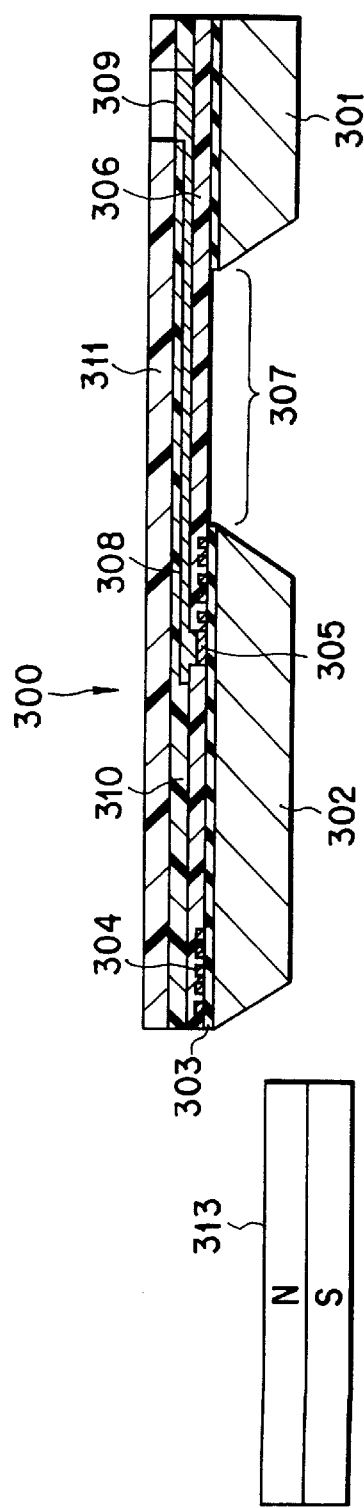
FIG. 11 is a sectional view taken along a line XI—XI of the optical scanner in FIG. 10.
Figure 10:
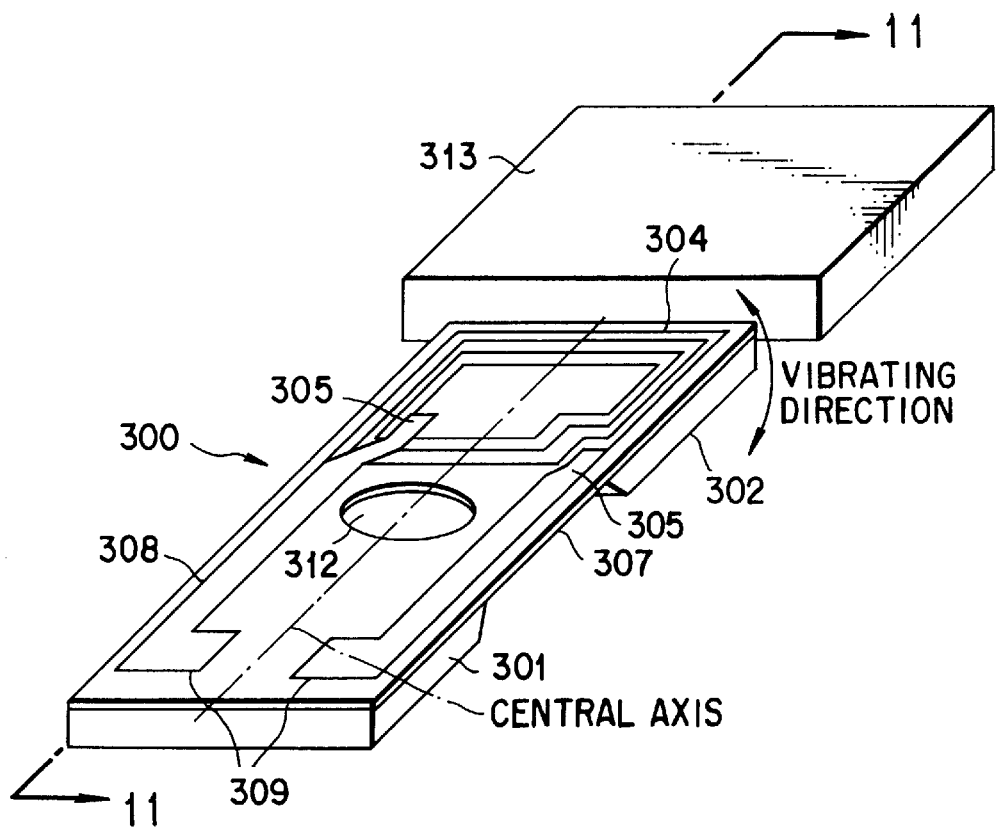
FIG. 10 is a perspective view showing the structure of an optical scanner according to the third embodiment of the present invention.

As shown in FIGS. 10 and 11, the optical scanner includes a structure 300 and a permanent magnet 313.

The structure 300 is integrally formed by using the semiconductor manufacturing technique. A support member 301 and a movable plate 302 are formed from a single substrate.

A single-crystal silicon substrate having a (100) plane is used for this substrate.

Silicon nitride films 303 are formed on the silicon substrate.

A flat coil 304 is formed on the silicon nitride film 303 on the movable plate 302.

The flat coil 304 is obtained by forming an aluminum film by sputtering and etching the film.

Contact pads 305 for contact with wiring layers 308 are arranged on the two end portions of the flat coil 304.

A first polyimide layer 306 is formed on the silicon nitride film 303 to couple the support member 301 to the movable plate 302.

The wiring layers 308 are formed on the first polyimide layer 306. One end of the wiring layer 308 is connected to the contact pad 305, while the other end is located on the support member 301. An aluminum electrode pad 309 is formed on the other end of each wiring layer 308.

A second polyimide layer 310 is formed on the first polyimide layer 306.

The second polyimide layer 310 covers the wiring layers 308 except for the electrode pads 309 and functions as an insulating film, and also serves to reduce the level differences between the first polyimide layer 306 and the wiring layers 308.

A third polyimide layer 311 is formed on the second polyimide layer 310.

The first polyimide layer 306, the second polyimide layer 310, and the third polyimide layer 311 which are located between the support member 301 and the movable plate 302 constitute a leaf spring portion 307 for supporting the movable plate 302 to allow it to vibrate with respect to the support member 301.

The third polyimide layer 311 is formed to adjust the rigidity of the leaf spring portion 307. By adjusting the thickness of the third polyimide layer 311, a leaf spring portion 307 having a desired rigidity can be obtained.

The third polyimide layer 311 is not formed on the electrode pads 309. That is, the electrode pads 309 are exposed and hence can be electrically connected to external parts.

Note that if a leaf spring portion 307 having a desired rigidity can be obtained by using the first and second polyimide layers, the third polyimide layer need not be formed.

A through hole 312 is formed in the leaf spring portion 307.

In order to realize a one-dimensional scanning operation with high linearity, the center of the through hole 312 is preferably located in the middle of the leaf spring portion 307 in the widthwise direction, and the through hole 107 preferably has a shape symmetrical about a central axis perpendicular to the widthwise direction.

In addition, the through hole 312 is preferably shaped to prevent stress from concentrating on a specific portion upon displacement of the movable plate 105.

For the above reasons, the through hole 312 preferably has a circular shape, an elliptic shape, or a polygonal shape with round corners.

A permanent magnet 313 is positioned such that its direction of magnetization is roughly parallel to the vibrating direction of the movable plate 302, and the distal end of the permanent magnet upper portion is set at an arbitrary position at about 45° in the upward or downward direction with respect to the flat coil 304 located at the distal end portion of the movable plate 302.

A method of manufacturing the structure 300 of the optical scanner of this embodiment will be described next with reference to FIGS. 12A to 12J.

Figure 12A:
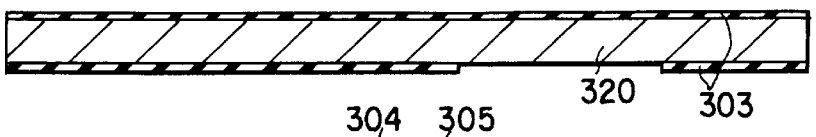
FIGS. 12A to 12J are sectional views for explaining the manufacturing process for the structure of the optical scanner in FIGS. 10 and 11.

As shown in FIG. 12A, a silicon substrate 320 having a (100) plane is cleaned first, and silicon nitride films 303 are then formed on the surfaces of the silicon substrate 320 by using a low-pressure CVD apparatus.

The silicon nitride film 303 on the upper surface serves as an insulting film between a flat coil 304 to be formed on the silicon nitride film 303, and the silicon substrate 320.

The silicon nitride film 303 on the lower surface is partially removed and patterned by dry etching. The patterned silicon nitride film 303 servers as a mask to be used when a support member 301 and a movable plate 302 are formed from the silicon substrate 320.

Figure 12B:

As shown in FIG. 12B, a flat coil 304 is formed on the silicon nitride film 303 on the upper surface.

The flat coil 304 is obtained by forming an aluminum film by sputtering and patterning the film by etching.

Contact pads 305 for contact with wiring layers 308 are formed on the two end portions of the flat coil 304.

Figure 12C:
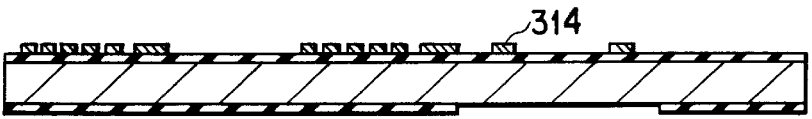

As shown in FIG. 12C, a mask 314 used to form a through hole 312 in a leaf spring portion 307 afterward is formed.

The mask 314 is formed by pattering a sputtered aluminum film by a lift-off method or the like.

Figure 12D:
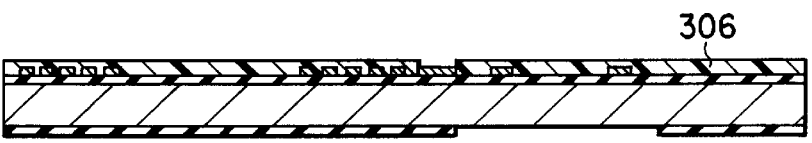

As shown in FIG. 12D, a first polyimide layer 306 is formed on the silicon nitride film 303 on the upper surface to cover the flat coil 304 and the mask 314.

The first polyimide layer 306 is formed by coating the silicon substrate with a polyimide solution, uniformly forming a polyimide film by printing or spin coating, and sintering the film.

Subsequently, the portions of the first polyimide layer 306 which are located on the contact pads 305 are removed by etching.

Figure 12E:

As shown in FIG. 12E, wiring layers 308 are formed on the first polyimide layer 306.

Each wiring layer 308 is formed by patterning a sputtered aluminum film by etching.

Thereafter, sputtering of aluminum and patterning may be performed again to increase the thickness of the aluminum film of each electrode pad 309 on the support member 301, as needed.

Figure 12F:
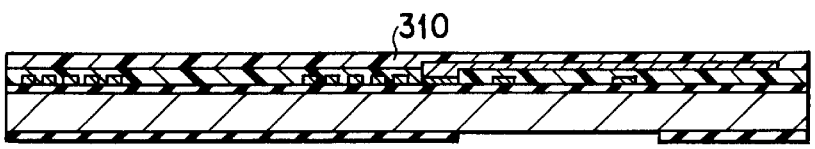

As shown in FIG. 12F, a second polyimide layer 310 is formed on the first polyimide layer 306.

Similar to the first polyimide layer 306, the second polyimide layer 310 is formed by coating the first polyimide layer 306 with a polyimide solution, uniformly forming a polyimide film by printing or spin coating, and sintering the film.

Figure 12G:

As shown in FIG. 12G, the third polyimide layer 311 is formed on the second polyimide layer 310.

Similar to the first polyimide layer 306, a third polyimide layer 311 is formed by coating the second polyimide layer 310 with a polyimide solution, uniformly forming a polyimide film by printing or spin coating, and sintering the film.

In order to increase the rigidity of the leaf spring portion 307, the third polyimide layer 311 is formed to be thicker than the first polyimide layer 306 and the second polyimide layer 310.

Figure 12H:

As shown in FIG. 12H, the portions of the second polyimide layer 310 and the third polyimide layer 311 which are located on the electrode pads 309 and correspond to a through hole 312 to be formed are removed by dry etching.

Figure 12I:
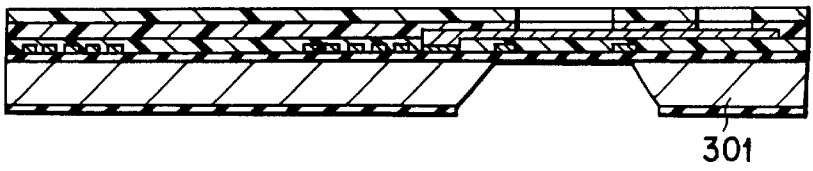

As shown in FIG. 12I, the support member 301 and the movable plate 302 are formed from the silicon substrate 320.

The silicon substrate 320 is anisotropically etched from its lower surface side by using an alkaline solution and the patterned silicon nitride film 303 on the lower surface of the silicon substrate 320 as a mask, thereby forming a support member 301 and a movable plate 302.

In this case, the silicon nitride film 303 under the first polyimide layer 306 serves as a masking layer for protecting the first polyimide layer 306 when the silicon substrate 320 is etched to form a through hole therein.

Figure 12J:

As shown in FIG. 12J, the silicon nitride film 303 serving as a mask layer for the first polyimide layer 306 is removed by dry etching after the silicon substrate 320 is etched.

When the silicon nitride film 303 is removed, the aluminum mask 314 appears.

The first polyimide layer 306 is removed by using this mask 314 to form the through hole 312.

Subsequently, the mask 314 is removed by etching, and the structure 300 of the optical scanner of this embodiment described above can be obtained.

The operation of the optical scanner of this embodiment will be described next.

Alternating currents are supplied from a power supply (not shown) to the flat coil 304 through the electrode pads 309.

The current flowing in the flat coil 304 interacts with the magnetic field generated by the permanent magnet 313 placed near the free end of the structure 300. As a result, the flat coil 304, especially its portion near the free end of the structure 300, receives the resultant force.

Since the current flowing in the flat coil 304 is an alternating current, the direction in which the flat coil 304 receives the force periodically changes, and the movable plate 302 vibrates in the direction of thickness.

The resonant frequency of the vibration of the structure 300 is uniquely determined by the shapes and materials of the movable plate 302 and the leaf spring portion 307. When the alternating current supplied to the flat coil 304 has the same frequency as the resonant frequency, the vibration of the movable plate 302 has the maximum amplitude.

This resonant frequency, the gain at the time of resonance, and the deflection angle of the movable plate 302 are approximately given by equations (1), (2), and (3) described above. These equations are used as models for actual design.

The light reflected by the movable plate 302 is reciprocally scanned at a deflection angle twice that of the movable plate 302.

According to the optical scanner of this embodiment, since the structure 300 is integrally formed, no assembly step is required for this structure. Ultra-compact optical scanners can be mass-produced at a low cost.

In addition, since the structure 200 is formed by using the semiconductor manufacturing technique, a very high dimensional precision can be ensured. The characteristics of the optical scanner are free from aging due to errors between the actual dimensions and the design values.

The direction of the scanner in use is not fixed, and the scanner must be so designed as to be used in any direction. The problem in this case is that the vibrating portion of the optical scanner is twisted depending on the direction of the optical scanner. In this embodiment, an analysis of this problem has led to the finding that the formation of the through-hole 312 in the middle of the leaf spring portion 307 can realize a structure which is resistant to the twist and provides a large deflection angle. With the provision of the through-hole 312, the strength characteristics of the leaf spring portion 307 are improved.

Note that since stress concentrates on the four corners of the through hole 312, the four corners have curvatures to disperse the stress around the corners.

By using a polyimide as an organic insulating material for the leaf spring portion 307, the leaf spring portion 307 is resistant to brittle fracture and attains a large deflection angle while maintaining the minimum necessary strength.

Since the flat coil 304 and the wiring layers 308 are formed in the polyimide film, they are almost free from aging due to humidity.

In addition, the polyimide film properly insulates the wire portions of the flat coil 304 from each other and the flat coil 304 from the wiring layer 308 which extends thereon, thereby improving the performance of the optical scanner.

As is apparent, each arrangement of this embodiment can be variously modified and changed.

FIG. 13 shows a modification of this embodiment.

As shown in FIG. 13, the movable plate 302 is formed by using an organic film such as a polyimide layer.

Since the movable plate 302 consisting of a polyimide is smaller in mass than a plate consisting of silicon, an optical scanner using this plate can realize a large deflection angle.

The following description concerns the relationship between the mass of the movable plate 302 and the deflection angle.

As is apparent from equation (1) above, the mass of the movable plate 302 influences the resonant frequency.

In order to increase the scanning speed of light reflected by the optical scanner without changing the maximum deflection angle, the mass of the movable plate 302 may be decreased to increase the resonant frequency of the optical scanner.

If the material for the movable plate 302 is changed from silicon to a polyimide, the mass of the movable plate 302 decreases, and hence the resonant frequency increases.

If, however, the material for the movable plate 302 is changed from silicon to a polyimide, the difference in strength between the movable plate 302 and the leaf spring portion 307 decreases as compared with the case wherein silicon is used for the movable plate 302.

This is because the relative strength of the leaf spring portion 307 which supports the movable plate 302 increases.

In consideration of the manufacturing process by integral formation, it is difficult for a polyimide film to attain the thickness (300 to 500 μm) of a general silicon substrate. For this reason, the difference in strength between the movable plate 302 and the leaf spring portion 307 is reduced, and the movable plate 302 may deform during vibration.

Such a problem can be solved by reducing the rigidity of the leaf spring portion 307 to increase the difference in strength between the movable plate 302 and the leaf spring portion 307.

The strengths of the movable plate 302 and the leaf spring portion 307 are expressed by rigidities, and the rigidity of a rectangular parallelepiped member is expressed by equation (4) above.

As is apparent from equation (4), the difference in strength can be effectively increased by increasing the difference in thickness between the movable plate 302 and the leaf spring portion 307.

In consideration of the limit of the formation of a thick polyimide film, the thickness of the leaf spring portion 208 is preferably reduced.

As is apparent from equation (1) above, when both the mass of the movable plate 302 and the rigidity of the leaf spring portion 307 are decreased, the influences of the decreases in mass and rigidity on the resonant frequency cancel each other out. As a result, no great influence is exerted on the resonant frequency.

As is apparent from equation (3) above, the decrease in the rigidity of the leaf spring portion 307 exerts a noticeable influence on changes in deflection angle.

As the rigidity of the leaf spring portion 307 decreases, the deflection angle can be increased.

According to another modification of this embodiment, the flat coil 304 may be formed by plating.

In order to exert a large force onto the structure, it is preferable that the number of turns of the flat coil 304 be increased, and the width of each wire portion be small.

If, however, the number of turns of the flat coil 304 is increased without changing its size, the width of each wire portion of the coil decreases to increase the wiring resistance. As a result, the temperature of the optical scanner rises.

The strength characteristics of the leaf spring portion 208 are changed by this rise in temperature. As a result, the resonant frequency may become unstable.

In order to solve this problem, the thickness of the flat coil 304 is preferably increased.

An aluminum coil pattern formed by using an electrolytic plating, sputtering, and etching is used as a seed layer to form a plating metal film.

FIG. 14 shows still another embodiment of this embodiment.

As shown in FIG. 14, the support member 301 is shaped to surround the movable plate 302, and the permanent magnet 313 is mounted on the support member 301.

The portion of the support member 301 on which the permanent magnet 313 is mounted is cut to a depth of about 20 μm by dry etching. The permanent magnet 313 is fixed to this portion by bonding.

In this structure, since the mounting position of the permanent magnet 313 is specified by etching, the permanent magnet 313 can always be mounted at the correct position. In addition, the permanent magnet 313 can be easily mounted to shorten the time required for mounting.

Experiments using the optical scanner of this embodiment will be described next.

FIGS. 15 and 16 show the dimensions of the structure of the optical scanner used in the experiment.

Figure 17:
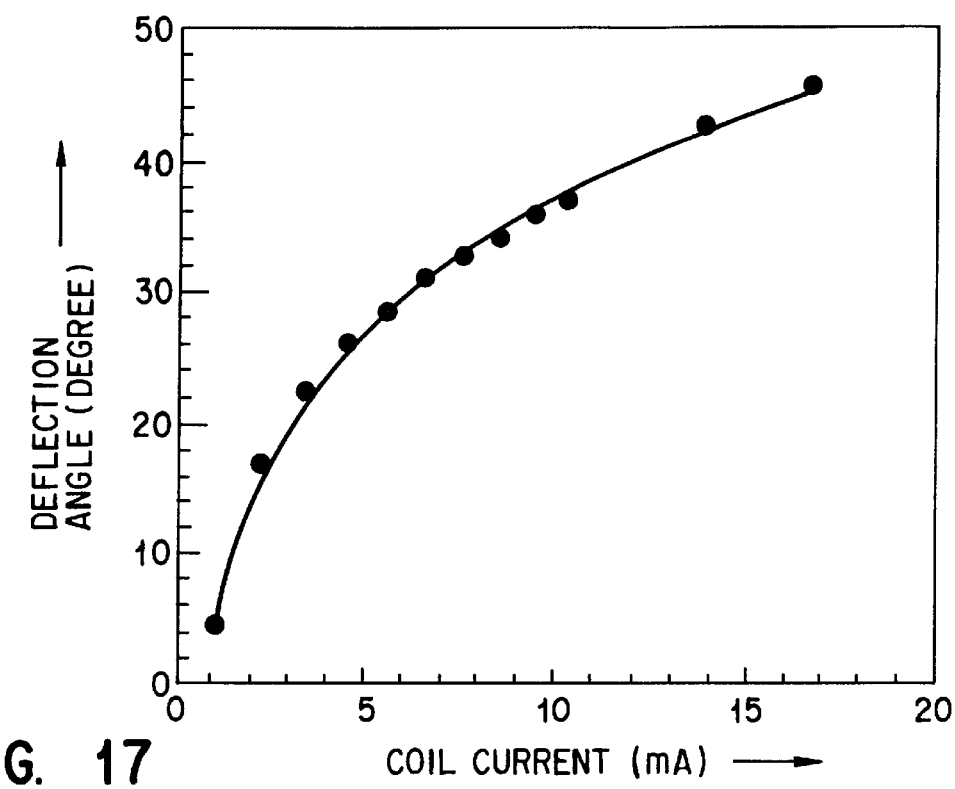
FIG. 17 is a graph showing the relationship between the current flowing in a flat coil and the deflection angle of an optical scanner.
Figure 18:
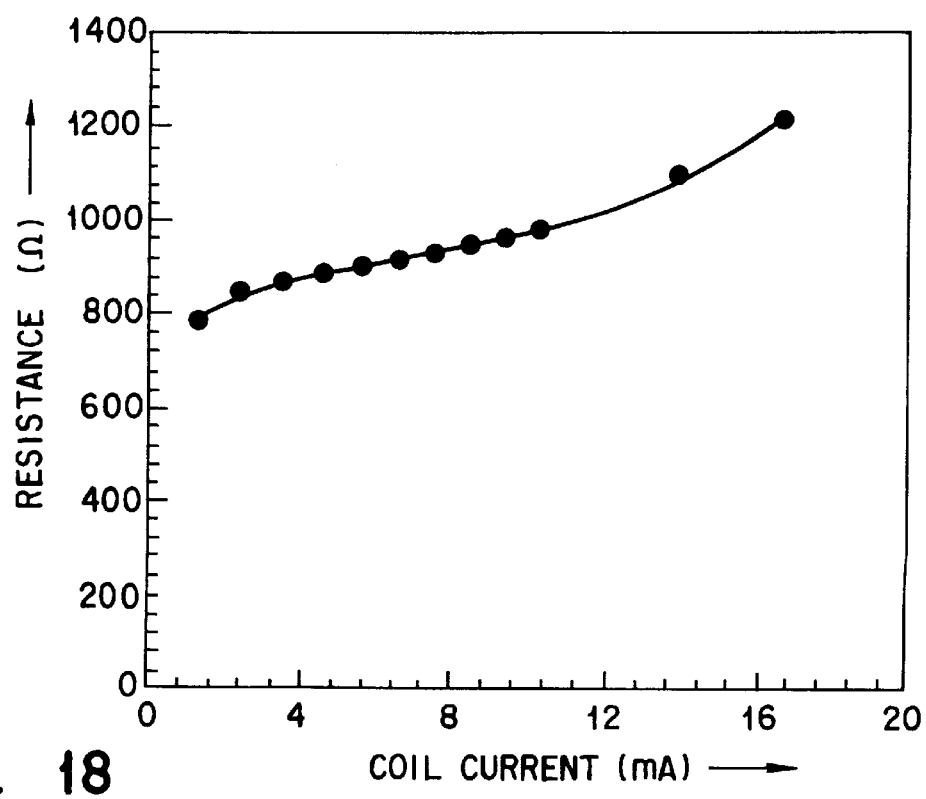
FIG. 18 is a graph showing the relationship between the current flowing in the flat coil and the electric resistance of the flat coil while a movable plate is not vibrated.

FIG. 17 shows the relationship between the current and the deflection angle of the optical scanner in a case wherein a rectangular wave generated by a pulse generator and having the same frequency as the resonant frequency is supplied to the flat coil. FIG. 18 shows the relationship between the current and the electric resistance of the flat coil in a state wherein the optical scanner is not vibrated.

As shown in FIG. 17, it was found that the deflection angle of this optical scanner reaches about 40° with a current value of 10 mA. As a result, the angle at which light was scanned reached about 80°.

The following knowledge was obtained throughout the experiments.

It was found from FIG. 17 that as the power consumption increases, the rate of increase in deflection angle gradually decreases, and the resistance of the flat coil gradually increases.

It was also confirmed by another experiment that heat is generated by the flat coil as the power consumption increased.

As shown in FIG. 18, the reason why the resistance of the flat coil increases as the power consumption increases may be that the amount of heat generated by the flat coil increases as the power consumption increases.

As shown in FIG. 17, it is taken for granted that the rate of increase in deflection angle with the increase in the amount of current decreases because the leaf spring portion is affected by the heat generated by the flat coil to change the resonant frequency of the leaf spring portion.

In this experiment, since a pulse generator was used as a power supply, changes in resonant frequency could not be properly handled.

It was found from the experiment result that when the maximum current value in the optical scanner used in the experiments was set to 10 mA or less, the strength of the leaf spring portion was preferably reduced to increase the deflection angle above the angle in the experiments.

<Fourth Embodiment>

An optical scanner according to the fourth embodiment of the present invention will be described with reference to FIGS. 19 to 21.

In this embodiment, the optical scanner of the third embodiment further incorporates a strain gage, thereby providing an optical scanner in which a self-oscillation circuit is designed such that vibrations are monitored by detecting the strain amount to always allow a movable plate having a reflecting surface to vibrate at the resonant frequency.

An outline of this embodiment will be described first.

As described, in the optical scanner of the present invention, a movable plate 402 is vibrated by the interaction between the magnetic field generated by a permanent magnet 414 and the alternating current flowing in a flat coil 405.

The amplitude of the vibration of the movable plate 402 depends on the relationship between the resonant frequency of the vibration of a structure 400, which is uniquely determined by the shapes and materials of the movable plate 402 and a leaf spring portion 403, and the frequency of the alternating current flowing in the flat coil 405. This amplitude is maximized when the frequency of the alternating current is equal to the resonant frequency.

In this optical scanner, in order to maximize the deflection angle, the movable plate 402 is vibrated at the resonant frequency.

However, the resonant frequency of the optical scanner slightly changes when the scanner is used for a long time or the operation environment changes.

In order to correct this, strain gages 401 are integrally formed in the leaf spring portion 403 to detect the strain amounts, and form a self-oscillation circuit.

With this arrangement, the optical scanner of this embodiment can always be driven at the resonant frequency.

Figure 19:
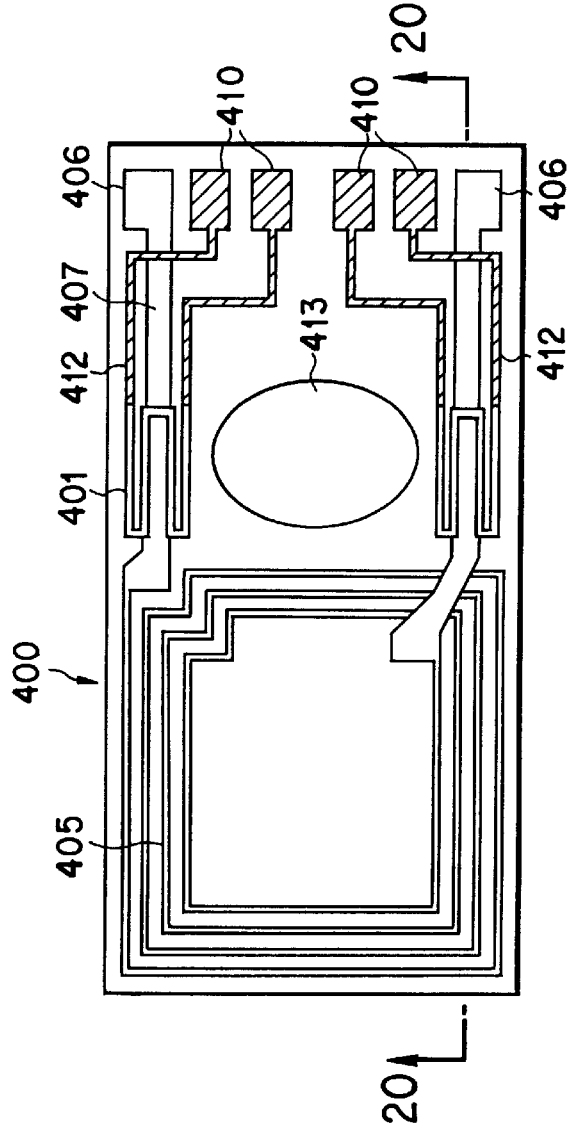
FIG. 19 is a top view showing the structure of an optical scanner according to the fourth embodiment of present invention.
Figure 20:
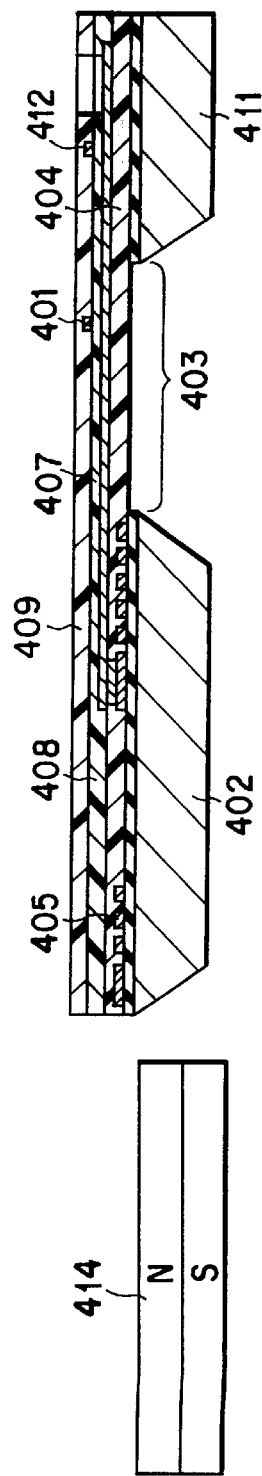
FIG. 20 is a sectional view taken along a line XX—XX of the structure of the optical scanner in FIG. 19.

As shown in FIGS. 19 and 20, the leaf spring portion 403 of the structure 400 is constituted by a first polyimide layer 404, wiring layers 407, a second polyimide layer 408, and a third polyimide layer 409.

The strain gages 401 are formed between the second polyimide layer 408 and the third polyimide layer 409 on the leaf spring portion 403.

The strain gages 401 are formed by folding sputtered aluminum films a plurality of numbers of times in a direction parallel to the wiring layers 407 by etching.

Signal output pads 410 are formed on the second polyimide layer 408 on a support member 411. Wiring layers 412 extending from the strain gages 401 to the signal output pads 410 are formed on the second polyimide layer 408.

The dimensions of each strain gage 401 must be determined by analytically calculating a resistance value required for measurement in consideration of the influences of the strength of the leaf spring portion 403.

The signal output pads 410 and the wiring layers 412 are preferably formed to have small resistances to prevent noise in the value measured by the strain gage 401.

For this reason, the thicknesses of the strain gages 401, the wiring layers 412, and the signal output pads 410 are independently set.

The strain gages 401 are formed on the two sides of a through hole 413 at positions separated from a central axis perpendicular to the widthwise direction of the leaf spring portion 403 by the same distance to prevent unstable one-dimensional vibrations.

Since only one strain gage 401 needs to be used in practice, the other strain gage 401 is left as a spare part.

The signals detected by these two strain gages may be compared with each other to monitor the torsion (mode).

The operation of this embodiment will be described next.

The strain amount of the leaf spring portion 403 is measured by the strain gage 401.

Figure 21:
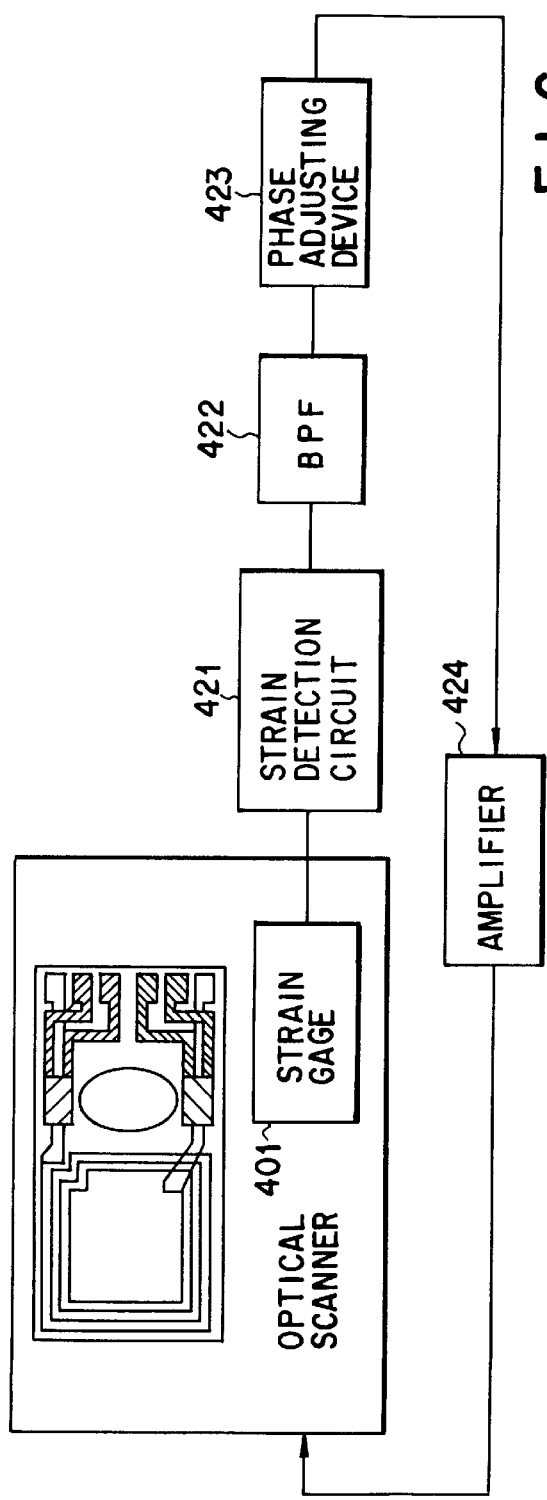
FIG. 21 is a block diagram showing a driving circuit for the optical scanner using the structure in FIG. 19.

As shown in FIG. 21, the signal obtained by the strain gage 401 is amplified by a strain detection circuit 421.

The signal output from the strain detection circuit 421 is an AC signal. If, for example, the input wave is a sin wave, the signal output from the strain detection circuit 421 is also a sin wave.

The output signal from the strain detection circuit 421 is input to a BPF (Band Pass Filter) 422, and noise signals other than signals having frequencies near the resonant frequency are removed.

The phase of the signal which has passed through the BPF 422 is adjusted by a phase adjusting device 423.

The phase adjusting device 423 corrects any phase shift of the output waveform with respect to the input waveform while the optical scanner is vibrating at the resonant frequency, and outputs the resultant signal to an amplifier 424.

The amplifier 424 also serves as a power supply. The maximum voltage value of the power supply is defined to maintain the deflection angle of the movable plate 402 constant at the time of resonance.

The strain detection circuit 421, the BPF 422, the phase adjusting device 423, and the amplifier 424 constitute a self-oscillation circuit. With this circuit, the movable plate 402 is always vibrated at the resonant frequency.

According to the optical scanner of this embodiment, since the structure 400 incorporating the strain gages 401 for detecting the resonant frequency is integrally formed, no assembly step is required for this structure. Ultra-compact optical scanners can be mass-produced at a low cost.

In addition, since the structure 400 is formed by using the semiconductor manufacturing technique, a very high dimensional precision can be ensured. The characteristics of the optical scanner are free from aging due to errors between the actual dimensions and the design values.

As is apparent, each arrangement of this embodiment can be variously modified and changed.

This embodiment may be applied to any other embodiments described above.

That is, the strain gages 401 may be arranged on the leaf spring portion of the structure of the optical scanner of each of the above embodiments described above to form a self-oscillation circuit.

The first to fourth embodiments of the present invention described above include the following devices.

(1) An optical scanner including:

a support member for fixing the scanner to a given member;

a movable plate having at least one surface serving as a reflecting surface for reflecting light;

an elastic member which connects the support member to the movable plate while allowing the movable plate to have single-degree-of-freedom;

a coil having at least one side formed on the movable plate; and a permanent magnet placed near the movable plate and having a magnetic field component parallel to a direction from the movable plate to the support member, the optical scanner being designed to supply an alternating current to the coil to vibrate the movable plate with a connecting portion between the elastic member and the support member serving as a fixed end, characterized in that the elastic member incorporates an electric element, and is an insulating elastic film extending over the movable plate and the support member.

(Corresponding Embodiment of Present Invention)

The first, second, and third embodiments

In the optical scanner according to aspect (1) of the present invention, the coil corresponds to the flat coil in each of the above embodiments.

In addition, the electric element is a general term for a flat coil, an electric wiring layer, an electrode, a strain gage, and the like.

(Operation)

When an alternating current is supplied to a flat coil, the flat coil formed at the distal end of the movable plate generates a force based the interaction between the current and the magnetic field generated by the magnet placed near the flat coil. As a result, the movable plate vibrates with the connecting portion between the elastic member and the support member serving as a fixed end.

By supplying an alternating current having the same frequency as the resonant frequency of the optical scanner, the amplitude of the resultant one-dimensional vibration is maximized at that current value.

(Effect)

Since electric elements such as a flat coil are formed in the insulating elastic film, the electric elements are almost free from aging due to humidity. In addition, the electric elements and the flat coil wiring layers can be effectively insulated from each other.

Furthermore, peeling, disconnection, and the like caused by vibrations can be prevented.

(2) In the optical scanner according to aspect (1) of the present invention, the electric elements include a coil and electrodes electrically connected thereto, the coil is formed to surround the area extending from the movable plate to the support member, and the electrodes are formed on the support member.

(Corresponding Embodiment of Present Invention)

The first and second embodiments (Operation/Effect)

In the optical scanner according to aspect (2) of the present invention, the coil is a flat coil surrounding the area, inside the elastic member, which extends from the movable plate to the leaf spring portion (the portion between the support member for the elastic member and the movable plate) and the support member.

In this structure, therefore, only the coil portion formed parallel to the end portion of the movable plate is influenced by the magnetic flux generated by the permanent magnet (the force exerted on the coil portion formed on the support member has no influence on vibrations because the support member is fixed). For this reason, the vibrations are stabilized, and modes other than the longitudinal vibration mode are hardly generated.

In addition, since wiring layers other than the coil are not required, the manufacturing process is simple, and high productivity can be ensured.

(3) In the optical scanner according to aspect (1) of the present invention, the electric elements include a coil, electrodes, and wiring layers for electrically connecting the coil to the electrodes, the coil surrounds the movable plate, and the wiring layers are formed to extend in the leaf spring portion between the support member for the elastic member and the movable plate to electrically connect the coil to the electrodes.

(Corresponding Embodiment of Present Invention)

The modifications of the first embodiment and the third embodiment (Operation/Effect)

Since the wiring layers are formed in the leaf spring portion instead of a coil, the influences of the electric elements on the leaf spring portion can be easily controlled.

In addition, since the coil wiring layer is short, and the overall electric resistance of the coil is low, the power consumption of the optical scanner can be reduced.

(4) In the optical scanner according to aspect (2) or (3) of the present invention, strain gages and wiring layers for connecting signal extracting electrodes to electrodes for extracting signals from the strain gages are formed in the insulating elastic film.

(Corresponding Embodiment of Present Invention)

The fourth embodiment (Operation/Effect)

Since an optical scanner incorporating strain gages for detecting the resonant frequency can be integrally formed, no assembly step is required, and ultra-compact optical scanners can be mass-produced.

In addition, if a semiconductor manufacturing technique is used, high dimensional precision can be ensured in spite of an ultra-compact optical scanner. The optical scanner is hardly subjected to unstable vibrations due to a problem in the manufacturing process.

(5) In any one of the optical scanners according to aspects (2), (3), and (4) of the present invention, the insulating elastic film consists of an organic material.

(Corresponding Embodiment of Present Invention)

The first, second, and third embodiments (Operation/Effect)

Since the organic material is used as the insulating elastic film for the leaf spring portion, the leaf spring portion is more resistant to brittle fracture than a leaf spring portion using an inorganic material such as silicon. This leaf spring portion therefore allows a large deflection angle while maintaining the minimum necessary strength.

(6) In the optical scanner according to aspect (5) of the present invention, the organic film forming the leaf spring portion is integrally formed to cover the movable plate and the support member, the coil is a flat coil formed by the semiconductor manufacturing technique to surround the areas in the elastic film and the leaf spring portion on the movable plate and the area in the elastic film on the support member, and the electrodes are those formed by the semiconductor manufacturing technique in the organic film formed on the support member, electrically and directly connected to the flat coil, and used to connect wiring layers for external connections.

(Corresponding Embodiment of Present Invention)

The second embodiment (Operation/Effect)

In this structure, since the optical scanner can be integrally formed, no assembly step is required. Ultra-compact optical scanners can therefore be mass-produced.

In addition, since the semiconductor manufacturing technique is applied, the dimensional precision of the ultra-compact optical scanner is high, and the vibrations of the optical scanner hardly become unstable due to problems in the manufacturing process.

(7) In the optical scanner according to aspect (5) of the present invention, an organic film forming the leaf spring portion is integrally formed on the movable plate and the support member by the semiconductor manufacturing technique, the coil is a flat coil integrally formed in the insulating elastic film formed on the movable plate by the semiconductor manufacturing technique, and the electrodes are those formed in the organic film formed on the support member by the semiconductor manufacturing technique and serving to connect wiring layers.

(Corresponding Embodiment of Present Invention)

The third embodiment (Operation/Effect)

With this structure, since the optical scanner is integrally formed, no assembly step is required. Ultra-compact optical scanners can therefore be mass-produced.

Since the semiconductor manufacturing technique is applied, the dimensional precision of the ultra-compact optical scanner is high. The vibrations of the optical scanner hardly become unstable due to problems in the manufacturing process.

(8) In the optical scanner according to aspect (6) or (7) of the present invention, the movable plate and the support member are integrally formed from a single substrate by the semiconductor manufacturing technique.

(Corresponding Embodiment of Present Invention)

The second and third embodiments (Operation/Effect)

In this structure, the main portions (the support member, the movable plate, the leaf spring portion, and the electric elements) of the optical scanner can be integrally formed by using a single substrate. No assembly step is therefore required, and ultra-compact optical scanners can be mass-produced.

In addition, since the semiconductor manufacturing technique is applied, the dimensional precision of the ultra-compact optical scanner is high, and the vibrations of the optical scanner hardly become unstable due to problems in the manufacturing process.

According to the first to fourth embodiments of the present invention, the deflection angle of the optical scanner can be set to be large, and the electric elements such as the flat coil and the wiring layers have high durability. Compact optical scanners can be mass-produced at a low cost. In addition, an optical scanner which has strain gages and can scan at a stable deflection angle can be obtained.

(Fifth Embodiment)

The fifth embodiment of the present invention will be described in detail next with reference to the accompanying drawings.

FIGS. 22 to 27 show an optical scanner according to the fifth embodiment of the present invention and its modification.

The optical scanner of this embodiment is designed to scan light two-dimensionally.

Figure 22:
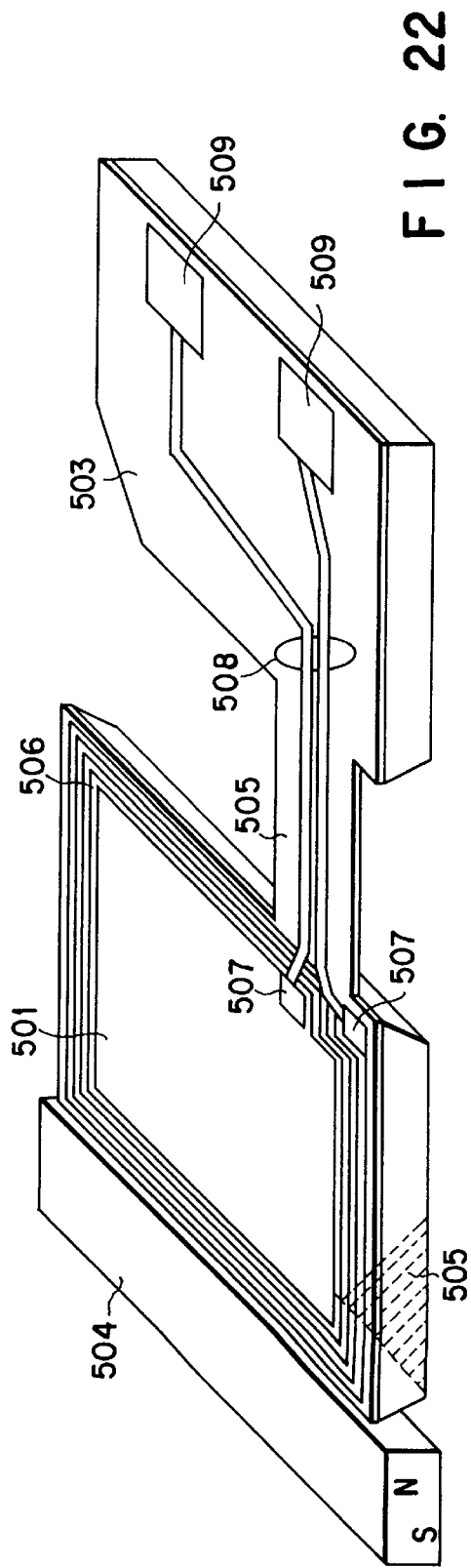
FIG. 22 is a perspective view showing the structure of an optical scanner according to the fifth embodiment of the present invention.
Figure 23A:
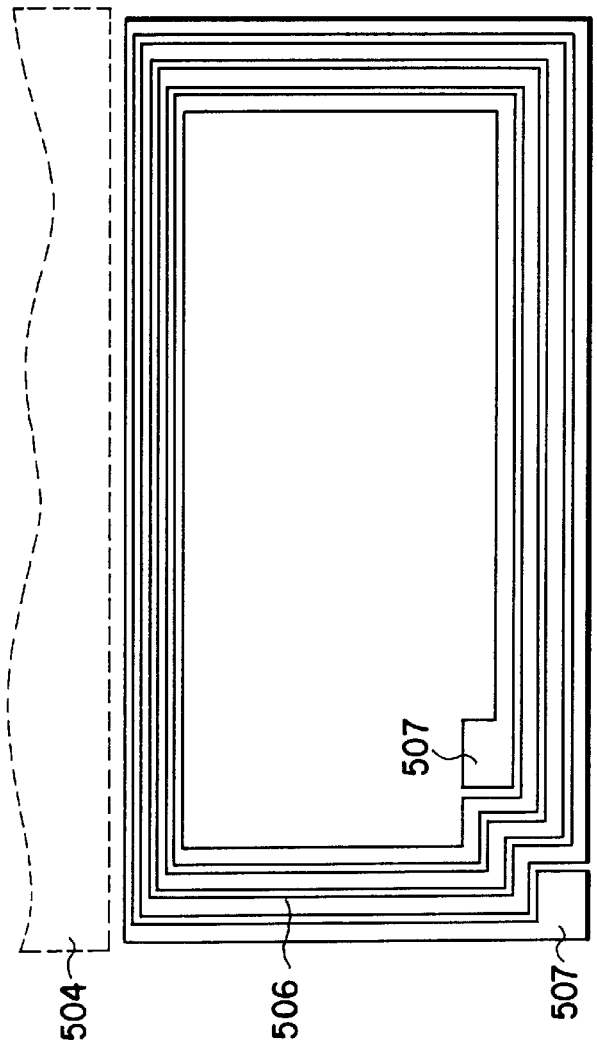
FIGS. 23A and 23B are a plan view and a sectional view, respectively, showing the structure of a driving coil in the fifth embodiment of the present invention.
Figure 23B:
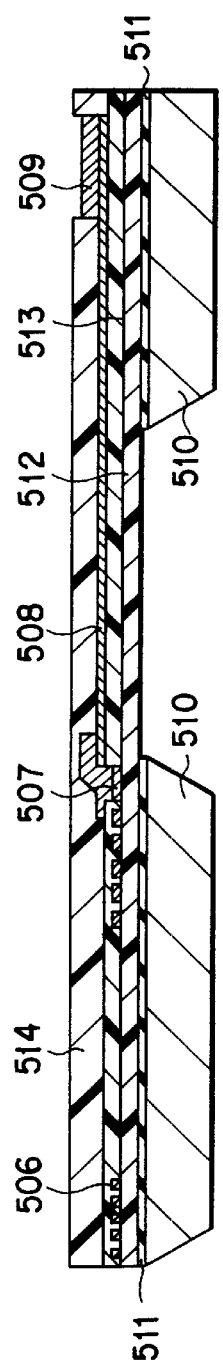

FIG. 22 is a perspective view showing this optical scanner. FIG. 23A shows a driving coil used in the optical scanner. FIG. 23B is a sectional view of the optical scanner. FIGS. 24A to 24E and FIGS. 25A to 25D are sectional views showing the steps in manufacturing the optical scanner.

The optical scanner of the fifth embodiment has the following structure.

This optical scanner comprises a movable plate 501, an elastic member 502, a support member 503, a permanent magnet 504, and a driving coil 506.

A reflecting surface 505 for reflecting light is formed on the movable plate 501. The lower surface of the movable plate 501 in FIG. 22 corresponds to the reflecting surface 505.

As a main material for the movable plate 501, a material which can prevent the reflecting surface 505 from deforming during vibrations is required. As the main material for the movable plate 501, therefore, single-crystal silicon as a high-rigidity material is used.

The remaining materials used for the movable plate 501 include silicon nitride, aluminum, polyimides, and the like.

More specifically, the silicon nitride is used as a mask material in manufacturing the optical scanner. The aluminum is used as a material for the wiring layers of the driving coil 506 and contact pads 507 formed at the start and end points of the driving coil 506. In some case, the aluminum is used as a mirror material for the reflecting surface 505.

The polyimide is used to form films that vertically sandwich the driving coil 506 to insulate the wiring layers from each other and prevent the electric elements including the contact pads 507 from being exposed to the atmosphere.

The elastic member 502 mainly consists of a polyimide film extending from the movable plate 501, and wiring layers 508 are formed in the elastic member 502 to extend from the contact pads 507 to the support member 503.

As the material for the wiring layers 508, aluminum is used.

The support member 503 is used as a bonding portion for fixing the optical scanner to a die cast or the like. Bonding pads 509 for externally supplying power to the driving coil 506 through the wiring layers 508 are formed on the upper surface of the support member 503.

The support member 503 mainly consists of singlecrystal silicon. Since the single-crystal silicon has high rigidity, the support member can be suitably fixed to a die cast or the like.

The remaining materials used for the support member 503 include silicon nitride as a mask material in manufacturing the optical scanner, aluminum used to form the bonding pads 509 and the wiring layers 508, polyimide films that vertically sandwich the wiring layers 508 to prevent them from being exposed to the atmosphere, and the like.

As these polyimide films, polyimide films extending from the movable plate 501 and the elastic member 502 are used.

The single-crystal silicon used for the support member 503 and the single-crystal silicon used for the movable plate 501 are formed from a single substrate.

As shown in FIG. 23A, the driving coil 506 is designed such that the wiring layer widths and the wiring layer pitches on the respective sides differ from each other. More specifically, the width and pitch of the wiring layers formed near the permanent magnet 504 to be parallel to the widthwise direction are smaller than those of the wiring layers formed on the remaining portions.

The driving coil 506 has a uniform thickness.

The permanent magnet 504 is positioned on the basis of the structure disclosed in "TECHNICAL DIGEST OF THE SENSOR SYMPOSIUM", 1995, pp. 17–20 such that its direction of magnetization is aligned with the direction of thickness of the movable plate 501, and the distal end of the permanent magnet lower or upper portion is set on an extended line at about 45° in the upward or downward direction with respect to the driving coil 506 located at the distal end of the movable plate 501.

A method of manufacturing the optical scanner of the fifth embodiment will be described next.

FIG. 23B is a sectional view of this optical scanner, which can be manufactured by the semiconductor manufacturing technique shown in FIGS. 24A to 24E and FIGS. 25A to 25D. The optical scanner is manufactured by using only four types of materials, namely a single-crystal silicon substrate, silicon nitride, a polyimide, and aluminum.

Figure 24A:
FIGS. 24A to 24E are sectional views showing the manufacturing process for an optical scanner according to the fifth embodiment of the present invention.

First of all, as shown in FIG. 24A, a silicon substrate 510 is cleaned, and silicon nitride films 511 are formed on the upper and lower surfaces of the silicon substrate 510 by using a low-pressure CVD apparatus.

Figure 24B:
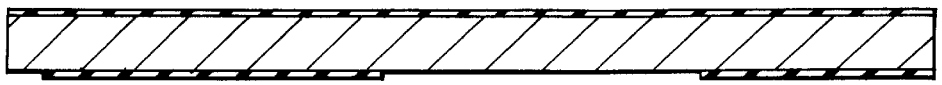

The silicon nitride films 511 formed on the upper and lower surfaces of the silicon substrate 510 are used as a mask material for isolating a movable plate 501 from a support member 503. As shown in FIG. 24B, that portion, of the silicon nitride film 511 on the lower surface, from which silicon is removed is patterned by dry etching using a fluorine-based gas.

Figure 24C:
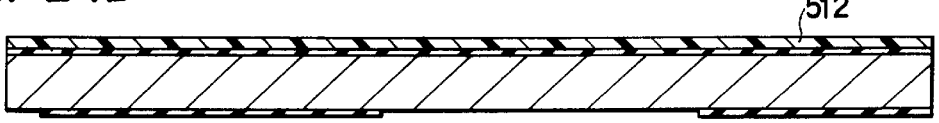

As shown in FIG. 24C, a first polyimide layer 512 is formed on the silicon nitride film 511 on the opposite surface to the patterned surface.

The first polyimide layer 512 is formed by a method of coating the silicon nitride film 511 with a polyimide solution, uniformly forming a polyimide film by printing or spin coating, and sintering the film.

Figure 24D:

As shown in FIG. 24D, a driving coil 506 and contact pads 507 are formed by etching the aluminum film sputtered on the first polyimide layer 512.

Figure 24E:
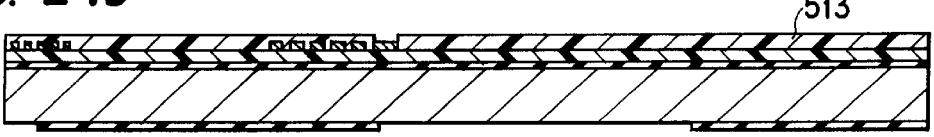

As shown in FIG. 24E, similar to the first polyimide layer 512, a second polyimide layer 513 is formed by coating the first polyimide layer 512 with a polyimide solution, uniformly forming a polyimide film by printing or spin coating, and sintering the film.

Note that the polyimide film on the contact pads 507 is removed in advance.

Figure 25A:
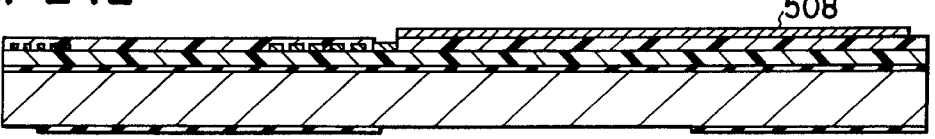
FIGS. 25A to 25D are sectional views showing the manufacturing process for the optical scanner according to the fifth embodiment of the present invention.

As shown in FIG. 25A, wiring layers 508 are formed by etching the aluminum film sputtered on the second polyimide layer 513.

Figure 25B:
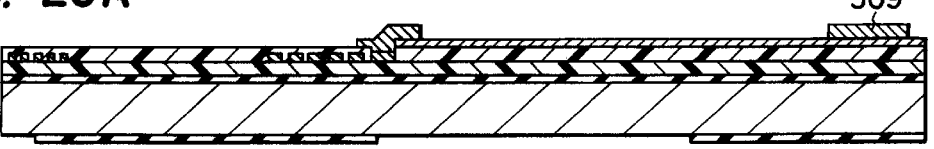

As shown in FIG. 25B, in order to ensure contact between the contact pads 507 and the driving coil 506 on the contact pads 507 and form bonding pads 509, an aluminum film is further formed by sputtering and patterned by etching.

In this case, the aluminum film must be considerably thicker than the wiring layer 508.

Figure 25C:
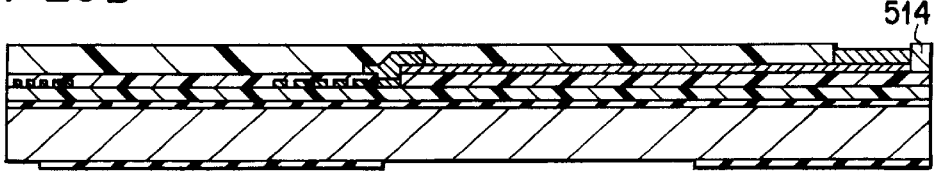

As shown in FIG. 25C, a third polyimide layer 514 is formed to determine the rigidity of the elastic member 502 and protect the bonding pads 509 from the atmosphere.

After the third polyimide layer 514 is formed, the polyimide film on the bonding pads 509 is removed by a photolithographic technique and dry etching.

Figure 25D:
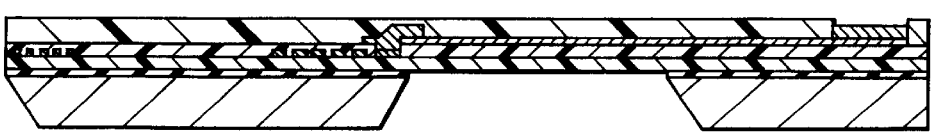

As shown in FIG. 25D, in order to form a movable plate 501 and a support member 503 from the silicon substrate 510, the silicon substrate 510 is anisotropically etched from the lower surface side by using an alkaline solution.

In this case, as shown in FIG. 23B, the silicon nitride film 511 is present under the first polyimide layer 512 serving as the elastic member 502. The silicon nitride film 511 serves as a protective layer for protecting the first polyimide layer 512 when a through hole is formed in the silicon substrate 510 by etching.

After the through hole is formed in the silicon substrate 510 by etching, the silicon nitride film 511 exposed on the lower surfaces of the elastic member 502, the movable plate 501, and the support member 503 is removed by dry etching.

When a reflecting surface 505 having a high reflectance is formed by sputtering aluminum on the reflecting surface, as needed, the optical scanner of the fifth embodiment is complete.

The operation of the optical scanner of the fifth embodiment will be described next.

When an alternating current is supplied through the bonding pads 509, a Lorentz force is generated by the driving coil 506 wound on the distal end of the movable plate 501 owing to the interaction between the current and the magnetic field generated by the permanent magnet 504.

The vector direction of this Lorentz force is determined by the positional relationship between the permanent magnet 504 and the driving coil 506. In this case, the force acts in the direction of thickness of the movable plate 501.

Since the connecting portion between the elastic member 502 and the movable plate 501 deviates from the middle point of the movable plate 501 in the widthwise direction, bending vibrations alone cannot be generated, but both bending and torsional vibrations are generated at once.

In this case, the vibration of the elastic member 502 in the direction of thickness with the connecting portion with respect to the support member 503 serving as a fixed end is referred to as the bending vibration, and the vibration in the direction in which the movable plate 501 rotates upward or downward about the central axis of the elastic member 502 as a rotational axis is referred to as the torsional vibration.

In this case, the amplitude of the movable plate 501 based on the bending vibration is determined by the product of the Lorentz force generated by the driving coil 506 and the length of the perpendicular dropped from the point at which the Lorentz force is generated to the side of the support member 503 which is connected to the elastic member 502.

In addition, the amplitude of the movable plate 501 based on the torsional vibration is determined by the product of the Lorentz force generated by the driving coil 506 and the length of the perpendicular dropped from the position at which the Lorentz force is generated to the central axis of the elastic member 502 in the width of direction.

The Lorentz force is determined by the performance and size of the permanent magnet 504, the number of turns of the driving coil 506, the wiring layer length of the driving coil 506, the amount of current supplied to the driving coil 506, and the distance from the permanent magnet 504 to the driving coil 506.

In this case, the driving coil 506 is formed to surround the outermost peripheral portion of the movable plate 501 to maximize the amount of force generated.

When the support member 503 is fixed to a die cast (not shown) or the like, and a current is supplied to the driving coil 506, the movable plate 501 starts to vibrate with the boundary portion between the support member 503 and the elastic member 502 serving as a fixed end.

At this time, when an alternating current having the same frequency as the resonant frequency uniquely determined by the shapes and materials of the movable plate 501 and the elastic member 502 is supplied, the movable plate 501 starts to vibrate at the maximum amplitude at that current value.

The vibrations in this case are two-dimensional vibrations including both bending and torsional vibrations, and the resonance frequencies of both the bending and torsional vibrations are uniquely determined by the shapes and materials of the movable plate 501 and the elastic member 502.

If, therefore, the movable plate 501 is to be vibrated in the resonant state both in the bending and twisting directions, an alternating current obtained by superimposing the current waveform for inducing resonance in the bending vibration mode on the current waveform for inducing resonance in the torsional vibration mode may be supplied to the driving coil 506.

Figure 26:
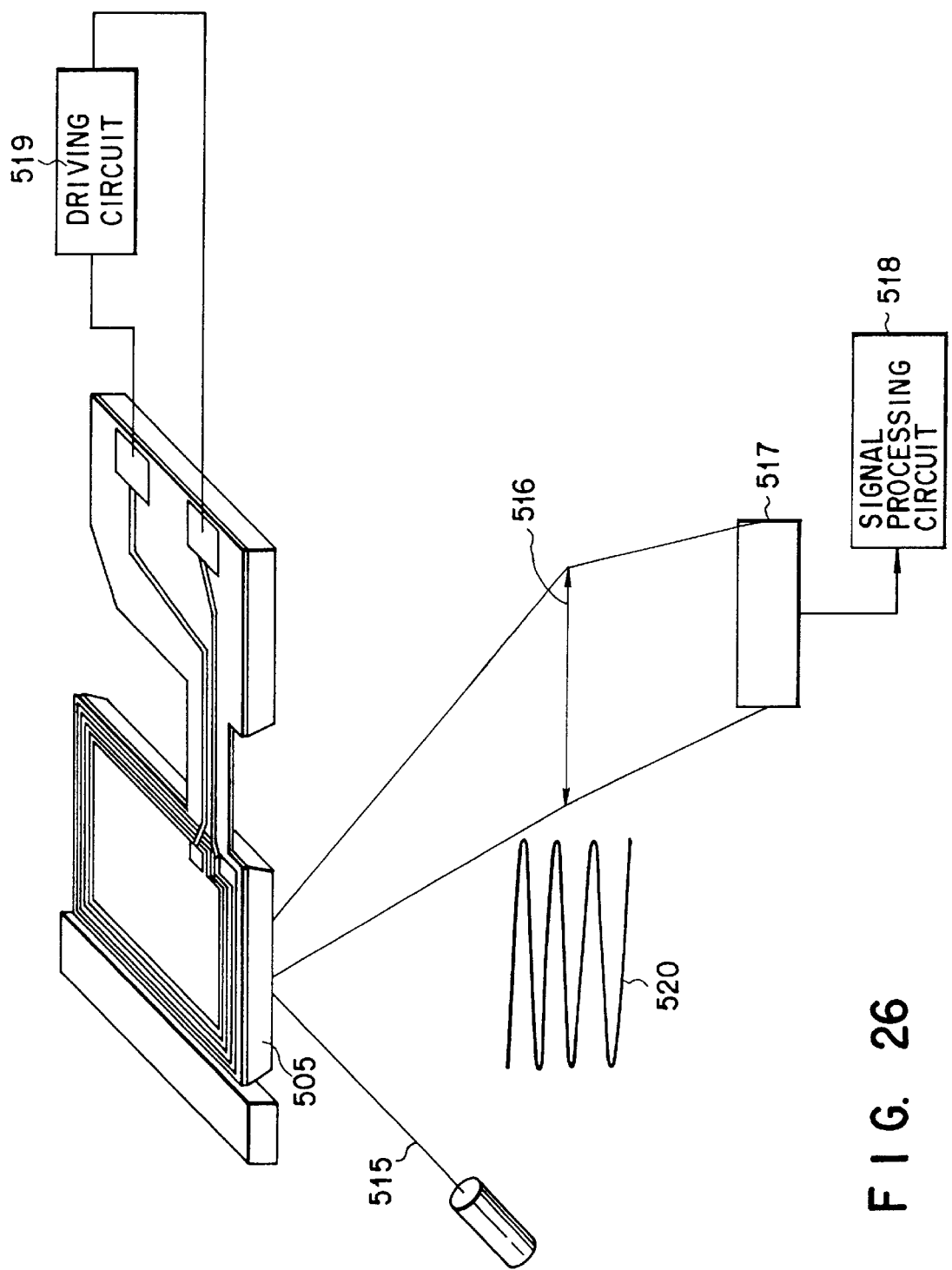
FIG. 26 is a view showing an application example of the optical scanner according to the fifth embodiment of the present invention.

The optical scanner according to this embodiment is used in a state, for example, as shown in FIG. 26. If a collimated laser beam 515 is radiated on the reflection surface 505 of the vibrating movable plate 501, the laser beam 515 reflected by the reflection surface 505 of the movable plate 501 is scanned two-dimensionally and a scan line 516 of a raster type as indicated by numeral 520 is obtained. If a predetermined current is applied from a driving circuit 519 to the driving coil 506 (see FIG. 22) at a predetermined frequency, scanning can be performed at desired frequency and amplitude. Optical characteristics obtained along the scan line 516 are detected by a light-receiving element 517, and a detection signal is output to a signal processing circuit 518. The signal processing circuit 518 reads the optical characteristics on the scan 516. Since this scanner can be remarkably reduced in size, compared to the conventional scanner, it is suitably applied to small-sized devices and the power consumption can be reduced.

According to the optical scanner of the fifth embodiment, therefore, the following effects can be obtained.

The optical scanner of this embodiment can scan light two-dimensionally.

In this optical scanner, one driving coil 506 generates both bending and torsional vibrations.

If, therefore, the shape of the optical scanner of this embodiment remains the same, the deflection angles in the bending and twisting directions during operation can be uniquely determined by the current supplied to the driving coil 506, facilitating drive control.

In addition, since the optical scanner of this embodiment uses a polyimide film which is an organic film as the elastic member 502, this structure is resistant to brittle fracture, and a large deflection angle can be obtained while the minimum necessary strength is maintained, as compared with the structure using silicon for the vibration member like the one disclosed in "TECHNICAL DIGEST OF THE SENSOR SYMPOSIUM", 1995, pp. 17–20.

In addition, since the electric elements such as the driving coil 506, the wiring layers 508, and the contact pads 507 are formed in the polyimide film, the electric elements are nearly free from aging due to humidity. In addition, by placing the driving coil 506 in the polyimide film, the wiring layers of the driving coil 506 can be stably insulated from each other.

Furthermore, the driving coil 506 in this embodiment is shaped to obtain a large driving force while minimizing the heat generated when a current is supplied to the coil.

This driving force can be easily obtained by equation (5):

$$F = ni \cdot B \quad (5)$$

where F is the driving force, n is the number of turns of the coil, i is the amount of current flowing in the coil, and B is the average magnetic flux density on the wiring portions of the driving coil 506 formed near the permanent magnet 504.

This driving force can be effectively increased by increasing the amount of current flowed to the driving coil 506. In practice, however, as the amount of current increases, more heat is generated by the driving coil 506, and the electric resistance of the driving coil 506 increases. As a result, the conversion efficiency from a current into a driving force deteriorates.

In addition, if the number of turns of the driving coil 506 is increased to increase the driving force, the resistance of the driving coil 506 increases. The same problem as described above is posed.

In consideration of the average magnetic flux density of the permanent magnet 504, the distance between the permanent magnet 504 and the driving coil 506 is preferably minimized to increase the driving force.

That is, the wiring layer width and pitch of the driving coil 506 are preferably reduced. If, however, the width of all the wiring layers of the driving coil 506 is reduced, the problems associated with resistance arise as in the above case.

In order to suppress this problem, in this embodiment, as shown in FIG. 23A, the width and pitch of only the wiring layers contributing to the driving force are reduced, so that all the wiring layers concentrate near the permanent magnet 504.

In this case, the pitch of the wiring layers of the driving coil 506 which do not contribute to the driving force is increased to improve the manufacturing yield of the driving coil 506.

In this embodiment, since the optical scanner can be integrally formed, almost no assembly step is required, and the productivity of ultra-compact optical scanners can be improved.

In addition, since the semiconductor manufacturing technique is used for the optical scanner of this embodiment, the dimensional precision of the ultra-compact optical scanner is high. The optical scanner is therefore free from unstable vibrations due to problems in the respective parts or in the assembly process.

Each arrangement of this embodiment can be variously modified and changed.

Figure 27:
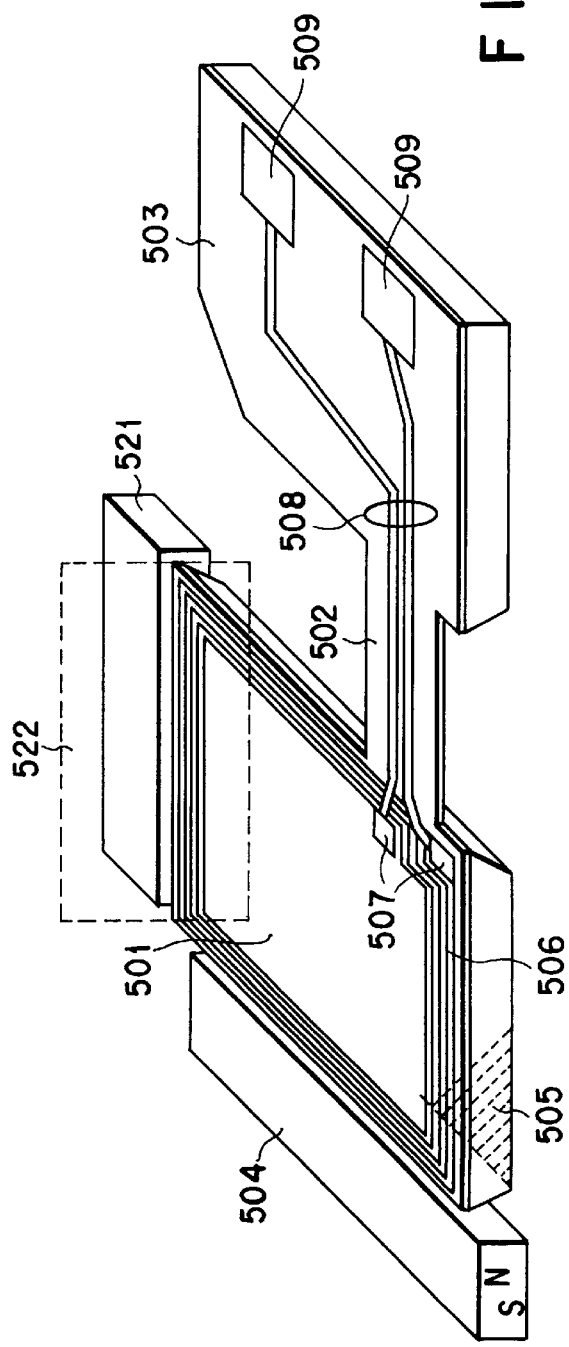
FIG. 27 is a perspective view showing the structure of a modification of the optical scanner according to the fifth embodiment of the present invention.

For example, as shown in FIG. 27, in order to generate torsional vibrations with large amplitudes more reliably, a permanent magnet 521 may be placed near a side wall surface 522 opposite the side wall of the movable plate 501 which is located near the portion to which the fixing frame 502 is connected.

Torsional vibrations are generated because the elastic member 502 is connected to a portion deviated from the middle point of the movable plate 501.

The force of torsional vibrations generated is determined by the moment. In this structure, the central axis of the elastic member 502 in the widthwise direction serves as a rotational center, and the force is given by the product of the length of a perpendicular dropped from the portion where the force is produced to the rotational center axis is obtained.

Since the permanent magnet 504 is positioned to have a driving force distribution in a direction perpendicular to the rotational center axis, a driving force for generating torsional vibrations cannot be effectively obtained by the permanent magnet 504 alone.

The permanent magnet 521 is placed near the side wall surface 522 separated most from the rotational center axis, and the driving force generated by the wiring layers of the driving coil 506 which extend near the permanent magnet 521 is much more efficient and greater than that generated by the permanent magnet 504.

In this structure, as shown in FIG. 30A, the width and pitch of the wiring layers of the driving coil 506 which are formed near the permanent magnet 504 and the permanent magnet 521 are smaller than those of the remaining wiring layers.

With this setting, a driving force can be efficiently obtained, and the electric resistance of the driving coil is minimized to minimize the heat generated when a current is supplied to the coil.

(Sixth Embodiment)

FIGS. 28 to 32B show an optical scanner according to the sixth embodiment of the present invention and its modifications.

The optical scanner of the sixth embodiment can scan light two-dimensionally.

Figure 28:
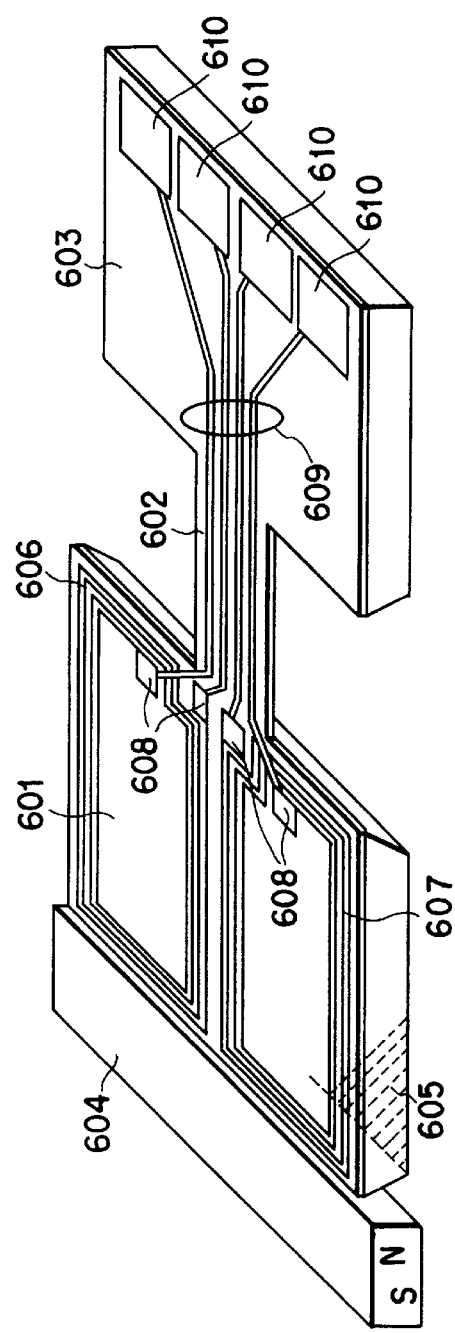
FIG. 28 is a perspective view showing the structure of an optical scanner according to the sixth embodiment of the present invention.

FIG. 28 is a perspective view of this optical scanner. FIG. 30B shows a driving coil used for the optical scanner.

The optical scanner of the sixth embodiment has two driving coils 606 and 607 formed in areas separated from each other in the widthwise direction of the optical scanner, unlike the fifth embodiment which includes the single driving coil 506.

This optical scanner comprises a movable plate 601, an elastic member 602, a support member 603, a permanent magnet 604, and the driving coils 606 and 607.

The movable plate 601 has a reflecting surface 605 for reflecting light. The lower surface of the movable plate 601 in FIG. 28 corresponds to the reflecting surface 605.

As a main material for the movable plate 601, a material which can prevent the reflecting surface from deforming during vibrations is required. As the main material for the movable plate 601, therefore, single-crystal silicon as a high-rigidity material is used.

The remaining materials used for the movable plate 601 include silicon nitride, aluminum, polyimides, and the like. More specifically, the silicon nitride is used as a mask material in manufacturing the optical scanner. The aluminum is used as a material for the wiring layers of the driving coils 606 and 607 and contact pads 608 formed at the start and end points of the driving coils 606 and 607. In some case, the aluminum is used as a mirror material for the reflecting surface 605.

The polyimide films are formed to vertically sandwich the driving coils 606 and 607 to insulate the wiring layers from each other and prevent the electric elements including the contact pads 608 from being exposed to the atmosphere.

The elastic member 602 mainly consists of a polyimide film extending from the movable plate 601, and wiring layers 609 are formed in the elastic member 602 to extend from the contact pads 608 to the support member 603.

As the material for the wiring layers 609, aluminum is used.

The support member 603 is used as a bonding portion for fixing the optical scanner to a die cast or the like. Bonding pads 610 for externally supplying power to the driving coils 606 and 607 through the wiring layers 609 are formed on the upper surface of the support member 603.

The support member 603 mainly consists of single-crystal silicon. Since the single-crystal silicon has high rigidity, the support member can be suitably fixed to a die cast or the like.

The remaining materials used for the support member 603 include silicon nitride as a mask material in manufacturing the optical scanner, aluminum used to form the bonding pads 610 and the wiring layers 609, polyimide films that vertically sandwich the wiring layers 609 to prevent them from being exposed to the atmosphere, and the like.

As these polyimide films, polyimide films extending from the movable plate 601 and the elastic member 602 are used.

The single-crystal silicon used for the support member 603 and the single-crystal silicon used for the movable plate 601 are formed from a single substrate.

As shown in FIG. 30B, the wiring layer widths and the wiring layer pitches on the respective sides of the driving coils 606 and 607 differ from each other.

More specifically, the width and pitch of the wiring layers of each of the driving coils 606 and 607 formed near the permanent magnet 604 to be parallel to the widthwise direction are smaller than those of the wiring layers formed on the remaining portions.

Each of the driving coils 606 and 607 has a uniform thickness.

The permanent magnet 604 is positioned on the basis of the structure disclosed in "TECHNICAL DIGEST OF THE SENSOR SYMPOSIUM", 1995, pp. 17–20 such that its direction of magnetization is aligned with the direction of thickness of the movable plate 601, and the distal end on the permanent magnet lower or upper portion is set on an extended line at about 45° in the upward or downward direction with respect to the driving coils 606 and 607 located at the distal end of the movable plate 601.

Note that the optical scanner of the sixth embodiment can be manufactured by the same manufacturing method as that for the optical scanner of the fifth embodiment.

The operation of the optical scanner of the sixth embodiment will be described next.

When an alternating current is supplied through the bonding pads 610, a Lorentz force is generated by the driving coils 606 and 607 wound on the distal end of the movable plate 601 owing to the interaction between the current and the magnetic field generated by the permanent magnet 604.

The vector direction of this Lorentz force is determined by the positional relationship between the permanent magnet 604 and the driving coils 606 and 607.

In this case, the force acts in the direction of thickness of the movable plate 601.

If alternating currents of the same magnitude are supplied to the driving coils 606 and 607 in the same direction, this optical scanner starts bending vibrations with the boundary portion between the support member 603 and the elastic member 602 serving as a fixed end.

If alternating current of different magnitudes are supplied to the driving coils 606 and 607 in different directions, the optical scanner starts two-dimensional vibrations including both bending vibrations and torsional vibrations.

In this case, the vibration of the elastic member 602 in the direction of thickness with the connecting portion with respect to the support member 603 serving as a fixed end is referred to as the bending vibration, and the vibration in the direction in which the movable plate 601 rotates upward or downward about the central axis of the elastic member 602 as a rotational axis is referred to as the torsional vibration.

In this case, the amplitude of the movable plate 601 based on the bending vibration is determined by the product of the Lorentz force generated by the driving coils 606 and 607 and the length of the perpendicular dropped from the point at which the Lorentz force is generated to the side of the support member 603 which is connected to the elastic member 602.

In addition, the amplitude of the movable plate 601 based on the torsional vibration is determined by the product of the Lorentz force generated by the driving coils 606 and 607 and the length of the perpendicular dropped from the position at which the Lorentz force is generated to the central axis of the elastic member 602 in the width of direction.

The Lorentz force is determined by the performance and size of the permanent magnet 604, the number of turns of each of the driving coils 606 and 607, the wiring layer length of each of the driving coils 606 and 607, the amount of current supplied to each of the driving coils 606 and 607, and the distance from the permanent magnet 604 to each of the driving coils 606 and 607.

In this case, the driving coils 606 and 607 are formed to surround the outermost peripheral portion of the movable plate 601 to maximize the amount of force generated.

When the support member 603 is fixed to a die cast (not shown) or the like, and a current is supplied to the driving coils 606 and 607, the movable plate 601 starts to vibrate with the boundary portion between the support member 603 and the elastic member 602 serving as a fixed end.

At this time, when an alternating current having the same frequency as the resonant frequency uniquely determined by the shapes and materials of the movable plate 601 and the elastic member 602 is supplied, the movable plate 601 starts to vibrate at the maximum amplitude at that current value.

The vibrations in this case are one-dimensional vibrations including only bending vibrations or two-dimensional vibrations including both bending and torsional vibrations.

The resonance frequencies of both the bending and torsional vibrations are uniquely determined by the shapes and materials of the movable plate 601 and the elastic member 602.

If an optical scanner includes a plurality of driving coils as in this embodiment, the vibrations obtained change in a complicated manner depending on the conditions of currents to be supplied.

When, for example, only bending vibrations are to be generated, alternating currents having the same frequency as the bending mode resonant frequency may be supplied to the driving coils 606 and 607.

When only torsional vibrations are to be generated, alternating currents having the same frequency as the torsional mode resonant frequency may be supplied to the driving coils 606 and 607.

In this case, if the currents supplied to the driving coils 606 and 607 are 180° out of phase, the movable plate 601 starts to vibrate in the torsional mode.

When the movable plate 601 is to be vibrated in both the bending and torsional modes in the resonant state, an alternating current obtained by superimposing the current waveform for inducing resonance in the bending vibration mode on the current waveform for inducing resonance in the torsional vibration mode may be supplied to each of the driving coils 606 and 607.

According to the optical scanner of the sixth embodiment, therefore, the following effects can be obtained.

The optical scanner of this embodiment can perform both one-dimensional light scanning using only bending vibrations and two-dimensional light scanning using both bending and torsional vibrations. In addition, by controlling the magnitudes and directions of currents to be supplied to the driving coils 606 and 607, the amplitudes of bending and torsional vibrations can be finely controlled. Light can be scanned on even an arbitrarily determined scanning area by controlling the currents to be supplied.

Especially when the aspect ratio of the scanning area changes, the optical scanner of the fifth embodiment cannot cope with this change, but the optical scanner of the sixth embodiment can.

In addition, since the optical scanner of the sixth embodiment uses a polyimide film which is an organic film as the elastic member 602, this structure is resistant to brittle fracture, and a large deflection angle can be obtained while the minimum necessary strength is maintained, as compared with the structure using silicon for the vibration member like the one disclosed in "TECHNICAL DIGEST OF THE SENSOR SYMPOSIUM", 1995, pp. 17–20.

In addition, since the electric elements such as the driving coils 606 and 607, the wiring layers 609, and the contact pads 608 are formed in the polyimide film, the electric elements are almost free from aging due to humidity. In addition, by placing the driving coils 606 and 607 in the polyimide film, the wiring layers of the driving coils 606 and 607 can be stably insulated from each other.

Furthermore, the driving coils 606 and 607 in this embodiment is shaped to obtain a large driving force while minimizing the heat generated when a current is supplied to the coil.

This driving force can be easily obtained by equation (5) in the fifth embodiment.

For the sake of simplicity, assume that the directions and magnitudes of the currents supplied to the two driving coils 606 and 607 are the same. In this case, as is apparent from equation (5), the driving force can be effectively increased by increasing the amount of current flowed to each of the driving coils 606 and 607.

In practice, however, as the amount of current increases, more heat is generated by the driving coils 606 and 607, and the electric resistances of the driving coils 606 and 607 increase. As a result, the conversion efficiency from a current into a driving force deteriorates.

In addition, if the number of turns of each of the driving coils 606 and 607 is increased to increase the driving force, the resistance of each of the driving coils 606 and 607 increases. The same problem as described above is therefore experienced.

Note that, however, since the driving coils are placed in two separate areas in this embodiment, the total wiring layer length of the coils is smaller than that of the driving coil in the fifth embodiment. The structure of the sixth embodiment is therefore superior to that of the fifth embodiment in respect of the problem of heat.

In consideration of the average magnetic flux density of the permanent magnet, the distance between the permanent magnet and each driving coil is preferably minimized to increase the driving force.

That is, the wiring layer width and pitch of each of the driving coils 606 and 607 are preferably reduced. If, however, the width of all the wiring layers of each of the driving coils 606 and 607 is reduced, the problems associated with resistance are posed as in the above case.

In order to suppress this problem, in this embodiment, as shown in FIG. 30B, the width and pitch of only the wiring layers contributing to the driving force are reduced, so that all the wiring layers concentrate near the permanent magnet 604.

In this case, the pitch of the wiring layers of each of the driving coils 606 and 607 which do not contribute to the driving force is increased to improve the manufacturing yield of the driving coils 606 and 607.

In this embodiment, since the optical scanner can be integrally formed, almost no assembly step is required, and the productivity of ultra-compact optical scanners can be improved.

In addition, since the semiconductor manufacturing technique is used for the optical scanner of this embodiment, the dimensional precision of the ultra-compact optical scanner is high. The optical scanner is therefore free from unstable vibrations due to problems in the respective parts or in the assembly process.

As is apparent, each arrangement of this embodiment can be variously modified and changed.

Figure 29:
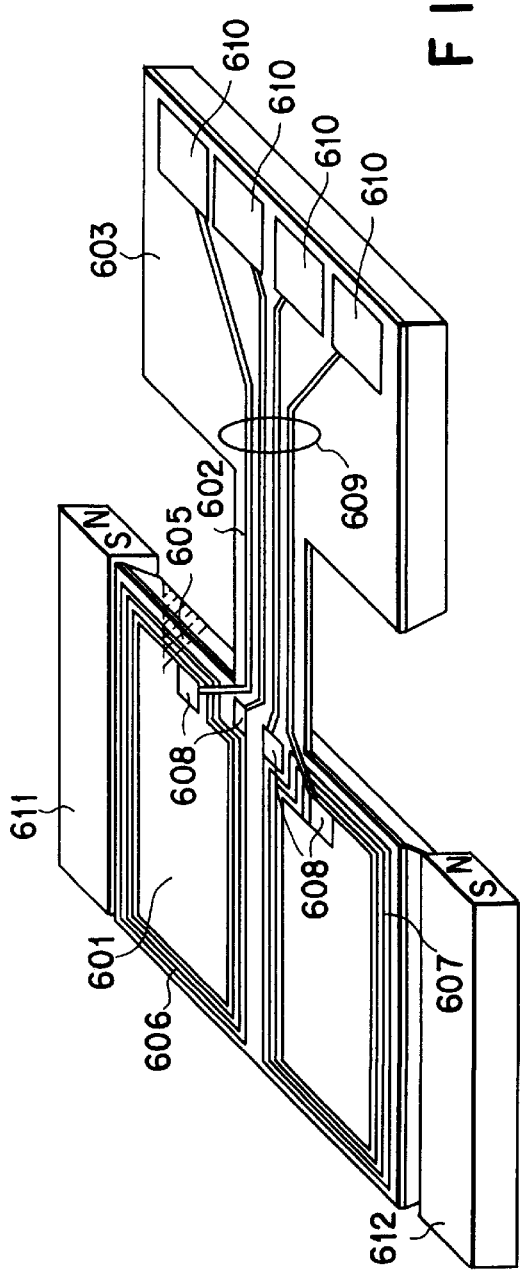
FIG. 29 is a perspective view showing the structure of the first modification of the optical scanner according to the sixth embodiment of the present invention.

As shown in FIG. 29, the first modification of this embodiment may have permanent magnets 611 and 612 placed at the two ends of the movable plate 601 in the widthwise direction to reliably generate torsional vibrations having a large amplitude.

If the permanent magnets 611 and 612 are placed such that the directions of magnetization are set to form magnetic fields parallel to the widthwise direction of the movable plate 601, conversion to a driving force can be efficiently performed.

The optical scanner of the first modification greatly differs from the structure of the sixth embodiment in that currents must be supplied to the driving coils 606 and 607 in different directions to generate only bending mode vibrations.

Note that importance is attached to the efficiency in generating bending vibrations in the structure of the sixth embodiment, whereas importance is attached to the efficiency in generating torsional vibrations in the optical scanner of this modification.

This difference is based on the fact that moments which influence torsional vibrations are not uniformly distributed in the structure of the sixth embodiment, whereas moments for the torsional mode are uniformly distributed, and moments which influence bending vibrations are not uniformly distributed in the structure of this modification.

In this structure, as shown in FIG. 32A, the width and pitch of the wiring layers of the driving coils 606 and 607 which are formed near the permanent magnets 611 and 612 are smaller than those of the remaining wiring layers.

With this setting, a driving force can be efficiently obtained, and the electric resistance of the driving coil is minimized to minimize the heat generated when a current is supplied to the coil.

Figure 31:
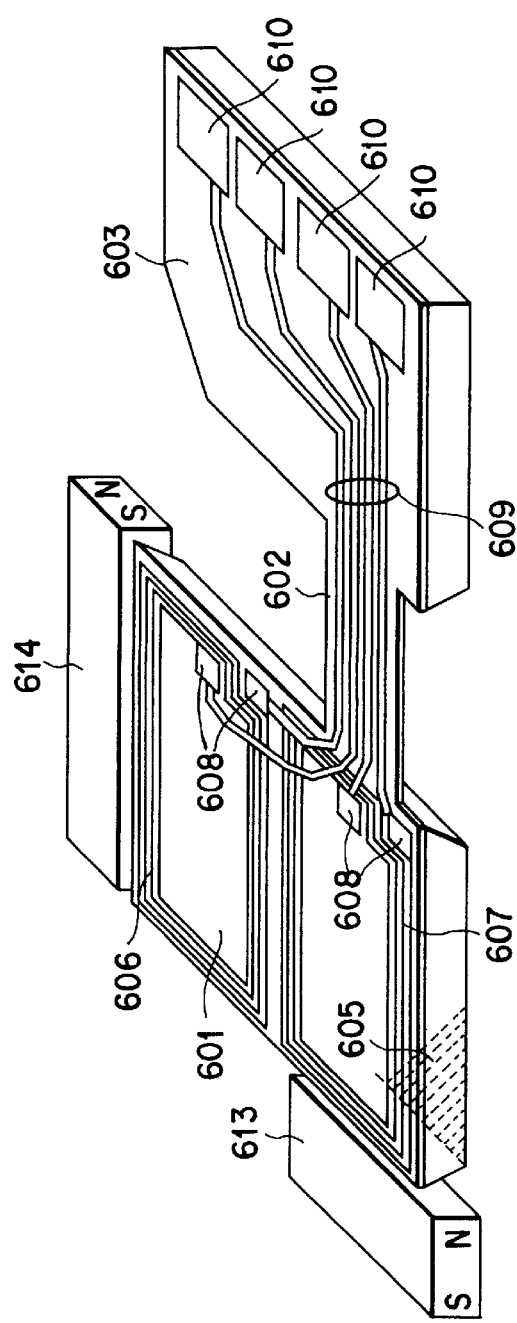
FIG. 31 is a perspective view showing the structure of the second modification of the optical scanner according to the sixth embodiment of the present invention.

As shown in FIG. 31, in order to separately control bending vibrations and torsional vibrations more easily, the second modification of this embodiment may have a structure similar to that of the sixth embodiment, in which the driving coils 606 and 607 are formed in two areas separated from each other in the widthwise direction of the movable plate 601, and permanent magnets 613 and 614 are placed near the driving coils 606 and 607 at positions where the magnets serve to make the driving coils 606 and 607 generate vibration modes corresponding to themselves.

The permanent magnet 613 corresponding to the driving coil 607 for generating bending vibrations is therefore placed near the distal end of the movable plate 601.

The driving coil 606 is formed to generate torsional vibrations. The permanent magnet 614 corresponding to this coil is placed near the opposite side wall surface to the side wall of the movable plate 601 which is near the portion to which the permanent magnet 602 is connected.

In this structure, since the driving coils 606 and 607 are placed in the respective vibrating directions, bending vibrations are generated when a current is supplied to only the driving coil 607, and torsional, albeit imperfect vibrations are generated when a current is supplied to only the driving coil 606.

In the sixth embodiment or its first modification, when bending and torsional vibrations are to be generated at once, a current having a waveform obtained by superimposing the waveforms for bending and torsional vibrations on each other is supplied to the two coils. In this modification, however, these waveforms need not be superimposed on each other. Instead, it suffices if alternating currents for generating the respective modes are supplied to the driving coils 606 and 607.

In this structure, the waveforms need not be superimposed on each other, and hence the electric circuit for forming current waveforms can be simplified.

In this structure, as shown in FIG. 32B, the width and pitch of the wiring layers of the driving coils 606 and 607 which are formed near the permanent magnets 614 and 613 are smaller than those of the remaining wiring layers.

With this setting, a driving force can be efficiently obtained, and the electric resistance of the driving coil is minimized to minimize the heat generated when a current is supplied to the coils.

(Seventh Embodiment)

FIGS. 33 to 36 show an optical scanner according to the seventh embodiment of the present invention.

The optical scanner of this embodiment can scan light two-dimensionally and incorporates a detection coil for detecting driving frequency.

Figure 33:
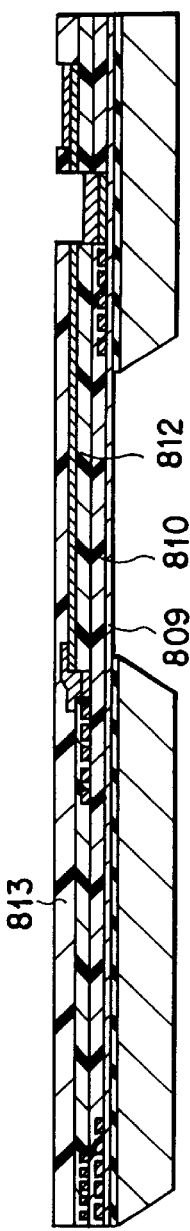
FIG. 33 is a sectional view showing the structure of an optical scanner according to the seventh embodiment of the present invention.
Figure 34:
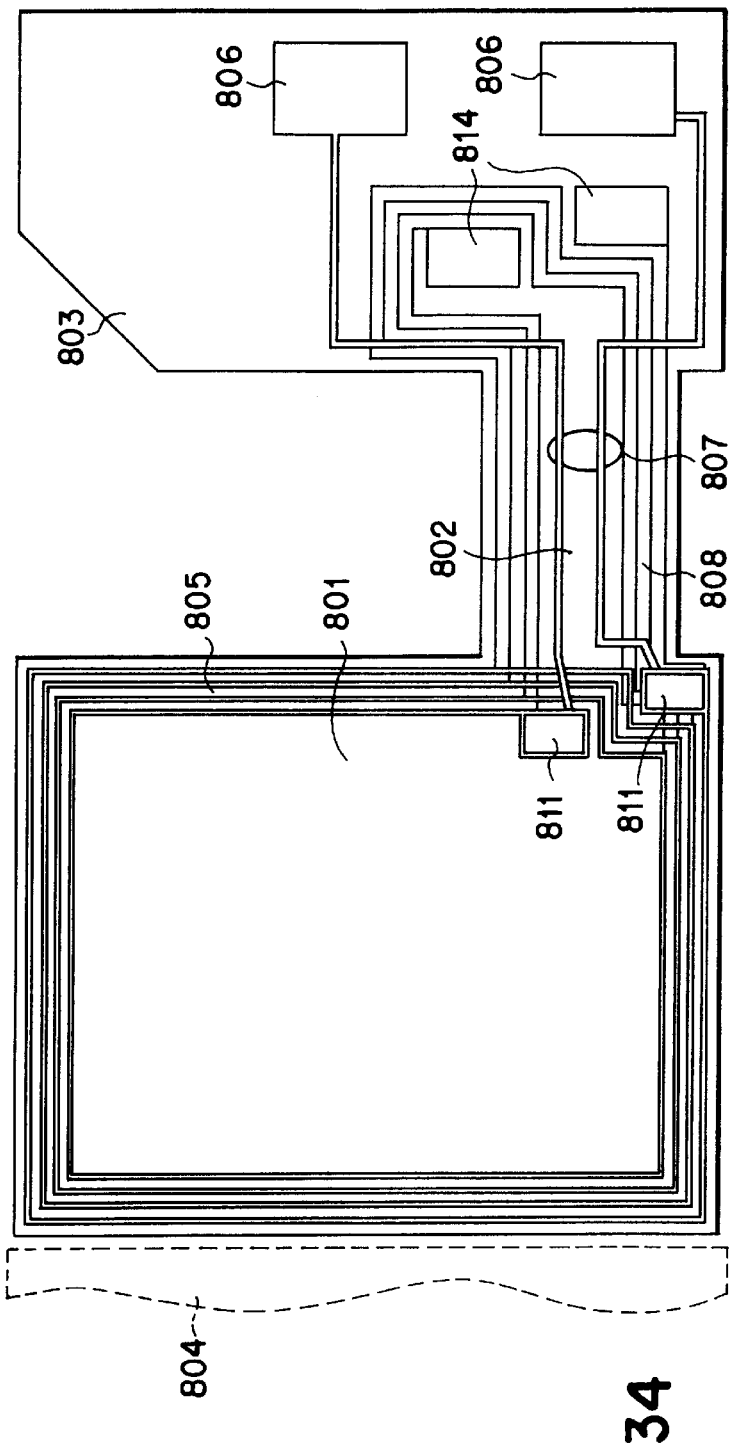
FIG. 34 is a plan view showing the structure of the optical scanner according to the seventh embodiment of the present invention.

FIG. 33 is a sectional view of this optical scanner. FIG. 34 is a top view of the optical scanner.

The optical scanner incorporating the detection coil will be described with reference to the structure of the fifth embodiment described above.

This optical scanner comprises a movable plate 801, an elastic member 802, a support member 803, a permanent magnet 804, and a driving coil 805. The constituent elements of these components are the same as those in the first embodiment.

This optical scanner includes the following electric elements: the driving coil 805 formed on the movable plate 801; bonding pads 806 formed on the support member 803; wiring layers 807 for connecting the driving coil 805 to the bonding pads 806; and a detection coil 808 extending on the movable plate 801, the elastic member 802, and the support member 803.

The detection coil 808 and the driving coil 805 are insulated from each other through a second polyimide layer 810.

The detection coil 808 is sandwiched between a first polyimide layer 809 and the second polyimide layer 810, and the coil wiring layers are also insulated from each other by a polyimide.

Contact pads 811 are formed on the start and end points of the driving coil 805.

The portions, of a third polyimide layer 812 insulating the wiring layers of the driving coil 805 from each other, which correspond to the contact pads 811 are removed, and hence the contact pads 811 are electrically connected to the wiring layers 807.

The wiring layers 807 are also shielded from the atmosphere by a fourth polyimide layer 813.

The wiring layers 807 are electrically connected to the bonding pads 806 through the support member 803.

Bonding pads 814 electrically connected to the start and end points of the detection coil 808 are formed on the support member 803.

The operation of this embodiment will be described next.

When an alternating current is supplied through the bonding pads 806, a Lorentz force is generated by the driving coil 805 wound on the distal end of the movable plate 801 owing to the interaction of the current and the magnetic field generated by the permanent magnet 804.

The vector direction of this Lorentz force is determined by the positional relationship between the permanent magnet 804 and the driving coil 805. In this case, the Lorentz force acts in the direction of thickness of the movable plate 801.

In this optical scanner, since the connecting portion between the elastic member 802 and the movable plate 801 deviates from the middle point of the movable plate 801 in the widthwise direction, bending vibrations alone cannot be generated, but both bending and torsional vibrations are generated at once.

In this case, the vibration of the elastic member 802 in the direction of thickness with the connecting portion with respect to the support member 803 serving as a fixed end is referred to as the bending vibration, and the vibration in the direction in which the movable plate 801 rotates upward or downward about the central axis of the elastic member 802 as a rotational axis is referred to as the torsional vibration.

When the movable plate 801 starts to vibrate, an induced voltage V expressed by equation (6) is generated:

$$V = B \cdot v \cdot l \qquad (6)$$

where B is the average magnetic flux density on the coil wiring layers formed near the permanent magnet 804, y is the vibration speed of the movable plate 801, and 1 is the wiring layer length of the detection coil 808 for generating the induced voltage.

The voltage waveform obtained from the detection coil 808 is similar to the vibration waveform of the movable plate 801, and the same as the waveform of the current supplied to the driving coil 805. However, the voltage is output out of phase with the current.

According to the optical scanner of the seventh embodiment, the following effects can be obtained.

Since the detection coil 808 is integrally incorporated in the optical scanner, the optical scanner including the detection coil 808 can be integrally formed. For this reason, almost no assembly step is required, and the productivity of ultra-compact optical scanners can be improved.

In addition, since the semiconductor manufacturing technique is used for the optical scanner of this embodiment, the dimensional precision of the ultra-compact optical scanner is high. The optical scanner is therefore free from unstable vibrations due to problems in the respective parts or in the assembly process.

The heat generated by the driving coil 805 has no influence on the detection signal output from the detection coil 808 and representing the vibration state. This structure can therefore detect a signal with a higher precision than a detection system using a strain gage and the like.

This detection signal is used to evaluate the vibration state of the movable plate 801. In addition, a self-oscillation circuit 815 can be designed to allow the optical scanner to always vibrate in the resonant state by using the detection signal, as shown in FIG. 35.

By realizing the self-oscillation of this optical scanner, stable resonance driving can always be performed without being affected by changes in temperature and aging of the elastic member 802.

The fifth to seventh embodiments of the present invention described above include the following devices.

(1) An optical scanner characterized by including a support member for fixing the scanner to a given member, a movable plate having at least one surface serving as a reflecting surface for reflecting light, an elastic member which connects the support member to the movable plate while allowing the movable plate to have two-degree-of-freedom or more, a driving coil having at least two sides formed on the movable plate, and permanent magnets spaced apart from each other and placed near the movable plate, the optical scanner supplying an alternating current to the coil to cause the movable plate to generate bending and torsional vibrations with a connecting portion between the elastic member and the support member serving as a fixed end, wherein the elastic member incorporates an electric element, and is an insulating elastic film extending over the movable plate and the support member.

(Corresponding Embodiment of Present Invention)

The optical scanner according to aspect (1) of the present invention corresponds to the fifth embodiment.

In the optical scanner according to aspect (1) of the present invention, as in the fifth embodiment, when an alternating current is supplied to the driving coil, the interaction between the current and the magnetic field generated by each permanent magnet generates a force that vibrates the movable plate. As this coil, a flat coil is used in the fifth embodiment.

The electric element in the optical scanner according to aspect (1) of the present invention is a general term for a driving coil, a detection coil, a wiring layer, an electrode pad, or the like.

(Operation/Effect)

The optical scanner according to aspect (1) of the present invention has only one driving coil but is capable of two-dimensional driving. In addition, this optical scanner is a two-dimensional optical scanner which has a simple structure and can be easily manufactured.

Since the optical scanner according to aspect (1) of the present invention uses the insulating elastic film for the leaf spring portion, this structure is more resistant to brittle fracture than a structure using silicon for a vibration member. This structure therefore allows a large deflection angle while maintaining the minimum necessary strength.

In addition, since the electric elements are formed in the insulating elastic film, the electric elements are almost free from aging due to humidity. An elastic film can also be used to insulate the respective electric elements.

(2) An optical scanner characterized by including a support member for fixing the scanner to a given member, a movable plate having at least one surface serving as a reflecting surface for reflecting light, an elastic member which connects the support member to the movable plate while allowing the movable plate to have two-degree-of-freedom or more, a plurality of driving coils each having at least one side formed on the movable plate, and permanent magnets spaced apart from each other and placed near the movable plate, the optical scanner supplying an alternating current to the coil to cause the movable plate to generate bending and torsional vibrations with a connecting portion between the elastic member and the support member serving as a fixed end, wherein the elastic member incorporates an electric element, and is an insulating elastic film extending over the movable plate and the support member.

(Corresponding Embodiment of Present Invention)

The optical scanner according to aspect (2) of the present invention corresponds to the sixth embodiment.

In the optical scanner according to aspect (2) of the present invention, as in the sixth embodiment, when an alternating current is supplied to the driving coil, the interaction between the current and the magnetic field generated by each permanent magnet generates a force that vibrates the movable plate. As this coil, a flat coil is used in the sixth embodiment.

The electric element in the optical scanner according to aspect (2) of the present invention is a general term for a driving coil, a detection coil, a wiring layer, an electrode pad, or the like.

(Operation/Effect)

The optical scanner according to aspect (2) of the present invention can control the vibrations of the movable plate in a more complicated manner by using a plurality of driving coils than the optical scanner according to aspect (1) of the present invention.

The scanner according to aspect (2) of the present invention can perform one-dimensional driving as well as two-dimensional driving. This scanner can separately control the amplitudes of the respective modes in two-dimensional driving by adjusting the amount of current to be supplied to each driving coil.

Since the optical scanner according to aspect (2) of the present invention uses the insulating elastic film for the leaf spring portion, this structure is more resistant to brittle fracture than a structure using silicon for a vibration member. This structure therefore allows a large deflection angle while maintaining the minimum necessary strength.

In addition, since the electric elements are formed in the insulating elastic film, the electric elements are almost free from aging due to humidity. An elastic film can also be used to insulate the respective electric elements.

(3) The optical scanner according to aspect (1) of the present invention is characterized in that the permanent magnets include two or more permanent magnets, at least one permanent magnet is placed near the distal end of the movable plate with respect to the support member, and at least one of the remaining permanent magnets is placed near a side surface of the movable plate.
(Corresponding Embodiment of Present Invention)

This optical scanner according to aspect (3) of the present invention corresponds to a modification of the fifth embodiment.
(Operation/Effect)

In the optical scanner according to aspect (3) of the present invention, the permanent magnet is placed near the side wall of the movable plate to set a large deflection angle in the twisting direction as compared with the structure in which the permanent magnet is placed only near the distal end of the movable plate.

(4) The optical scanner according to aspect (2) of the present invention is characterized in that the permanent magnets include two or more permanent magnets, and at least two permanent magnets are placed near the two side wall surfaces of the movable plate.
(Corresponding Embodiment of Present Invention)

The optical scanner according to aspect (4) of the present invention corresponds to the first modification of the sixth embodiment.
(Operation/Effect)

In the optical scanner according to aspect (4) of the present invention, the permanent magnets are placed near the two side walls of the movable plate to set a large deflection angle in the twisting direction as compared with the structure in which one permanent magnet is placed only near the distal end of the movable plate.

In the optical scanner according to aspect (4) of the present invention, however, the deflection angle in the bending direction is small. This structure is therefore effective in designing an optical scanner with reference to the deflection angle in the twisting direction.

(5) The optical scanner according to aspect (2) of the present invention is characterized in that the permanent magnets include two or more permanent magnets, at least one permanent magnet is a permanent magnet which is placed near the distal end of the movable plate with respect to the support member, and influences one of the plurality of driving coils, at least one of the remaining permanent magnets is a permanent magnet which is placed near a side surface of the movable plate and influences one of the remaining driving coils, and the respective permanent magnets are placed to influence different driving coils.
(Corresponding Embodiment of Present Invention)

The optical scanner according to aspect (5) of the present invention corresponds to the second modification of the sixth embodiment.
(Operation/Effect)

In the optical scanner according to aspect (5) of the present invention, each permanent magnet is placed to influence only a corresponding one of the driving coils. For this reason, when an alternating current is supplied to one driving coil, the generated vibration mode can be almost limited to one mode.

With the use of the structure of the optical scanner according to aspect (5) of the present invention, a current having a waveform obtained by superimposing the waveform for bending vibrations on the waveform for torsional vibrations need not be supplied to each driving coil. Instead, it suffices if alternating currents for generating the respective modes are supplied to different driving coils.

The optical scanner according to aspect (5) of the present invention can therefore simplify the arrangement of an electric circuit for generating current waveforms.

(6) The optical scanner according to each of aspects (1), (2), (3), (4), and (5) of the present invention is characterized in that the insulating elastic film consists of an organic film.
(Corresponding Embodiment of Present Invention)

The optical scanner according to aspect (6) of the present invention corresponds to the fifth, sixth, and seventh embodiments.
(Operation/Effect)

Since the optical scanner according to aspect (6) of the present invention uses an organic film for the leaf spring portion, this structure is more resistant to brittle fracture than a structure using silicon for a vibration member. This structure therefore allows a large deflection angle while maintaining the minimum necessary strength.

(7) The optical scanner according to each of aspects (1), (2), (3), (4), (5), and (6) of the present invention is characterized in that the width and pitch of the wiring layers of the driving coil which are located near the permanent magnet are minimized.
(Corresponding Embodiment of Present Invention)

The optical scanner according to aspect (7) of the present invention corresponds to the fifth and sixth embodiments.
(Operation/Effect)

In the optical scanner according to aspect (7) of the present invention, the width and pitch of the coil wiring layers which are formed near the permanent magnet and contribute to the generation of a force are reduced to allow the coil wiring layers near the permanent magnet to be placed nearer to the permanent magnet, thereby obtaining a larger force than a general coil.

In the optical scanner according to aspect (7) of the present invention, the width and pitch of the coil wiring layers which do not contribute to the generation of a force are set to be sufficiently large, thereby suppressing the problem of heat.

In addition, in the optical scanner according to aspect (7) of the present invention, the pitch of the coil wiring layers which do not contribute to the generation of a force is set to be large so as to improve the manufacturing yield.

(8) The optical scanner according to each of aspects (1), (2), (3), (4), (5), and (6) is characterized by including a detection coil having at least one side integrally formed in the movable plate and used to detect the vibration frequency of the movable plate.
(Corresponding Embodiment of Present Invention)

The optical scanner according to aspect (8) of the present invention corresponds to the seventh embodiment.

The detection coil in aspect (8) of the present invention is a coil for generating an induced electromotive force based on the interaction with the permanent magnet as in the seventh embodiment. As this coil, the seventh embodiment uses a flat coil extending on the movable plate, the elastic member, and the support member.
(Operation/Effect)

In the optical scanner according to aspect (8) of the present invention, the heat generated by the driving coil has no influence on the signal detected by the detection coil. This structure can therefore detect a signal with a higher precision than a detection system using a strain gage and the like.

In the optical scanner according to aspect (8) of the present invention, this detection signal is used to evaluate the vibration state of the movable plate. In addition, a self-oscillation circuit can be designed to allow the optical scanner to always vibrate in the resonant state by using the detection signal.

By realizing the self-oscillation of this optical scanner according to aspect (8) of the present invention, stable resonance driving can always be performed without being affected by changes in temperature and aging of the elastic member.

The third and fourth prior arts described above do not describe the durability of electric elements such as the wiring layers of the optical scanner which vibrates with large deflection angles and protection against the atmosphere.

In consideration of such points, it is an object of aspects (1) to (5) of the present invention to provide an optical scanner which vibrates with large deflection angles, and has electric elements with high durability.

The third and fourth prior arts described above do not suggest increasing the deflection angle of the optical scanner.

In consideration of this point, it is an object of aspect (6) of the present invention to provide an optical scanner which reduces the rigidity of a spring portion by using an elastic film, more specifically an organic film, for a leaf spring portion so as to obtain a large deflection angle regardless of a decrease in the amount of force generated with a reduction in the size of the scanner.

The fourth prior art described above does not describe minimizing the influences of heat generated when a current is flowed in the coil.

In consideration of this point, it is an object of aspect (7) of the present invention to provide an optical scanner having a coil shape which minimizes heat generated by the coil.

The third and fourth prior arts described above do not describe high-precision detection of the device integrally formed with the optical scanner and designed to monitor the operation state regardless of environmental changes and aging of the optical scanner.

In consideration of this point, it is an object of aspect (8) of the present invention to provide an optical scanner integrally incorporating a device which is resistant to environmental changes and can monitor the vibration state.

As described above, according to the fifth, sixth, and seventh embodiments of the present invention, there is provided an optical scanner which vibrates with large deflection angles and has electric elements with high durability.

(Eighth Embodiment)

FIGS. 36 to 40 show an optical scanner according to the eighth embodiment of the present invention.

This optical scanner of the eighth embodiment can scan light one-dimensionally.

FIG. 36 is a perspective view of this optical scanner. FIGS. 37 and 38 are sectional views taken along a line 37–37' and a line 38–38' in FIG. 36, respectively.

FIG. 39 shows a driving coil used for this optical scanner. FIGS. 40A to 40J show the steps in manufacturing the optical scanner.

The eighth embodiment has the following structure.

This optical scanner comprises a movable plate 701, elastic members 702, support members 703, and permanent magnets 704.

A reflecting surface 705 for reflecting light is formed on the movable plate 701. The reflecting surface 705 corresponds to the lower surface of the movable plate 701 in FIG. 36.

As a main material for the movable plate 701, a material which can prevent the reflecting surface from deforming during vibrations is required.

In this case, as the main material for the movable plate 701, single-crystal silicon as a high-rigidity material is used.

The remaining materials used for the movable plate 701 include silicon nitride, aluminum, polyimide, and the like.

The silicon nitride is used as a mask material for manufacturing the optical scanner. The residue of the silicon nitride is used to insulate the silicon. The aluminum is used to form the wiring layers of a driving coil 706 and contact pads 707 at the start and end points of the driving coil, and may be used as a mirror material for the reflecting surface 705.

Polyimide films are formed to vertically sandwich the driving coil 706 to insulate the coil wiring layers from each other and prevent the electric elements including the contact pads 707 from being exposed to the atmosphere.

Each elastic member 702 mainly consists of a polyimide film extending from the movable plate 701. Wiring layers 708 are formed in the elastic members 702 to extend from the contact pads 707 to the support members 703.

Each wiring layer 708 consists of aluminum.

Each support member 703 is used as a bonding portion for fixing the optical scanner to a die cast or the like. A bonding pad 709 for supplying external power to the driving coil 706 through the wiring layer 708 is formed on each support member 703.

The support member 703 mainly consists of singlecrystal silicon.

Since the single-crystal silicon has high rigidity, the support member can be suitably fixed to a die cast or the like.

The remaining materials used for the support members 703 include silicon nitride as a mask material in manufacturing the optical scanner, aluminum used to form the bonding pads 709 and the wiring layers 708, polyimide films that vertically sandwich the wiring layers 708 to prevent them from being exposed to the atmosphere, and the like.

As these polyimide films, polyimide films extending from the movable plate 701 and the elastic members 702 are used.

The single-crystal silicon used for the support members 703 and the single-crystal silicon used for the movable plate 701 are formed from a single substrate.

As shown in FIG. 39, the wiring layer widths and the wiring layer pitches on the respective sides of the driving coil 706 differ from each other.

More specifically, the width and pitch of the wiring layers formed near the permanent magnets 704 to be parallel to the widthwise direction are smaller than those of the wiring layers formed on the remaining portions.

The driving coil 706 has a uniform thickness.

In relation to the positions of the permanent magnets 704, this optical scanner can be satisfactorily driven by using one permanent magnet placed near one side wall of the movable plate. In this embodiment, however, permanent magnets are respectively placed near the two opposite side walls of the movable plate and positioned such that the directions of magnetization are aligned with the direction of thickness of the movable plate 701, and the distal end of the lower or upper portion of each permanent magnet 704 is set on an extended line at about 45° in the upward or downward direction with respect to the driving coil 706 located at the distal end of the movable plate 701. This structure can further increase the driving force.

A method of manufacturing the optical scanner of this embodiment will be described next.

This optical scanner can be manufactured by a semiconductor manufacturing method.

FIGS. 40A to 40J show the method of manufacturing this optical scanner.

This optical scanner is manufactured by using only four types of materials, namely a single-crystal silicon substrate, silicon nitride, a polyimide, and aluminum.

Figure 40A:
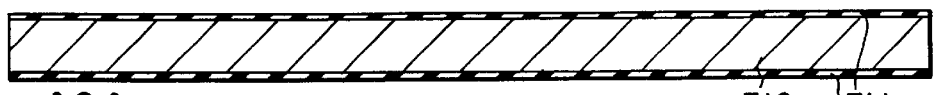
FIGS. 40A to 40J are sectional views showing the manufacturing process for the optical scanner according to the eighth embodiment of the present invention.

First of all, as shown in FIG. 40A, a silicon substrate 710 is cleaned, and silicon nitride films 711 are formed by using a low-pressure CVD apparatus.

The silicon nitride films 711 formed on the upper and lower surfaces of the silicon substrate 710 are used as a mask material for isolating a movable plate 701 from support members 703.

Figure 40B:

As shown in FIG. 40B, that portion, of the silicon nitride film 711 on the lower surface, from which silicon is removed is patterned in advance by dry etching using a fluorine-based gas.

Figure 40C:

As shown in FIG. 40C, a first polyimide layer 712 is formed on the silicon nitride film 711 on the opposite surface to the patterned surface.

The first polyimide layer 712 is formed by a method of coating the silicon nitride film 711 with a polyimide solution, uniformly forming a polyimide film by printing or spin coating, and sintering the film.

Figure 40D:

As shown in FIG. 40D, a driving coil 706, contact pads 707, and bonding pads 709 are formed by etching the aluminum film sputtered on the first polyimide layer 712.

Figure 40E:

As shown in FIG. 40E, similar to the first polyimide layer 712, a second polyimide layer 713 is formed by coating the first polyimide layer 712 with a polyimide solution, uniformly forming a polyimide film by printing or spin coating, and sintering the film.

Note that the polyimide film on the contact pads 707 and the boding pads 709 is removed in advance.

Figure 40F:

As shown in FIG. 40F, wiring layers 708 are formed by etching the aluminum film sputtered on the second polyimide layer 713.

A third polyimide layer 714 is formed to determine the rigidity of the elastic members 702 and protect the bonding pads from the atmosphere.

Figure 40G:

As shown in FIG. 40G, after the third polyimide layer is formed, the polyimide film on the bonding pads 709 is removed by a photolithographic technique and dry etching.

Figure 40H:

As shown in FIG. 40H, an aluminum layer 721 is further stacked on the resultant structure by sputtering to improve the bonding characteristics of the bonding pads 709.

Figure 40I:

As shown in FIG. 40I, in order to form a movable plate 701 and a support members 703 from the silicon substrate 710, the silicon substrate is anisotropically etched from the lower surface side by using an alkaline solution.

In this case, the silicon nitride film 711 is present under the first polyimide layer 712 serving as the elastic members 702. The silicon nitride film 711 serves as a protective layer for protecting the first polyimide layer 712 when a through hole is formed in the silicon substrate 710 by etching.

Figure 40J:
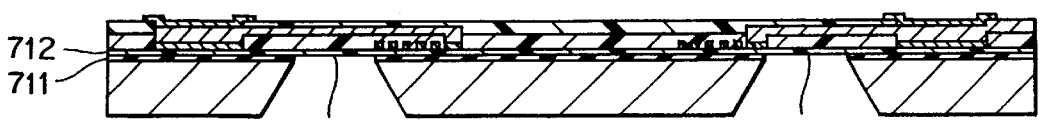

As shown in FIG. 40J, after the through hole is formed in the silicon substrate by etching, the silicon nitride film 711 exposed on the lower surfaces of the elastic members 702, the movable plate 701, and the support members 703 is removed by dry etching.

Although not shown in FIGS. 40A to 40J, a dry etching process using an oxygen-based etchant is performed afterward to remove the first polyimide layer 712 except for the portions corresponding to the elastic members 702, and aluminum is sputtered on the surface for reflecting light to form a reflecting surface having a high reflectance, thus completing the optical scanner of this embodiment.

The operation of the optical scanner of the this embodiment will be described next.

When an alternating current is supplied through the bonding pads 709, a Lorentz force is generated by the driving coil 706 wound on the distal end of the movable plate 701 owing to the interaction between the current and the magnetic field generated by each permanent magnet 704.

The vector direction of this Lorentz force is determined by the positional relationship between the permanent magnets 704 and the driving coil 706. In this case, the force acts in the direction of thickness of the movable plate 701.

In this optical scanner, the support members 703 are formed to surround the movable plate 701.

The elastic members 702 extend from the opposite two sides of the movable plate 701 to be connected to the support members 703.

The movable plate 701 can therefore generate only a torsional vibration mode with the central axis of each elastic member 702 in the longitudinal direction serving as a rotational axis.

Torsional vibrations are determined by the product of the Lorentz force generated by the driving coil 706 near each permanent magnet 704 and the distance from the central axis of each elastic member 702 in the longitudinal direction to the coil near the permanent magnet 704.

The Lorentz force is determined by the performance and size of each permanent magnet 704, the number of turns of each driving coil 706, the wiring layer length of the driving coil 706, the amount of current supplied to the driving coil 706, and the distance from the permanent magnet 704 to the driving coil 706.

The driving coil 706 is formed around the outermost periphery of the movable plate to maximize the amount of force generated.

When the support members 703 are fixed to a die cast or the like, and a current is supplied to the driving coil 706, the movable plate 701 starts to vibrate with the boundary portions between the support members 703 and the elastic members 702 serving as fixed ends.

When an alternating current having the same frequency as the resonant frequency uniquely determined by the shapes and materials of the movable plate 701 and the elastic members 702 is supplied, the movable plate 701 starts to vibrate at the maximum amplitude at that current value.

Figure 41:
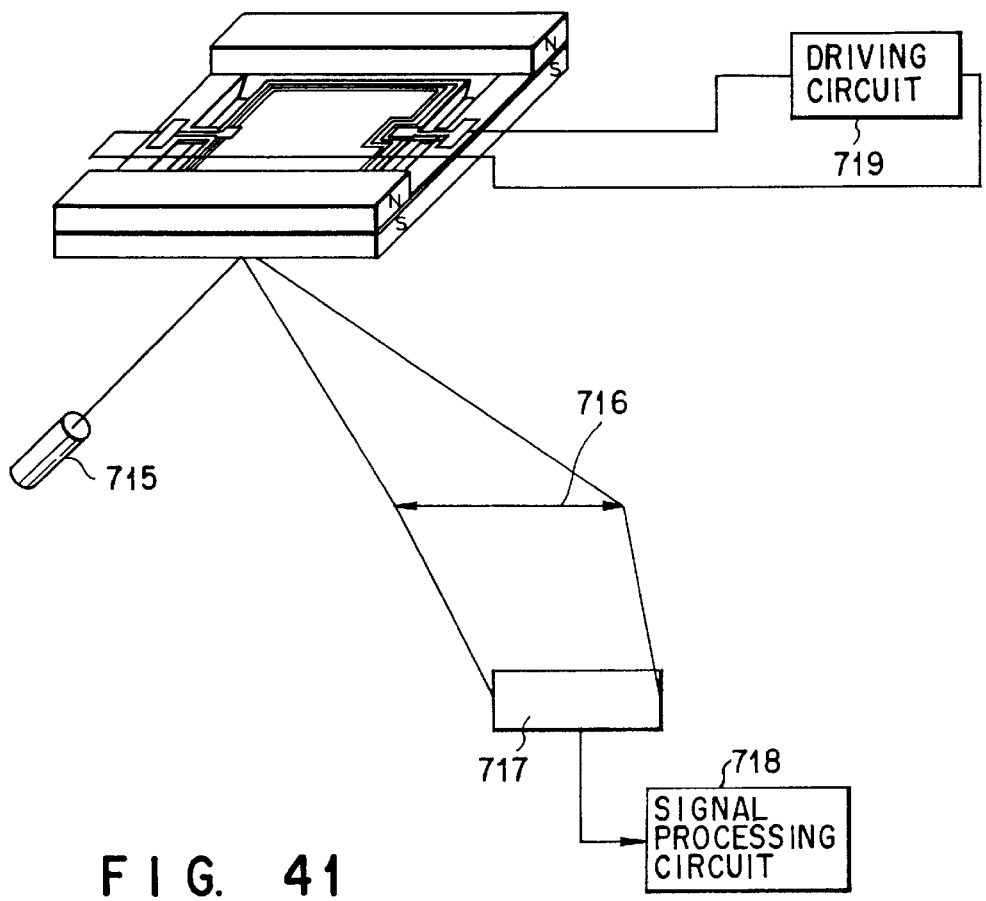
FIG. 41 is a perspective view showing an application example of the optical scanner according to the eighth embodiment of the present invention.

The optical scanner according to this embodiment is used in a state, for example, as shown in FIG. 41. If a collimated laser beam 715 is radiated on the reflection surface 705 of the vibrating movable plate 701, the laser beam 715 reflected by the reflection surface 705 of the movable plate 701 is scanned one-dimensionally. As a result, a scan line 716 is obtained. If a predetermined current is applied from a driving circuit 719 to the driving coil 706 (see FIG. 36) at a predetermined frequency, scanning can be performed at desired frequency and amplitude. Optical characteristics obtained along the scan line 716 are detected by a light-receiving element 717, and a detection signal is output to a signal processing circuit 718. The signal processing circuit 718 reads the optical characteristics on the scan 716. Since this scanner can be remarkably reduced in size, compared to the conventional scanner, it is suitably applied to small-sized devices and the power consumption can be reduced.

The optical scanner has the following effects.

The optical scanner of this embodiment can scan light one-dimensionally.

The elastic members 702 of this optical scanner pivot as torsion springs. For this reason, unlike an optical scanner using bending vibrations, the reflection point on the reflecting surface 705 formed on the movable plate 701 does not move, allowing easy optical design, and improving the uniformity in light scanning speed.

In addition, since a polyimide film which is an organic film is used for the elastic members 702, this structure is resistant to brittle fracture, and a large deflection angle can be obtained while the minimum necessary strength is maintained, as compared with the structure using silicon for the vibration member. Since the electric elements such as the driving coil 706, the wiring layers 708, and the contact pads 707 are formed in the polyimide film, the electric elements are nearly free from aging due to humidity. Furthermore, since the driving coil 706 is formed in the polyimide film, the wiring layers of the driving coil 706 are stably insulated from each other.

The driving coil 706 in this embodiment is shaped to minimize the power consumption and the heat generated when a current is supplied to the coil and obtain a large driving force.

The driving force generated by this coil is given by equation (5) above. The relationship between the current value, the power consumption, and the heat value can be given by equations (7) and (8) below.

A power consumption P and a heat value J of the coil portion are given by:

$$P = i^2 R \qquad (7)$$

$$J = i^2 \cdot R \cdot t \qquad (8)$$

where i is the value of the current flowed to the coil, R is the electric resistance of the coil, and t is the period of time for which the currents flowed to the coil.

As is apparent from equation (5) above, the driving force F can be increased by increasing at least one of the current value i, the number n of turns, and the magnetic flux density B.

In order to increase the number of turns and the magnetic flux density, the structure must be changed. However, the current value can be easily increased.

As is apparent from equations (7) and (8), as the value i of the current flowed to the coil increases, both the power consumption P and the heat value J increase in proportion to the square of the current value j, resulting in undesired effects.

For this reason, the number n of turns of the driving coil 706 may be increased, or the average magnetic flux density B may be increased by decreasing the wiring layer width and pitch of the driving coil 706 so that the distance between each permanent magnet and the driving coil decreases.

In either case, the resistance R of the driving coil 706 increases, and the power consumption increases. In addition, the heat value increases.

That is, there is a trade-off relationship between the driving force F, and the power consumption P and the heat value J. In this embodiment, as shown in FIG. 37, in order to increase the driving force F while minimizing the power consumption P and the heat value J, the width and pitch of only the wiring layers contributing to the driving force are decreased so that the overall wiring layers concentrate near the permanent magnet 704.

In this case, the pitch of the wiring layers of the driving coil 706 which do not contribute to the driving force is increased to improve the manufacturing yield of the driving coil 706 and reduce the electric resistance of the driving coil 706.

In this embodiment, since the optical scanner can be integrally formed, almost no assembly step is required, and the productivity of ultra-compact optical scanners can be improved.

In addition, since the semiconductor manufacturing technique is used for the optical scanner of this embodiment, the dimensional precision of the ultra-compact optical scanner is high. The optical scanner is therefore free from unstable vibrations due to problems in the respective parts or in the assembly process.

Each arrangement of this embodiment can be variously modified and changed.

In a modification of the eighth embodiment, in order to obtain large amplitudes, the permanent magnets 704 at the two ends may be connected to a yoke 720, as shown in FIG. 42.

Figure 44:
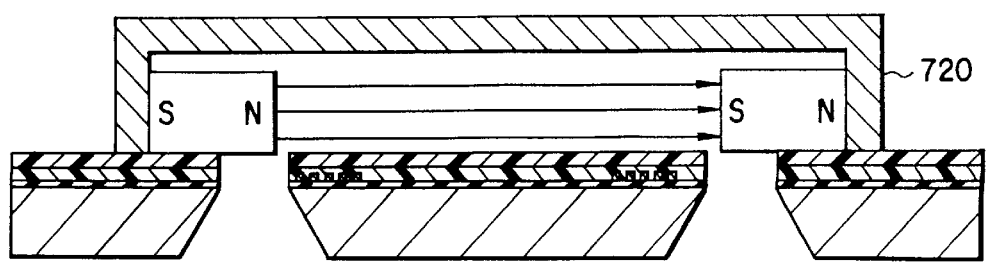
FIG. 44 is a sectional view taken along a line 44–44' in the modification of the eighth embodiment of the present invention in FIG. 42.
Figure 45A:
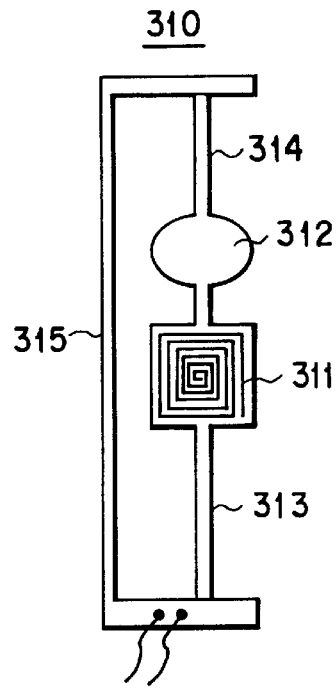
FIGS. 45A and 45B are views showing the structure of an optical scanner according to the first prior art.
Figure 45B:
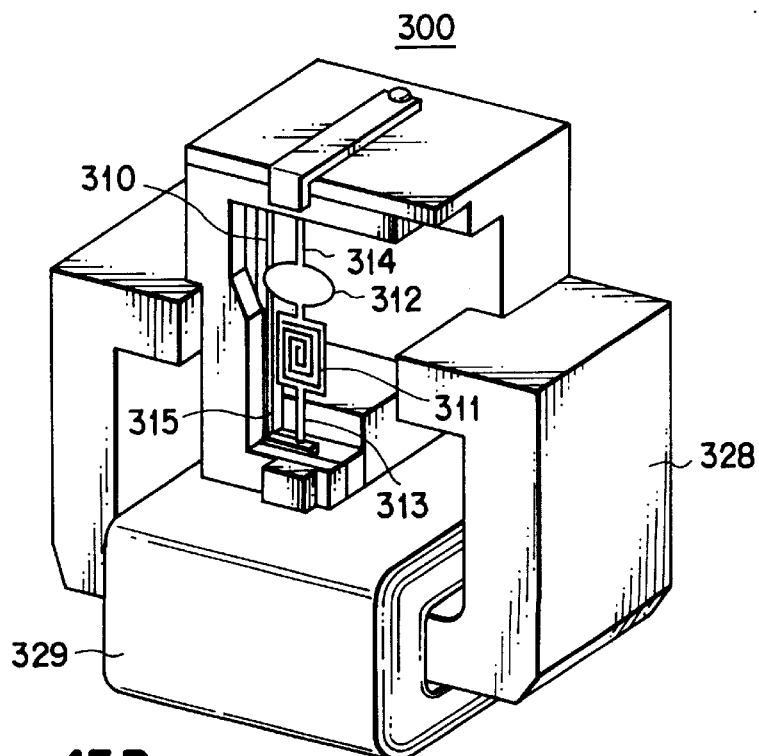
Figure 46:
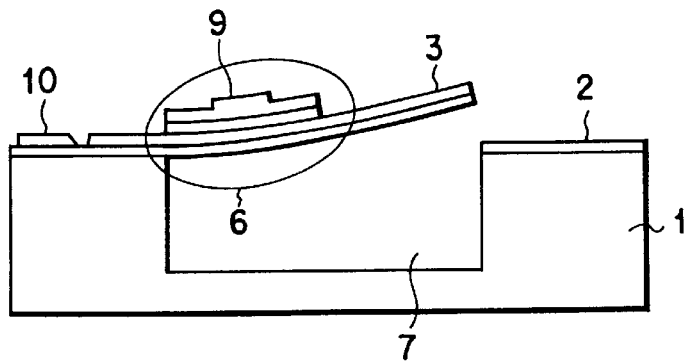
FIG. 46 is a sectional view showing the structure of an optical scanner according to the second prior art.
Figure 47A:
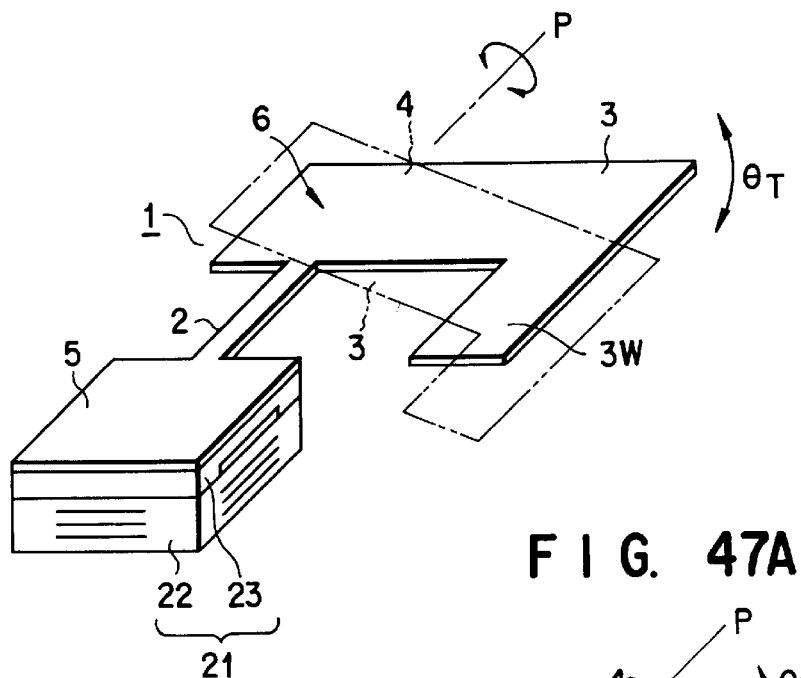
FIGS. 47A and 47B are perspective views showing the structure of an optical scanner according to the third prior art.
Figure 47B:
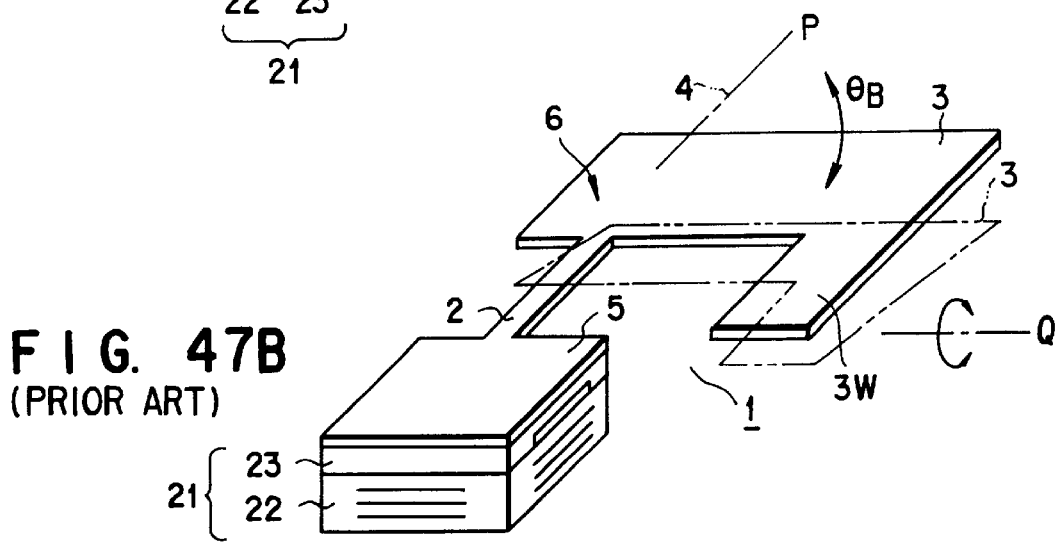

FIGS. 43 and 44 are sectional views taken along a line 43–43' and a line 44–44' in FIG. 42, respectively.

In this case, as shown in FIG. 44, the directions of magnetization of the permanent magnets 704 at the two ends are set to be parallel to the widthwise direction of the elastic member 702.

When the permanent magnets 704 are placed at the two ends through the yoke, the magnetic fluxes generated in the space between the permanent magnets 704 can be uniformly set to be parallel to the widthwise direction of the elastic member 702.

In addition, with the use of the yoke, the magnetic circuit becomes a closed loop circuit, which can convert the energy of a magnetic flied into a driving force more efficiently than an open loop circuit like the one shown in FIG. 36. The power consumption of the driving coil can therefore be reduced.

Figure 48A:
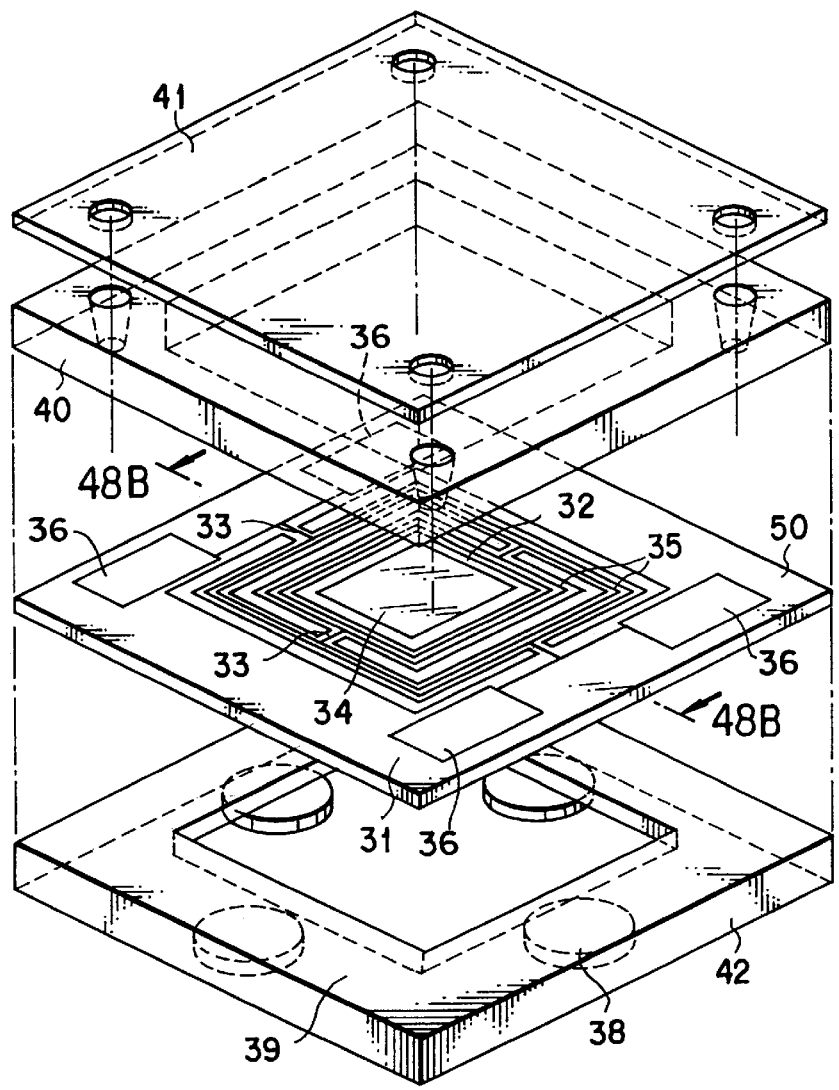
FIGS. 48A and 48B are views showing the structure of an optical scanner according to the fourth prior art.
Figure 48B:
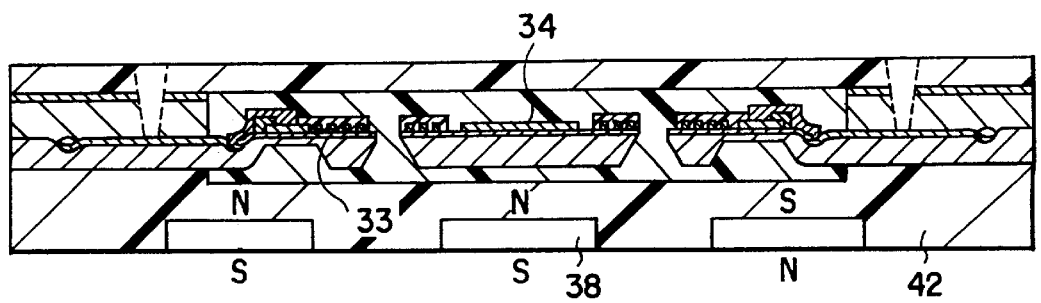

In the eighth embodiment, since the movable plate 701 vibrates with each elastic member 702 serving as an axis, light is scanned only one-dimensionally. However, light can be scanned two-dimensionally in the following structure. As in the prior art shown in FIGS. 48A and 48B, permanent magnets are arranged independently of the support members 703, two each of elastic members and driving coils are arranged, and the inner and outer elastic members are arranged on the support member to be perpendicular to each other.

The eighth embodiment described above includes the following aspects of the present invention.

(1) An optical scanner including support members for fixing the scanner to a given member, a movable plate having at least one surface serving as a reflecting surface for reflecting light, elastic members which connect the support members to the movable plate, a driving coil having at least one side formed on the movable plate, and permanent magnets each placed near the movable plate at a predetermined distance therefrom, the optical scanner supplying an alternating current to the driving coil to generate torsional vibrations of the movable plate with the elastic members serving as torsion springs, characterized in that the elastic members incorporate electric elements and are formed from an insulating elastic film extending over the movable plate and the support members.

(Corresponding Embodiment of Present Invention)

This aspect of the present invention corresponds to the eighth embodiment.

As in the eighth embodiment, when an alternating current is supplied to the driving coil, the interaction between the current and the magnetic field generated by each permanent magnet generates a force that vibrates the movable plate. As this coil, a flat coil is used in the eighth embodiment.

The electric element is a general term for a driving coil, a detection coil, a wiring layer, an electrode pad, or the like.
(Operation/Effect)

This optical scanner is a one-dimensional optical scanner which can generate torsional vibrations of the movable plate, has a simple structure, and can be easily manufactured.

Since the insulating elastic film is used for the leaf spring portion, this structure is more resistant to brittle fracture than a structure using silicon for a vibration member. This structure therefore allows a large deflection angle while maintaining the minimum necessary strength.

In addition, since the electric elements are formed in the insulating elastic films, the electric elements are almost free from aging due to humidity. An elastic film can also be used to insulate the respective electric elements.

(2) The optical scanner according to aspect (1) of the present invention is characterized in that the permanent magnets comprise at least two permanent magnets which are placed near the opposite side wall surfaces of the movable plate.
(Corresponding Embodiment of Present Invention)

This aspect of the present invention corresponds to the eighth embodiment.
(Operation/Effect)

By placing the magnets near the two side wall surfaces of the movable plate, a larger deflection angle can be realized.

(3) The optical scanner according to aspect (2) of the present invention is characterized in that at least the two permanent magnets are connected through a yoke.
(Corresponding Embodiment of Present Invention)

This aspect of the present invention corresponds to a modification of the eighth embodiment.
(Operation/Effect)

In this optical scanner, the two magnets placed near the two side wall surfaces are connected through the yoke to realize an ideal magnetic field distribution near the driving coil which influences the driving force generated by the driving coil. In addition, unlike a structure using no yoke, this structure can efficiently convert magnetic fields into a driving force because the magnetic fields concentrate near the driving coil.

(4) The optical scanner according to each of aspects (1), (2), and (3) is characterized in that the insulating elastic film consists of an organic film.
(Corresponding Embodiment of Present Invention)

This aspect of the present invention corresponds to the eighth embodiment.
(Operation/Effect)

Since an organic film is used for the leaf spring portion, this structure is resistant to brittle fracture, and a large deflection angle can be obtained while the minimum necessary strength is maintained, as compared with the structure using silicon for the vibration member (5) The optical scanner according to each of aspects (1), (2), and (3) is characterized in that the wiring layer width and pitch of the driving coil are minimized near each permanent magnet.
(Corresponding Embodiment of Present Invention)

This aspect of the present invention corresponds to the eighth embodiment.
(Operation/Effect)

The width and pitch of the coil wiring layers which are formed near the permanent magnet and contribute to the generation of a force are reduced to allow the coil wiring layers near the permanent magnet to be placed nearer to the permanent magnet, thereby obtaining a larger force than a general coil.

The width and pitch of the coil wiring layers which do not contribute to the generation of a force are set to be sufficiently large, thereby suppressing the problem of heat.

In addition, the pitch of the coil wiring layers which do not contribute to the generation of a force is set to be large so as to improve the manufacturing yield.

As has been described in detail above, according to the eighth embodiment of the present invention, there is provided an optical scanner which vibrates at a large deflection angle and has electric elements with high durability.
(Ninth Embodiment)

An optical scanner according to a ninth embodiment of the present invention will now be described with reference to FIGS. 49–51, 52A–52I and 53–56.

FIG. 49 is a perspective view showing the structure of the optical scanner according to the ninth embodiment, FIG. 50 is a sectional view taken along a line A—A or a central axis of the optical scanner in FIG. 49, and FIG. 51 is a sectional view taken along a line B—B in FIG. 49. FIGS. 52A to 52I are views showing the manufacturing process for the optical scanner according to the ninth embodiment, FIG. 53 is a view showing the operational state of the optical scanner according to the ninth embodiment, and FIGS. 54 to 56 show modifications of the optical scanner according to the ninth embodiment.

As is shown in FIG. 49, the optical scanner according to this embodiment comprises a structure 1100 capable of vibrating its free end in a direction of arrow V, and a permanent magnet 1150 disposed to face the free end of the structure 1100. The structure 1100 comprises a support member 1110 provided at a fixed end of the structure 1100, a movable plate 1120 disposed at the free end and provided with a reflection surface serving as a mirror, and a leaf spring-like elastic member 1130 for coupling the support member 1110 and movable plate 1120. The movable plate 1120 is provided with a coil 1140 such that the coil 1140 runs around a peripheral portion of the movable plate 1120. Wiring 1141 is formed to extend over the coil 1140 from a coil end portion located at an innermost turn of the coil 1140. The wiring 1141 is connected to an electrode pad 1145 via wiring 1142 provided on the elastic member 1130. On the other hand, a coil end portion located at an outermost turn of the coil 1140 is connected to an electrode pad 1146 via wiring 1143 provided on the elastic member 1130. In the manufacturing process of the optical scanner, the wiring 1143 and wiring 1142 are formed at the same time. Thus, the wiring 1143 and the associated coil end portion are connected via a stepped portion 1144. A through-hole is formed in the elastic member 1130.

The direction magnetization of the permanent magnet 1150 is substantially parallel to the direction of vibration of the movable plate 1120. The permanent magnet 1150 is positioned such that a lower end portion or an upper end portion of the permanent magnet 1150 is opposed to the free end of the movable plate 1120 along a line extended from the plane of the coil 1140 at about 45° upward or downward. In order to achieve one-dimensional scan with high linearity, the through-hole 1160 should preferably be formed such that the center of the through-hole 1160 is positioned at the center of the width of the elastic member 1130 and that the through-hole 1160 is line-symmetric with respect to a center axis (A—A line in FIG. 49) extending perpendicular to the width of the elastic member 1130. Moreover, the through-hole 1160 should preferably be formed in such a shape (e.g. circular, oval, or polygonal with rounded corners) that no stress concentrates at a specification point when the free end of the structure 1100 is vibrating.

The cross-sectional structures of the optical scanner, along lines A—A and B—B in FIG. 49, will now be described with reference to FIGS. 50 and 51.

As is shown in FIG. 50, when the optical scanner is viewed in cross section along line A—A in FIG. 49, the support member 1110 comprises a lamination of a silicon substrate 1200, a silicon nitride film 1210, a first polyimide layer 1220, a second polyimide layer 1230 and a third polyimide layer 1240. The movable plate 1120 further includes a coil 1140 provided on the first polyimide layer 1220 in addition to the structure of the support member 1110. The elastic member 1130 comprises a lamination of the first polyimide layer 1220, second polyimide layer 1230 and third polyimide layer 1240. The through-hole 1160 is formed in the elastic member 1130 and penetrates these layers. The silicon substrate 1200 is formed of using a silicon single-crystal substrate with plane direction (100). Polyimide is an organic insulating material with elasticity, and its elastic coefficient is much lower than that of the silicon single-crystal substrate. Thus, the first to third polyimide layers serve as elastically deformable thin films.

As is shown in FIG. 51, when the support member 1110 is viewed in cross section along B—B in FIG. 49, the wiring 1142 is provided on the second polyimide layer 1230, and the electrode pad 1145 is provided on the wiring 1142. A through-hole is formed in the third polyimide layer 1240 at the location of the electrode pad 1145. The wiring 1141 extending over the coil 1140 is provided on the second polyimide layer 1230. The first polyimide layer 1220 is provided with a stepped portion 1147 for connecting the wiring 1141 and coil 1140. A through-hole is formed in the second polyimide layer 1230 at the location of the stepped portion 1147. In the elastic member 1130, the wiring 1142 is provided on the second polyimide layer 1230.

The thickness of the third polyimide layer 1240 is made substantially equal to the sum of the thicknesses of the first and second polyimide layers 1220 and 1230. In the present invention, accordingly, the coil 1140 provided within the second polyimide layer 1230 is located at a position where the thickness of the elastic member 1130 is substantially halved (i.e. the thickness being halved in the direction of lamination of respective layers).

The operation of the optical scanner having the above structure will now be described.

An AC is supplied from a power supply (not shown) to the coil 1140 via the electrode pads 1145 and 1146. If current flows through the coil 1140, a force in a predetermined direction acts on the coil 1140 owing to an interaction between a magnetic field produced by the permanent magnet 1150 and the current flowing in the coil 1140. In particular, force acts on that portion of the coil 1140, which is located near the free end of the structure 1100. In this case, the permanent magnet 1150 and part of the coil 1140 function as an actuator. Since the current flowing in the coil 1140 is an AC, the direction of force acting on the planar coil 1140 changes periodically. Those portions of the first to third polyimide layers, which are not fixed on the silicon substrate 1200, have relatively low rigidity, and thus these portions serve as leaf spring-like elastic member 1130. As a result, the movable plate 1120 vibrates in its thickness direction. The resonant frequency of the structure 1100 is definitively determined by the shape and material of the movable member 1120 and elastic member 1130. If an AC of a frequency equal to the resonant frequency is supplied to the coil 1140, the movable plate 1120 vibrates at a maximum amplitude on the basis of the value of the supplied current. If light is radiated on the reflection surface of the thus vibrating movable plate 1120, the light reflected by the reflection surface of the movable plate 1120 is reciprocally scanned in a deflecting direction determined by the deflection angle of the movable plate 1120.

A process for manufacturing the structure 100 of the optical scanner according to this embodiment will now be described with reference to FIGS. 52A to 52I.

Figure 52:
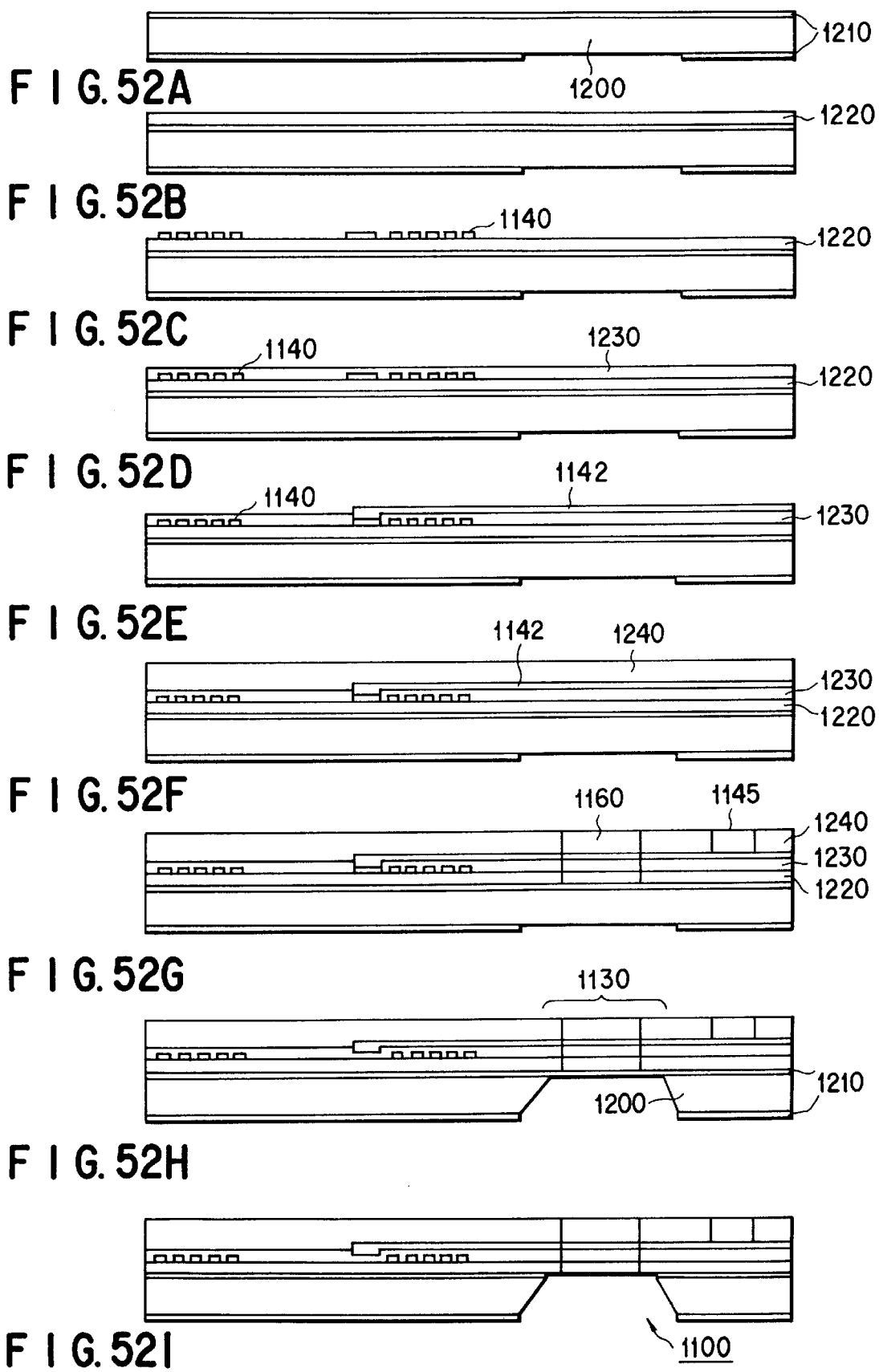
FIGS. 52A to 52I are views showing the manufacturing process for the optical scanner according to the ninth embodiment.

A silicon substrate 1200 with plane direction (100) is prepared, as shown in FIG. 52A. The silicon substrate 1200 is cleaned and silicon nitride films 1210 are formed on an obverse and a back surface of the silicon substrate 1200 by using a low-pressure CVD apparatus. Portion of the silicon nitride film 1210 on the back surface is removed and patterned by dry etching. The patterned silicon nitride film 1210 serves as a mask for forming the support member 1110 and movable plate 1120 from the silicon substrate 1200. On the other hand, the silicon nitride film 1210 on the obverse surface serves to protect the structure formed on this silicon nitride film 1210 in the process (i.e. etching process) for forming the support member 1110 and movable plate 1120 from the silicon substrate 1200.

In FIG. 52B, a first polyimide layer 1220 is formed on the front-side silicon nitride film 1210. The first polyimide layer 1220 is formed by applying a polyimide solution on the silicon substrate, uniformly forming a film of polyimide solution by means of a screen printing method or a spin coating method, and then curing the same.

In FIG. 52C, a coil 1140 of a predetermined pattern on the first polyimide layer 1220. The coil 1140 is formed in a predetermined pattern by sputtering aluminum on the first polyimide layer 1220 and selectively etching the aluminum.

In FIG. 52D, a second polyimide layer 1230 is formed on the first polyimide layer 1220 so as to cover the coil 1140. The second polyimide layer 1230, like the first polyimide layer 1220, is formed by applying a polyimide solution on the first polyimide layer 1220, uniformly forming a film of polyimide solution by means of a screen printing method or a spin coating method, and then curing the same.

In FIG. 52E, wiring 1142, 1143 (see FIG. 49) is formed on the second polyimide layer 1230. The wiring 1142, 1143 is formed in a predetermined pattern by sputtering aluminum on the second polyimide layer 1230 and selectively etching the aluminum. In this wiring forming step, the wiring 1142 needs to be formed to extend over the planar coil 1140 (see FIG. 52C). For this purpose, a polyimide portion located at the inner coil end portion of the coil 1140 is first etched away, and then aluminum is formed and patterned in the space from which the polyimide was etched away. Thus, a contact portion between the layers (i.e. the stepped portion 1147 in FIG. 51) is formed. Subsequently, aluminum is formed and patterned on the second polyimide layer 1230. In this step, the stepped portion 1144 (see FIG. 49), too, is similarly formed.

In FIG. 52F, a third polyimide layer 1240 is formed on the second polyimide layer 1230. The third polyimide layer 1240, like the first and second polyimide layers 1220 and 1230, is formed by applying a polyimide solution on the second polyimide layer 1230, uniformly forming a film of polyimide solution by means of a screen printing method or a spin coating method, and then curing the same. The third polyimide layer 1240 functions to provide predetermined characteristics to the elastic member 1130 and to prevent the wiring 1142, 1143 (see FIGS. 49 and 52E) from being exposed to air and degraded with the passing of time. The thickness of the third polyimide layer 1240 is made substantially equal to the sum of thicknesses of the first and second polyimide layers 1220 and 1230. In the finished state, the wiring 1142, 1143 provided within the elastic member is located at a position where the thickness of the elastic member is substantially halved.

In FIG. 52G, those portions of the first to third polyimide layers 1220, 1230 and 1240, which are located on the electrode pads 1145 and 1146 (see FIG. 49) and correspond to the position of the through-hole 1160, are removed by dry etching.

In FIG. 53H, in order to form the elastic member 1130, the reverse side of the silicon substrate 1200 is subjected to anisotropic etching with use of an alkali solution, while the silicon nitride film 1210 patterned on the back surface of the silicon substrate 1200 is being used as a mask. At this time, the silicon nitride film 1210 lying under the first polyimide layer 1220 serves as a mask for protecting the first polyimide layer 1220, when the silicon substrate 1200 is etched.

After the silicon substrate 1200 is etched, the silicon nitride film 1210 used as a mask for the first polyimide layer 1220 is removed by dry etching, as shown in FIG. 52I. Thus, the structure 1100 of the optical scanner of the present embodiment is obtained.

According to the optical scanner of the above-described embodiment, the structure 1100 can be formed integrally through the series of manufacturing steps. Accordingly, the assembling work is not needed and the very small optical scanner can be mass-produced at low cost. Since the structure 1100 is manufactured by applying semiconductor manufacturing techniques, precision in dimension is very high. Thus, optical scanners with very low variance in characteristics can be manufactured. Since polyimide or organic insulating material is used as material of the elastic member 1130, the possibility of occurrence of fragile-destruction is low and a large deflecting angle is obtained. Moreover, since the coil 1140 and wiring 1142, 1143 are not exposed to the surface of polyimide and are formed within the elastic member 1130, degradation with the passing of time, such as oxidation due to moisture, can be prevented.

In this embodiment, the wiring 1142, 1143 is located at a position where the thickness of elastic member 1130 is substantially halved. In general, in the operation of the optical scanner, the elastic member 1130 greatly deforms and has a large stress. In this embodiment, the movable plate 1120 is driven by mainly utilizing bending deformation of the leaf spring or elastic member 1130. In this case, a tensile stress occurs at the surface of the elastic member 1130 which deforms in a convex shape, and a compression stress occurs at the surface which deforms in a concave shape. It is thus understood that there is a predetermined portion of the leaf spring in its thickness direction, where substantially no stress occurs. If the elastic characteristics of the elastic member 1130 are uniform in its thickness direction, the stress at a position where the thickness of elastic member 1130 is substantially halved is nearly zero.

If the wiring is located at the surface of the elastic member as in the prior art, the wiring is present at the position where the stress is high. In this case, if the elastic member is driven repeatedly, the wiring may be broken due to fatigue. By contrast, in this embodiment, the elastic member 1130 has a laminated structure and the wiring 1142, 1143 is disposed at a position where the thickness of the elastic member 1130 is substantially halved. Accordingly, even if the elastic member is driven repeated for a long time period, breakage of wiring due to fatigue does not occur and the reliability of the optical scanner can be maintained. In order to obtain these advantages, it is ideal that the wirings 1142 and 1143 are formed at the same position in the thickness direction. In other words, it is ideal that the wirings 1142 and 1143 are formed on the same layer in the laminated structure fabricated in the semiconductor process. To achieve this idea, the stepped portion 1144 is formed between the coil 1140 and wiring 1143 in this embodiment.

The optical scanner of this embodiment is used, for example, in the state shown in FIG. 53. If a collimated laser beam is radiated from a laser source 1300 onto the reflection surface of the vibrating movable plate 1120, the laser beam reflected by the reflection surface of the movable plate 1120 is scanned one-dimensionally and a scan line 1302 is obtained. Scanning at a desired frequency and amplitude can be made by applying a predetermined current with a predetermined frequency to the coil 1140 (see FIG. 49) as a drive signal. Compared to the conventional scanner, this optical scanner can be greatly reduced in size. Thus, this optical scanner is suitably applied to small devices, and power consumption can be reduced.

The optical scanner according to this embodiment is normally driven at a predetermined resonant frequency in order to obtain a maximum scan amplitude. The resonant frequency is definitively determined by the shape and material of the movable plate 1120 and elastic member 1130. Strictly speaking, the resonant frequency is slightly influenced by the mechanical characteristics of the wiring disposed within the elastic member. Since in this embodiment the wiring is located at a position where the thickness of the elastic member is substantially halved, there is an advantage in that the resonant frequency is less influenced by the mechanical characteristics of the wiring.

The structures of this embodiment are not limited to those described above, and various modifications can be made. For example, the planar coil 1140 may be formed by plating, and not by sputtering and etching. In particular, when a large deflection angle is required, the number of turns of the coil needs to be increased. If the number of turns alone is increased without increasing the cross-sectional area of the coil, the resistance value of the coil increases and consequently the power supply voltage and power consumption increase. If the coil is formed by plating, however, the thickness of the coil can be made greater than in the case of the sputtering and desired specifications can be achieved.

The coil shape is not limited to the above-described one in which the coil runs around the peripheral portion of the movable member. For example, as shown in FIG. 54, the coil may run around the peripheral portion of the structure 1100 including the movable plate 1120 and 1110. In this modification, the number of wiring portions extending on the elastic member 1130 increases, and it becomes more important to keep the reliability of each wiring portion. In this case, the advantages of the above-described embodiment can be obtained by situating the respective wiring portions at a position where the thickness of the elastic member is substantially halved. In this modification, however, there is no clear distinction between the coil and wiring. Part of the coil functions both as an actuator and as wiring, and the stepped portion is not needed. Thus, the coil and wiring may be formed between the first polyimide layer and second polyimide layer, and the step of forming the third polyimide layer may be omitted. In this case, if the thickness of the first polyimide layer is made equal to that of the second polyimide layer, the coil and wiring can be situated at a position where the thickness of the elastic member is substantially halved.

The method of driving in this embodiment is not limited to the method wherein the AC with the frequency equal to the resonant frequency of the optical scanner is used to reciprocally drive the movable plate 1120. For example, the movable plate 1120 may be statically positioned by a driving method using, e.g. a variable frequency or a DC.

In this embodiment, the optical scanner using the actuator comprising the permanent magnet 1150 and coil 1140 has been described. The present invention is also applicable to a modification as shown in FIGS. 55 and 56, wherein the optical scanner uses an electrostatic actuator.

In the optical scanner of this modification, a movable electrode 1170 is provided on the surface of the movable plate 1120, and a stationary electrode 1180 opposed to the movable electrode 1170 is fixed on a fixed member (not shown). The movable electrode 1170 is electrically connectable to an external power supply 1195 via an electrode pad 1190, wirings 1142 and 143, and interlayer wirings 1171 and 1172. In this structure, if a potential difference is provided by the power supply 1195 between the electrode pad 1190 and stationary electrode 1180, electrostatic attractive force occurs between the stationary electrode 1180 and movable electrode 1170 and the movable plate 1120 is driven. Since the electrostatic attractive force is inversely proportional to the square of an inter-electrode distance, it is desirable that the stationary electrode 1180 and movable electrode 1170 be arranged at a closest possible distance. In this modification, as shown in FIG. 56, the movable electrode 1170 is formed on the surface of the movable plate 1120 opposed to the stationary electrode 1180, and the wirings 1142 and 1143 are situated at a position where the thickness of the elastic member 1130 is substantially halved. As a result, like the optical scanner using the actuator comprising the permanent magnet and coil, the stress occurring at the wiring due to deformation of the elastic member 1130 can be reduced and the reliability enhanced.

(Tenth Embodiment)

An optical scanner according to a tenth embodiment of the present invention will now be described with reference to FIGS. 57–60, 61A–61J and 62–68.

Figure 57:
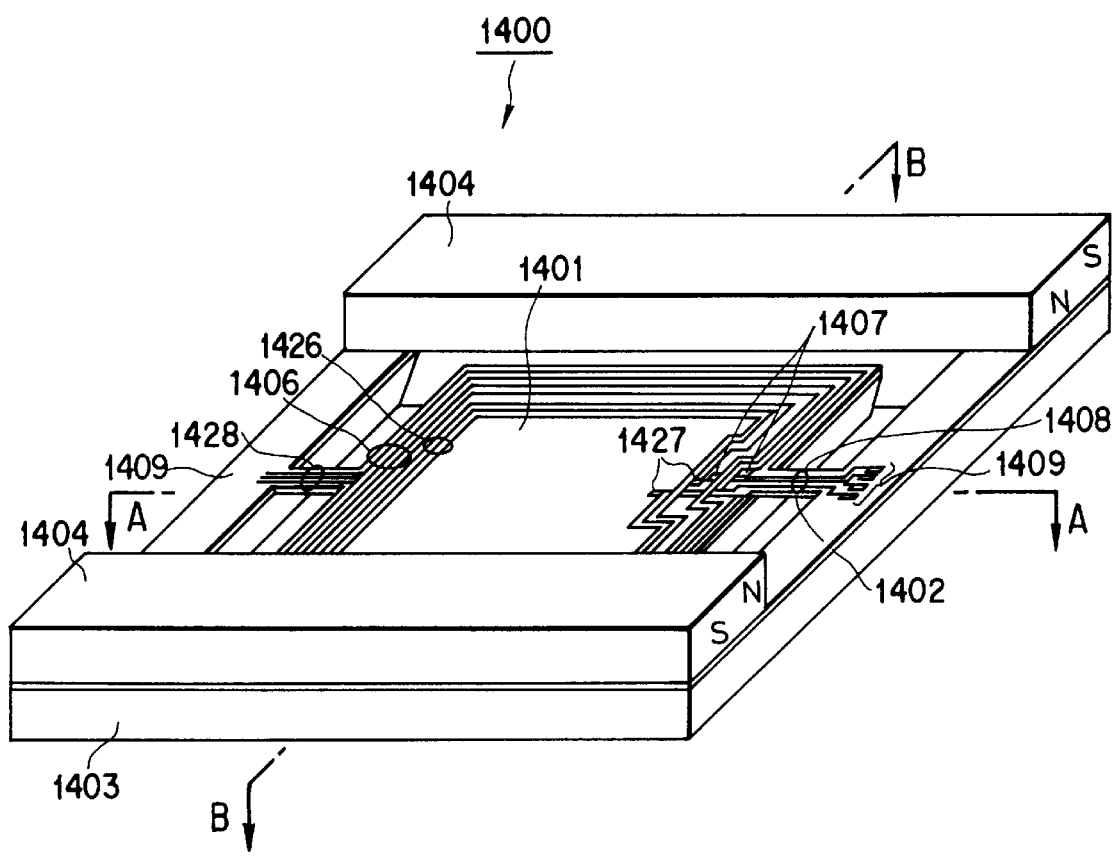
FIG. 57 is a perspective view showing the structure of an optical scanner according to a tenth embodiment of the invention.
Figure 58:
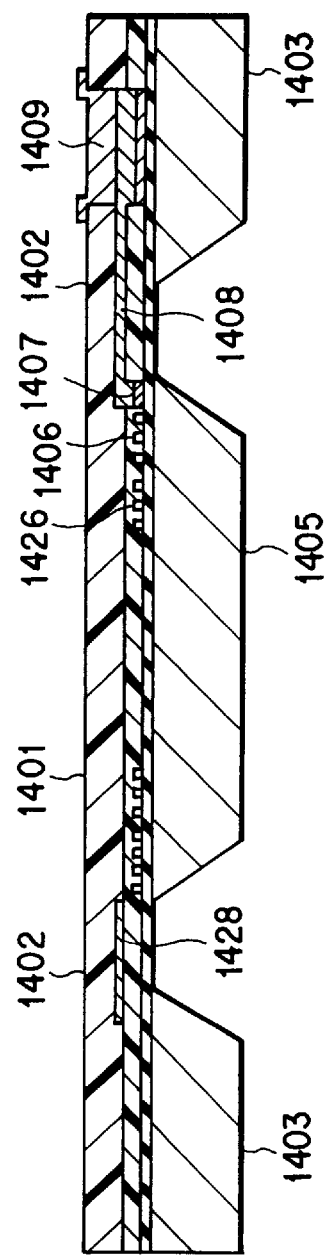
FIG. 58 is a sectional view taken along a line A—A of the optical scanner in FIG. 57.
Figure 59:
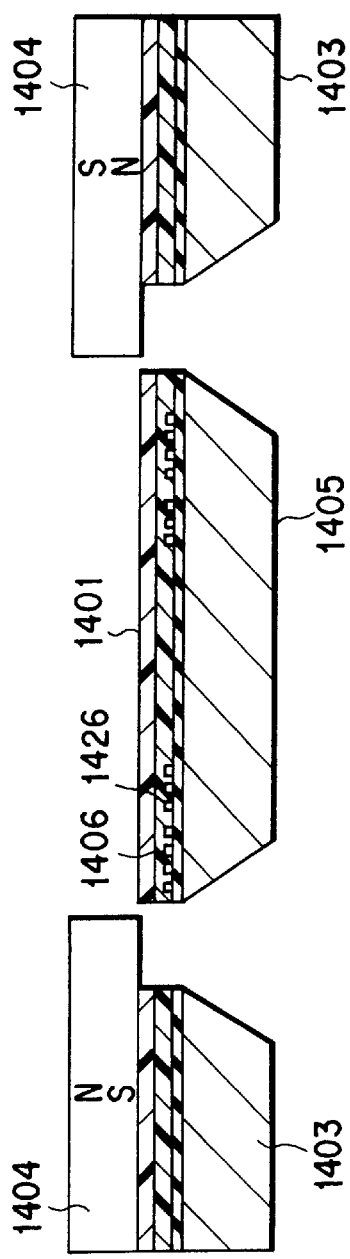
FIG. 59 is a sectional view taken along a line B—B of the optical scanner in FIG. 57.

FIG. 57 is a perspective view showing the structure of the optical scanner according to the tenth embodiment, FIG. 58 is a sectional view taken along a line A—A in FIG. 57, and FIG. 59 is a sectional view taken along a line B—B in FIG. 59. FIG. 60 is a plan view of the movable plate and elastic members. FIGS. 61A to 61J are views showing the manufacturing process. FIGS. 62 to 65 show simulation results of stress acting on the wiring of the optical scanner. FIG. 66 shows the optical scanner as applied to a laser scanning microscope, and FIGS. 67 and 68 show optical scanners according to modifications of the tenth embodiment.

As is shown in FIGS. 57, 58 and 59, the optical scanner according to this embodiment comprises a structure 1400 and permanent magnets 1404. The structure 1400 comprises a movable plate 1401, leaf spring-like or torsion-bar-like elastic members 1402, and a support member 1403. The movable plate 1401 is coupled on both sides to the support member 1403 by two elastic members 1402 such that the movable plate 1401 is supported on both sides. A reflection surface 1405 for reflecting light is formed on the movable plate 1401. In FIG. 57, the reflection surface 1405 is formed on the back surface of the movable plate 1401.

A drive coil 1406 is formed on a peripheral portion of the movable plate 1401. A vibration detection coil 1426 is formed inside the drive coil 1406. When the movable plate 1401 is vibrated, a signal proportional to the vibration velocity of the movable plate 1401 is obtained from the vibration detection coil 1426. It is preferable that the movable plate 1401 be formed mainly of such a material that the reflection surface will not deform during vibration. In this embodiment, as a main material of the movable plate 1401, single-crystal silicon (plane direction: (100)) which is a high-rigidity material is used. In addition to the single-crystal silicon, silicon nitride material, aluminum material and polyimide material are used in the movable plate 1401.

The silicon nitride material is a residual of material used as a mask in fabrication of the optical scanner, and is used as an insulating material for silicon. The aluminum material is used for wiring of the drive coil 1406, electrode pads 1407 at the beginning and end points of the drive coil, wiring for the detection coil 1426, and electrode pads 1427 at the beginning and end points of the detection coil. In addition, the aluminum material is used as mirror material for forming the reflection surface 1405, where necessary. The polyimide material is used to sandwich the drive coil 1406 and detection coil 1426 from above and below. The polyimide material insulates the coil and wiring and prevents electric elements including electrode pads 1407 and 1427 from contacting air.

The elastic members 1402 are formed mainly of polyimide film extending from the movable plate 1401. As is shown in FIG. 57, one of the two elastic members 1402 and the other are provided on the right and left sides of the movable plate 1401, respectively. Four wiring elements 1408 extending from the electrode pads 1407 and 1427 to the support member 1403 are formed inside the elastic member 1402 on the right side in FIG. 57. These wiring elements 1408 are formed of aluminum material. On the other hand, dummy wiring elements 1428 connected to nowhere are formed inside the elastic member on the left side of FIG. 57. The right and left elastic members 1402 thus have substantially equal mechanical characteristics.

The support member 1403 formed to surround the movable plate 1401 is used as an attachment portion for attaching the optical scanner to the outside. Four electrode pads 1409 for supplying external power to the drive coil 1406 and detection coil 1426 via the wiring 1408 are formed on the support member 1403. In this embodiment, the four electrode pads 1409 are all provided on the same side (the right side in the figure) on the support member 1403 and are arranged close to one another. As a result, the four electrode pads 1409 can be connected to the outside in one step, for example, by using a flexible printed board.

The support member 1403 is formed mainly of single-crystal silicon. The single-crystal silicon has high rigidity and is suitable for fixation on the outside. Silicon nitride material, aluminum material and polyimide films are also used in the support member 1403. The silicon nitride material is used as mask material in fabrication of the optical scanner, the aluminum material is used to form the electrode pads 1409 and wiring elements 1408 and 1428, and the polyimide films are used to sandwich the wiring 1408 from above and below and to prevent it from contacting air. The polyimide films extend from the movable plate 1401 and elastic member 1402. The single-crystal silicon of support member 1403 and that of the movable plate 1401 are formed of the same substrate.

In the optical scanner of this embodiment, the two permanent magnets 1404 are disposed on the support member 1403 so as to be opposed to vibration ends of the movable plate 1401. The direction of magnetization of each permanent magnet 1404 is parallel to the thickness direction of the movable plate 1401. The permanent magnets 1404 are positioned such that their lower end portions or upper end portions are opposed to the vibration ends of the movable plate 1401 along lines extended from the plane of the drive coil 1406 at about 45° upward or downward.

FIG. 60 is a plan view of the movable plate 1401 and elastic members 1402. FIG. 60 also shows the drive coil 1406, detection coil 1426 and wirings 1408 and 1428 for the purpose of convenience. The drive coil 1406 is provided on a peripheral portion of the movable plate 1401, and the detection coil 1426 is formed inside the drive coil 1406. All four lead wires 1408 connecting the movable plate and support member via the inside of the elastic member 1402 pass through the elastic member 1402 on the right side in FIG. 60. On the other hand, four dummy wiring elements 1428 are formed in the elastic member 1402 on the left side in FIG. 60.

Each elastic member 1402 in this embodiment are formed of a plurality of polyimide layers. The wirings 1408 and 1428 are formed between polyimide layers at a position where the thickness of the elastic member 1402 is substantially halved. The wiring elements 1402, 1428 are arranged symmetrical and close to one another with respect to a position where the elastic member 1402 is substantially divided into two in its width direction.

The operation of the optical scanner according to this embodiment will now be described.

If an AC is supplied to the drive coil 1406 from the two electrode pads 1409, a Lorentz's force occurs in the drive coil 1406 due to an interaction between the drive coil 1406 and permanent magnets 1404. The direction of the force is determined by the positional relationship between the permanent magnets 1404 and drive coil 1406. In this case, the force occurs in the thickness direction of the movable plate 1401. Accordingly, the basic vibration of the movable plate 1401 is a torsional vibration about a longitudinal center axis extending through the two elastic members 1402. The moment for causing the torsional vibration is determined by a product (Lorentz's force X distance) of the Lorentz's force produced in the drive coil 1406 near the permanent magnets 1404 and the distance between the longitudinal center axis of the two elastic members 1402 and the drive coil 1406 near the permanent magnets 1404. The Lorentz's force is determined by the characteristics of the permanent magnets 1404, the number of turns of the drive coil 1406, the length of wiring, the current, the distance between the permanent magnets 1404 and the drive coil 1406, etc. The drive coil 1406 is formed around the outermost peripheral portion of the movable plate 1406 in order to increase the Lorentz's force and moment as much as possible.

If an AC is supplied to the drive coil 1406 in the state in which the support member 1403 is fixed to the outside, the movable plate 1401 vibrates, with the center of vibration being at boundary portions between the support member 1403 and elastic members 1402. In this case, the permanent magnets 1404 and the portions of the drive coil 1406, which are opposed to the permanent magnets 1404, function as an actuator. If an AC having a frequency equal to the resonant frequency determined definitively by the shape and material of the movable plate 1401 and elastic members 1402 is applied to the movable plate 1401, the movable plate 1401 begins to vibrate at a maximum amplitude corresponding to the value of the AC.

On the other hand, if the movable plate 1401 vibrates, the vibration detection coil 1426 moves within the magnetic field produced by the permanent magnets 1404. At this time, an electromotive force occurs in the vibration detection coil 1426 due to electromagnetic induction. The polarity of the electromotive force is determined by the direction of movement of the vibration detection coil 1426, and the absolute value of the electromotive force is determined by the magnetic flux density, the number of turns of the coil, the velocity of movement of the coil, the length of coil within magnetic field, etc. Accordingly, a signal proportional to the vibration velocity of the movable plate 1401 is output from the vibration detection coil 1426, and the condition of vibration can be monitored or controlled on the basis of this signal.

The method of manufacturing the optical scanner according to the present embodiment will now be described with reference to FIGS. 61A to 61J.

Figure 61:
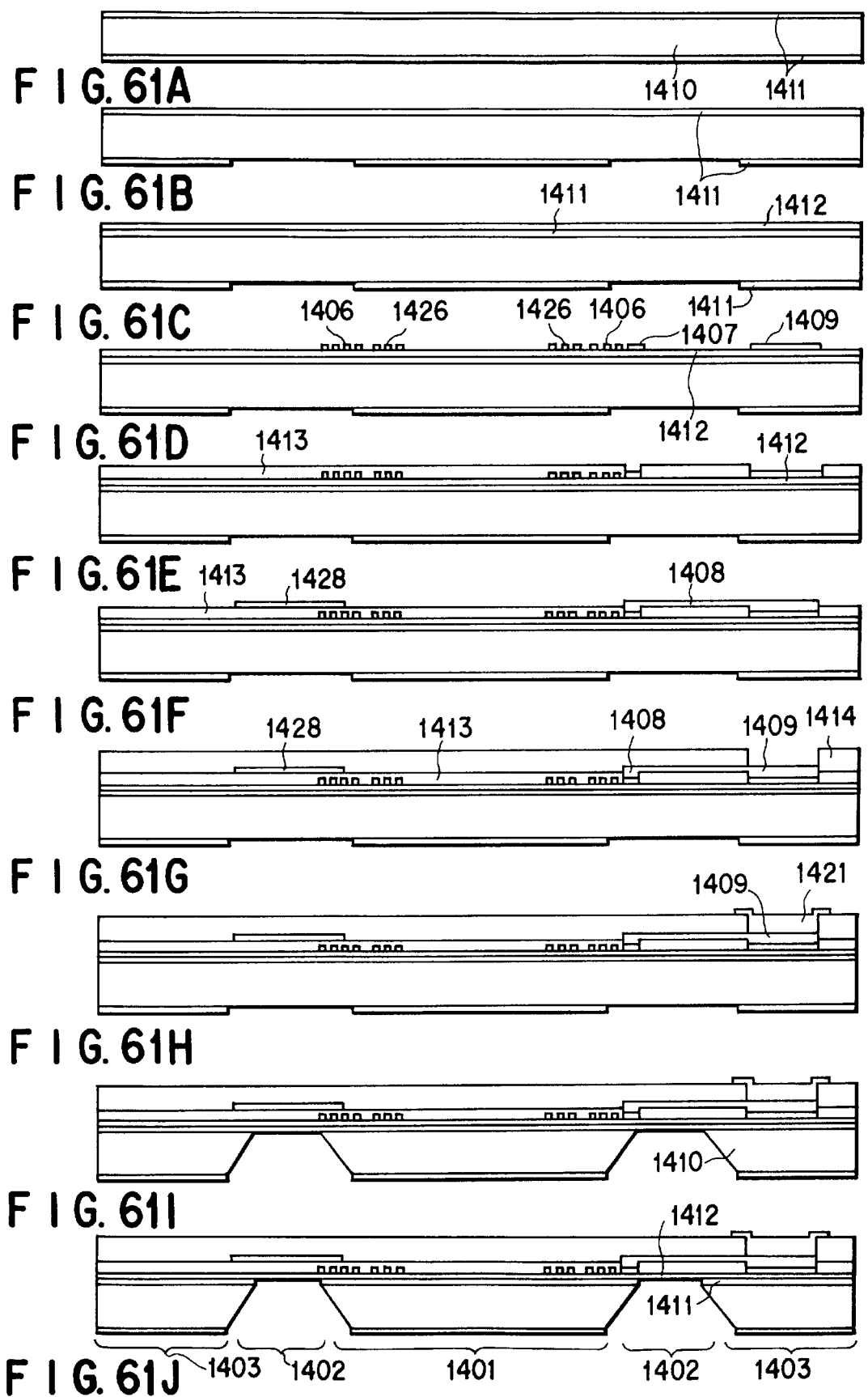
FIGS. 61A to 61J are views showing the manufacturing process for the optical scanner according to the tenth embodiment.

This optical scanner can be manufactured by semiconductor fabrication techniques. A silicon substrate 1410 is cleaned and silicon nitride films 141 are formed on an obverse and back surface of the silicon substrate 1410 by using a low-pressure CVD apparatus (FIG. 61A). The silicon nitride films 1411 formed on the obverse and back surfaces of silicon substrate 1410 are used as masks for separating the movable plate 1401 and support member 1403. For this purpose, a portion (for removing silicon) of the reverse-side silicon nitride film 1411 is removed in advance by dry etching using fluorine-based material (FIG. 61B). Subsequently, a first polyimide layer 1412 is formed on the front-side silicon nitride film 1411 (FIG. 61C). The first polyimide layer 1412 is formed by applying a polyimide solution on the silicon nitride film 1411, uniformly forming a film of polyimide solution by means of a screen printing method or a spin coating method, and then curing the same.

After sputtering aluminum material on the first polyimide layer 1412, the aluminum material is etched to form the drive coil 1406, detection coil 1426 and electrode pads 1407, 1427 and 1409 (FIG. 61D).

Subsequently, a second polyimide layer 1413 is formed on the first polyimide layer 1412. The second polyimide layer 1413, like the first polyimide layer 1412, is formed by applying a polyimide solution on the first polyimide layer 1412, uniformly forming a film of polyimide solution by means of a screen printing method or a spin coating method, and then curing the same. At this time, polyimide on the electrode pads 1407, 1427 and 1409 are removed (FIG. 61E).

After sputtering aluminum material on the second polyimide layer 1413, the aluminum material is etched to form the wiring 1408 and dummy wiring 1428 (FIG. 61F). A third polyimide layer 1414 is then formed on the second polyimide layer 1413. The third polyimide layer 1414 is formed to determine the rigidity of the elastic members 1402 and protect the wiring 1408, dummy wiring 1428 and electrode pads 1407 and 1427 from air. In this case, the thickness of the third polyimide layer 1414 is determined such that the wiring 1408 and dummy wiring 1428 provided on the second polyimide layer 1413 are located within the elastic members 1402 in a position where the thickness of the elastic members 1402 is substantially halved. Following the formation of the layers, the polyimide on the electrode pads 1409 is removed (FIG. 61G). The electrode pads 1409 are used for connecting the wiring to the external power supply. For example, in order to make the electrode pads 1409 suitable for wire bonding, aluminum 1421 is further laminated by sputtering (FIG. 61H). Thereafter, the reverse side of the silicon substrate 1410 is subjected to anisotropic etching with use of an alkali solution in order to form the movable plate 1401 and support member 1403 (FIG. 61I).

Since the silicon nitride film 1411 lies under the first polyimide layer 1412 forming the elastic members 1402, the first polyimide layer 1412 is protected by the silicon nitride film 1411 when the silicon substrate 1410 is subjected to the anisotropic etching. Following the etching, the silicon nitride film 1411 exposed to the reverse side of the elastic members 1402, movable plate 1401 and support member 1403 is removed by dry etching (FIG. 61J).

Thereafter, though not shown, the first to third polyimide layers 1412, 1413 and 1414 are removed from the reverse side by dry etching using oxygen-based material, thereby forming the movable plate 1401, elastic members 1402 and support member 1403. An aluminum material is sputtered on the surface reflecting light, where necessary, thereby to form the reflection surface 1405 with high reflectance. Thus, the manufacture of the optical scanner is completed.

According to the optical scanner of the above-described embodiment, the structure 1400 can be formed integrally by making use of semiconductor fabrication technique. Accordingly, the assembling work of respective parts is not needed and the very small optical scanner can be mass-produced at low cost. Moreover, the optical scanner with very high precision in dimension and very low variance in characteristics can be manufactured. Since polyimide or organic insulating material is used as material of the elastic members 1402, the possibility of occurrence of fragile-destruction is low and a large deflecting angle is obtained. Moreover, since the drive coil 1406, detection coil 1426, wiring 1408 and dummy wiring 1428 are not exposed to the surface of polyimide and are formed within the elastic members 1402, degradation with the passing of time, such as oxidation due to moisture, can be prevented.

Besides, in the present embodiment, the four wiring elements 1408 are situated at a position where the thickness of the elastic members 1402 is substantially halved. In general, when the torsion-bar type optical scanner such as the optical scanner of the present embodiment is operated, the elastic members 1402 are greatly torsion-deformed and as a result a stress occurs. In this case, as a matter of course, a stress acts on the wiring 1408 situated within the elastic member 1402. The stress acting on the wiring 1408 is, for example, bending stress, tensile stress, torsional stress, etc. According to the simulation result obtained by using the finite element method, the absolute value of the bending or tensile stress is much greater than that of the torsional stress. Thus, attention was paid to the tensile stress and bending stress, and the position of the wiring 40 was varied along the thickness of the elastic members 1402. The simulation results of the tensile stress and bending stress acting on the wiring 1408, which were obtained in this case, are shown in FIGS. 62 and 63.

In the simulation, the width in cross section of each of the four aluminum wiring elements 1408 was set at 100 μm, the thickness in cross section of each wiring element was set at 2 μm, and the distance between centers of wiring elements 1408 was set at 200 μm. The wiring elements 1408 are arranged symmetric with respect to a line along with the width of the elastic member 1402 is substantially halved. In FIGS. 62 and 63, the two-division point in the thickness direction of the elastic member 1402 is set at zero on the abscissa (wiring position), and a positive region and a negative region are set on both sides of the zero on the abscissa. The positive region corresponds to the upper side in FIG. 58, and the negative region to the lower side in FIG. 58. According to the simulation result, as the wiring element 1408 departs from the substantial two-division point in the thickness direction of elastic member 1402, the stress value of the tensile stress increases. Although the rate of variation of the bending stress is not so high, the stress value of the bending stress increases as the wiring element departs from the two-division point in the thickness direction. If influences of both stresses are considered together, the stress value is minimum at the two-division point in the thickness direction.

As is clear from the above, if the wiring 1408 is situated on the surface of the elastic element 1402 as in the prior art, the wiring 1408 is present at the position where the stress is high. In this case, if the elastic member 1402 is driven repeatedly, high stress occurs in the wiring and breakage due to fatigue may occur. By contrast, in the structure of the present invention, the wiring 1408 is situated at the position where the stress is minimum. Thus, the reliability of the optical scanner can be maintained for a long time.

Moreover, in the present embodiment, the four wiring elements 1408 are arranged closely and symmetrically with respect to a central position corresponding to the substantial two-division point in the width direction of the elastic member 1402. The advantage of this arrangement will now be described with reference to FIGS. 64 and 65. FIGS. 64 and 65 show simulation results of stress values obtained when the interval of the wiring elements is varied in the state in which the four wiring elements 1408 are situated within the elastic member 1402. If the interval of wiring element is increased, the wiring 1408 is arranged near the periphery of the elastic member 1402, when the elastic member 1402 is viewed from above. As is clear from the simulation result, as the interval of wiring elements decreases, the value of bending stress decreases. It follows from this that the reliability of wiring can be maintained for a long time by situating the four wiring elements 1408 concentratedly near the substantial two-division point in the width direction of the elastic member.

Like the first embodiment, in the optical scanner of this embodiment, external light is radiated on the vibrating movable plate and the reflected light can be scanned one-dimensionally. For example, this optical scanner can be incorporated in a laser scanning microscope shown in FIG. 66. An emission beam from a laser light source 2001 is converged by a lens 2002 and passed through a pinhole 2003. Further, the beam is passed through a dichroic mirror 2004 and collimated by a lens 2005. The collimated beam is guided to an objective lens 2008 via a X-directional scan mirror 2006 and a Y-directional scan mirror 2007. The beam is then converged by the objective lens 2008 on the surface of an object 2009. The optical scanner (shown in a circle) of this embodiment is used in each of the X-directional scan mirror 2006 and Y-directional scan mirror 2007. Accordingly, if the X-directional scan mirror 2006 and Y-directional scan mirror 2007 are driven in the directions of arrows, the light converged via the objective lens 2008 on the surface of object 2009 can be scanned two-dimensionally. The reflected light from the object 2009 travels in the reverse direction and passes through the lens 2005. The light is then reflected by the dichroic mirror 2004, and converged at a pinhole 2010. The light alone, which has passed through the pinhole 2010, reaches a photomultiplier 2011 and is detected.

In the laser scanning microscope in which the optical scanner of this embodiment is incorporated, the X-directional scan mirror 2006 is used, for example, for high-speed scan and the Y-directional scan mirror 2007 is used for low-speed scan. If these mirrors are properly selected and driven, the surface of the object 2009 is raster-scanned. The X-directional scan mirror 2006 needs to be driven at high speed with a predetermined scan length and thus the movable plate 1401 is normally driven at a resonant frequency thereof.

The resonant frequency is definitively determined by the shape and material of the movable plate 1401 and elastic members 1402. Strictly speaking, the resonant frequency is slightly influenced by the mechanical characteristics of the wiring 1408 situated within the elastic member 1402. In this embodiment, the wiring 1408 is situated at a substantial two-division position in the thickness direction and in the width direction of the elastic member 1402. Accordingly, the mechanical characteristics of the wiring 1408 do not greatly influence the resonant frequency. On the other hand, the Y-directional scan mirror 2007 may be driven at a lower speed than the X-directional scan mirror 2006. Thus, as long as a predetermined scan length is maintained, the movable plate 1401 may be driven at the resonant frequency or a non-resonant frequency. The movable section of the optical scanner of this embodiment can be more reduced in size than in the prior art, and the high-speed observation can be easily achieved. In particular, if the optical scanner of this embodiment is used for the mirror which needs to be driven at high speed (the X-directional scan mirror 1006 in this embodiment), the high-speed observation of the laser scanning microscope can be achieved.

The present embodiment is not limited to the above-described structure, and various modifications and changes can be made. For example, the drive coil 1406 and detection coil 1426 may be formed by plating, and not by sputtering and etching. In particular, when a large deflection angle is required, the number of turns of the coil needs to be increased. If the number of turns alone is increased without increasing the cross-sectional area of the coil, the resistance value of the coil increases and consequently the power supply voltage and power consumption increase. If the coil is formed by plating, however, the thickness of the coil can be made greater than in the case of the sputtering, the aspect ratio is increased and desired specifications can be achieved. In addition, if the aspect ratio of the drive coil 1406 is increased, the width occupied by the drive coil 1406 can be reduced. As a result, the detection coil 1426 can be arranged near the peripheral portion of the movable plate 1401, and the sensitivity of the detection coil can be increased.

In the present embodiment, the drive coil 1406 and detection coil 1426 are provided individually. However, a single coil may be used for both driving and detection. In this case, the single coil may be selectively connected to the power supply or a detection circuit by means of, e.g. a change-over switch. The coil connected to the power supply functions as a drive coil, and the coil connected to the detection circuit functions as a detection coil.

The method of driving in this embodiment is not limited to the method wherein the AC with the frequency equal to the resonant frequency is used to reciprocally drive the movable plate. For example, the movable plate may be driven with use of a variable method, or statically positioned with use of a DC.

In this embodiment, the actuator comprising the permanent magnets and coils is used. This embodiment, however, may be modified such that an electrostatic actuator is used. FIG. 67 is a perspective view showing the structure of the optical scanner using the electrostatic actuator, and FIG. 68 is a sectional view taken along line A—A in FIG. 67.

In this modification, two movable electrodes 1451 and 1452 are provided on the surface of the movable plate 1401. A stationary electrode 1453 is fixed to a fixed member (not shown) so as to face the movable electrodes 1451 and 1452. The movable electrodes 1451 and 1452 are electrically connectable to an external power supply via electrode pads 1409, wirings 1408 and interlayer wiring 1454. The electrode pads 1409 and stationary electrode 1453 are connected to a power supply 1456 via a switch 1455. The switch 1455 is constructed so as to selectively apply a voltage between the stationary electrode 1453 and movable electrode 1451 or between the stationary electrode 1453 and movable electrode 1452. If voltage is applied between the stationary electrode 1453 and movable electrode 1451 or between the stationary electrode 1453 and movable electrode 1452, a potential difference is provided therebetween. As a result, an electrostatic attractive force occurs therebetween and the movable plate 1401 is driven in a predetermined direction. In this modification, the movable electrodes 1451 and 1452 are formed on the surface of the movable plate 1401, but the wirings 1408 are situated at a position where the thickness of the elastic members 1402 is substantially halved. As a result, when the elastic members 1402 are deformed, the stress acting on the wirings 1408 can be reduced and the reliability of the optical scanner maintained.

The driving method in this modification is not limited to the above-described switching method. For example, two variable electrodes are connected to the respective movable electrodes and a predetermined voltage may be applied between the electrodes.

(Eleventh Embodiment)

An optical scanner according to an eleventh embodiment of the invention will now be described with reference to FIGS. 69–71 and 72A–72J.

Figure 69:
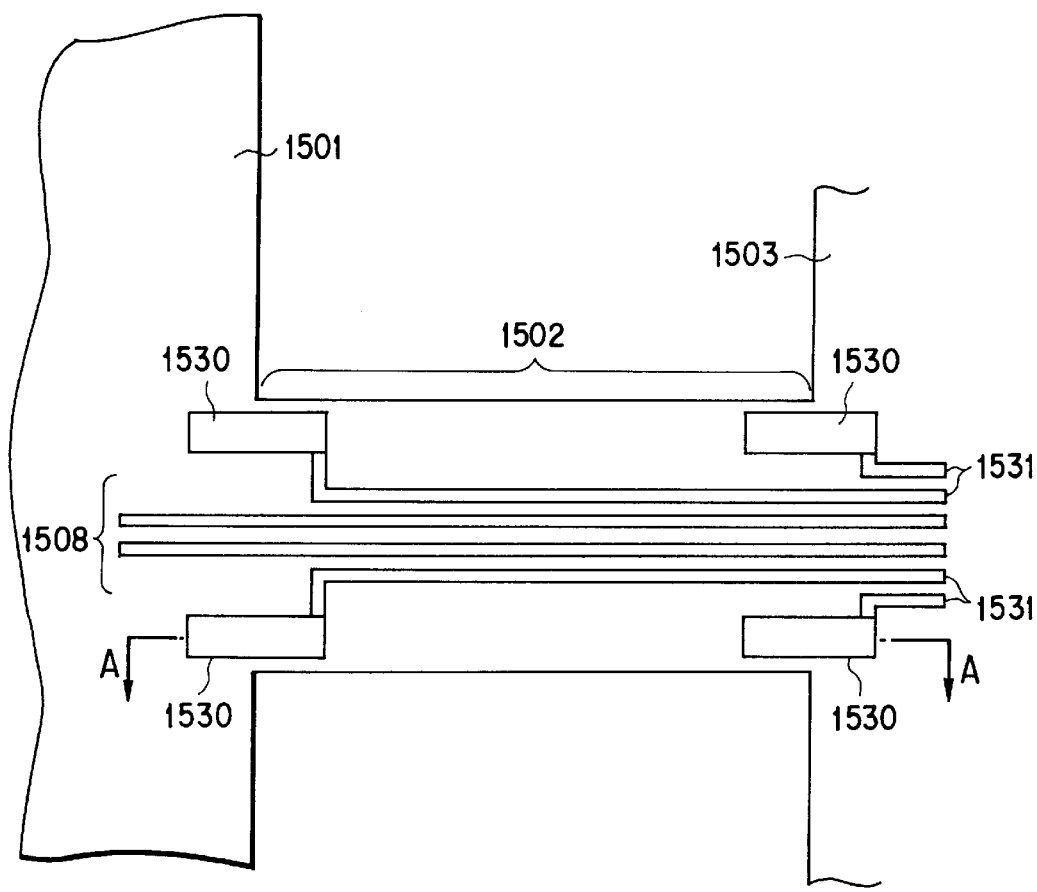
FIG. 69 is a plan view showing an elastic member of an optical scanner according to an eleventh embodiment of the invention.
Figure 70:
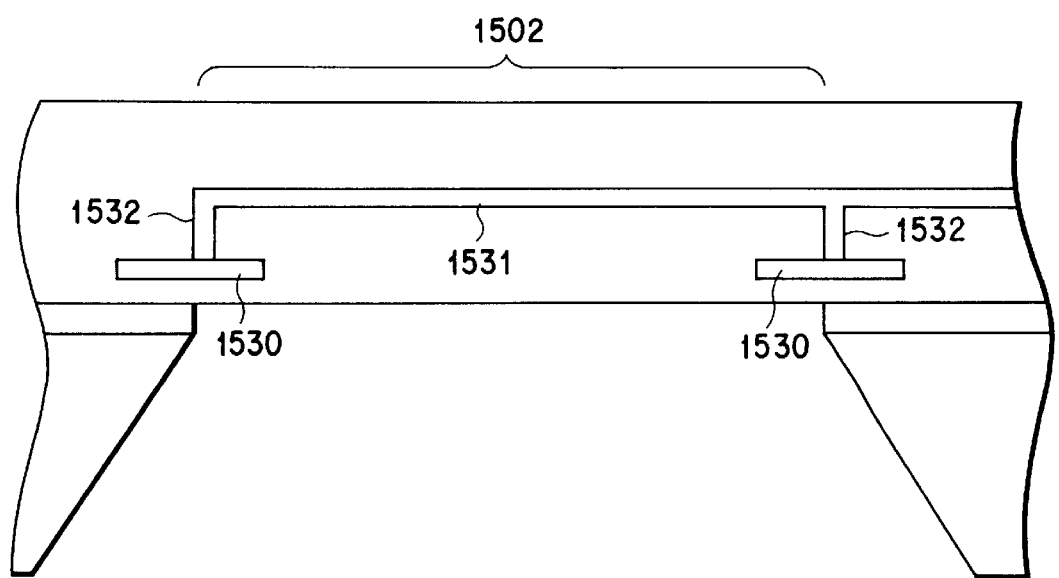
FIG. 70 is a sectional view taken along a line A—A of the optical scanner in FIG. 69.
Figure 73:
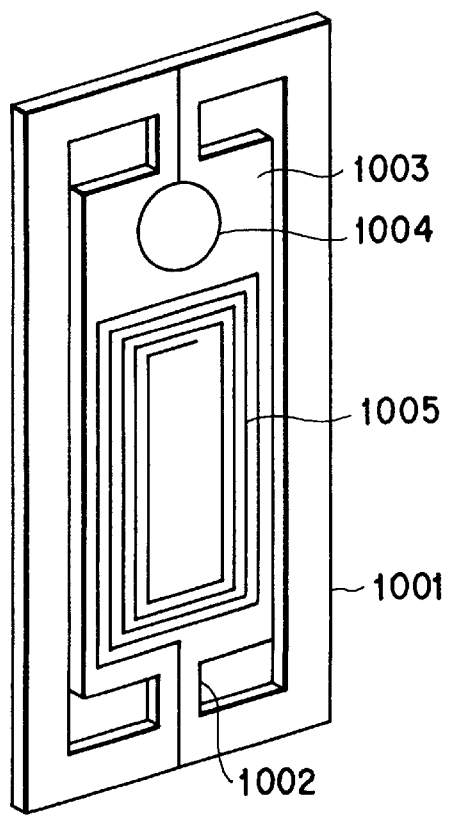
FIG. 73 is a perspective view showing a conventional optical scanner.

FIG. 69 is a plan view showing an elastic member 1502 of the optical scanner according to the eleventh embodiment. FIG. 70 is a sectional view taken along line A—A in FIG. 69. FIG. 71 is a block diagram showing a control circuit for the optical scanner of the eleventh embodiment, and FIGS. 72A to 72J show manufacturing steps of the optical scanner of the eleventh embodiment.

In addition to the structure of the optical scanner according to the 10th embodiment, the optical scanner of this embodiment incorporates strain gages. By detecting the amount of strain, the vibration of the movable plate can be monitored. Moreover, the optical scanner of this embodiment includes a self-stimulus oscillation circuit for constantly vibrating the movable plate with a reflection surface at a resonant frequency. In the other respects of the structure, the optical scanner of this embodiment is common to that of the tenth embodiment. Thus, the common structural elements are denoted by like reference numerals and a description thereof is omitted.

FIG. 69 shows wiring 1508 disposed within the elastic member 1502, for the purpose of convenience.

The optical scanner of this embodiment has a torsion bar type structure, like the tenth embodiment. Two wiring elements 1508 connected to a drive coil 1506 (see FIG. 72D) are disposed within the elastic member 1502 at a position where the thickness of the elastic member is substantially halved, as in the tenth embodiment. The two wiring elements 1508 are arranged concentrated and symmetric with respect to the position where the elastic member is substantially divided into two in its width direction. In the tenth embodiment the vibration detection coil is provided on the movable plate, whereas in this embodiment such a vibration detection coil is not provided. Four strain gages 1530, instead of the vibration detection coil, are provided at four corners of the elastic member 1502. Each strain gage 1530 is constructed to measure the amount of strain of the elastic member 1502. The strain gage 1530 is, in general, formed by doping phosphorus in polysilicon or by using a thin film of platinum or titanium. In any of these methods, a semiconductor process can be utilized to form the strain gage in a thin film shape. Four wiring elements 1531 extend from the four strain gages 1530. The two wiring elements 1531 extending from the two strain gages 1530 formed at the boundary between the movable plate 1501 and elastic member 1502 pass through the inside of the elastic member 1502 and reach a support member 1503. Outputs from the stain gages 1530 are supplied to a bridge circuit (not shown) provided on the support member 1503 or outside the optical scanner via the wiring 1531, and a variation in resistance due to strain is detected.

In the ninth and tenth embodiments, the description was given of the advantage of situating the wiring at the location where the stress within the elastic member is lowest. In the present embodiment, however, it is desirable that the strain gages be situated at the locations where the strain is highest, that is, the stress is greatest, in order to increase the detection sensitivity of the strain gages as high as possible. In this case, since the stress increases toward the periphery of the elastic member in the thickness and width directions of the elastic member, the strain gages should preferably be situated near the periphery of the elastic member.

Accordingly, in this embodiment, as shown in FIG. 69, the strain gages 1530 are arranged nearly at four corners of the rectangular elastic member 1502. If attention is paid to the absolute value of stress, it is ideal that the strain gages 1530 are exposed to the surface of the elastic member 1502 in its thickness direction. If the strain gages 1530 are exposed to air, however, the gages 1530 may possibly degrade with the passing of time. It is thus considered optimal that the strain gages are situated within the elastic member 1502 and near the periphery of the elastic member 1502.

As is shown in FIG. 70, the strain gages 1530 are situated within the elastic member 1502 and near the lower part of the elastic member 1502 in its thickness direction. On the other hand, the wiring 1531, like the wiring 1508 (see FIG. 69) connected to the drive coil, is situated at the substantial two-division point in the thickness direction of the elastic member 1502.

The strain gages 1530 and wiring 1531 are connected by interlayer wiring 1532.

The operation of the optical scanner of this embodiment will now be described.

If current is supplied to the drive coil 1506 and the movable plate 1501 is displaced, the amount of strain of the elastic member 1502 is measured by the strain gages 1530. At this time, outputs from the strain gages 1530 are amplified by a strain detection circuit 1551, as shown in FIG. 71. An output from the strain detection circuit 1551 is an AC. If an input waveform is a sine waveform, an output of the strain detection circuit 1551 is also a sine wave. An output signal from the strain amount is input to a BPF (Band Pass Filter) 1552, and a noise signal, other than a signal near a resonant frequency, is removed. The phase of the signal from the BPF 1552 is adjusted by a phase device 1553. While the optical scanner vibrates at a resonant frequency, the phase device corrects a phase error between the input waveform and the output waveform and delivers the corrected signal to an amplifier 1554. The amplifier 1554 serves also as a power supply. The amplifier 1554 determines a maximum voltage value and thus keeps the deflection angle of the movable plate 1501 constant at the time of resonance. The strain detection circuit 1551, phase device 1553 and amplifier 1554 constitute the self-stimulus oscillation circuit. With this structure, the movable plate 1501 is always driven and controlled at the resonant frequency.

FIGS. 72A to 72J illustrate a method of manufacturing the optical scanner of this embodiment. This method is basically the same as the method in the tenth embodiment. Different steps alone will be described below.

After a first polyimide layer 1512 is formed, aluminum material is patterned to form the drive coil 1506 and electrode pads 1507 and 1509. Before a second polyimide layer 1513 is formed, strain gages 1530 are formed at predetermined positions (preferably near four corners of the elastic member) (FIGS. 72A–72D). The materials used in the respective steps are the same as described in the preceding embodiments. In this step, it is desirable to thin as much as possible the first polyimide layer 1512 to such a degree that the reliability of each electric element disposed within the optical scanner can be maintained, in order to situate the strain gages 1530 at positions with high stress. In this case, the electric elements such as coil 1506 are formed at the same position in the thickness direction. Since each electric element is formed at a portion with high rigidity (i.e. the portion constituting the movable plate 1501 or support member 1503), the stress acting on the electric element can be ignored. In the left part of the elastic member 1502 in FIG. 72D, dummy gages 1540 are formed to substantially equalize the characteristics of the right and left parts of the elastic member 1502. Moreover, the same electric elements as those formed within the right part of the elastic member 1502 are formed within the left part of the elastic member 1502 for the same reason. A description of this step is omitted.

After the second polyimide layer 1513 is formed, the portions on the electrode pads 1507 and 1509 and strain gages 1530 are patterned (FIG. 72E). Interlayer wirings 1532 and 1542 are formed at the patterned portions. Wiring 1508 connected to the drive coil 1506 and wirings 1531 and 1541 connected to the strain gages 1530 and dummy gages 1540 are formed on the interlayer wirings 1532 and 1542 (FIG. 72F). In this case, it is desirable to situate the wirings 1531 and 1541 at the substantial two-division point in the thickness direction of the elastic member 1502. The other steps are the same as those in the tenth embodiment.

According to the optical scanner of this embodiment, the strain gages 1530 are disposed within the elastic member 1502 to directly measure the amount of strain of the elastic member 1502. Thereby the deflection angle of the movable plate 1501 can be directly found. Since the strain gages 1530 can be formed monolithically with the optical scanner body by using the semiconductor process, the strain gages 1530 can be integrated without great change in manufacturing steps.

According to this embodiment, the electric elements such as wirings 1508 and 1531 are situated within the elastic member 1502 and thus the reliability of the optical scanner can be maintained for a long time. Since these wirings are situated in a concentrated manner near a position where the thickness of the elastic member is substantially halved and also the width thereof is substantially halved, the stress acting on the wirings can be reduced. As a result, breakage of wires can be remarkably prevented. At the same time, in order to increase as high as possible the sensitivity of the strain gages or detection elements, the strain gages are situated at positions with high stress both in the thickness and width directions of the elastic member. Therefore, the scanner characteristics can be optimized.

Like the tenth embodiment, the scanner of this embodiment can be applied to a laser scanning microscope.

In the present embodiment, the elastic member 1502 is described as mainly performing torsional vibration.

However, as in the ninth embodiment, the elastic member 1502 may be adapted to mainly perform bending vibration.

In the case of bending vibration, the arrangement in the width direction of the elastic member is not so important. Only by optimizing the arrangement in the thickness direction, can the characteristics of the optical scanner be optimized.

In the present embodiment, the strain resistance effect is utilized to measure the deformation amount of the elastic member. However, a variation in resistance value due to a variation in volume of the resistor may be utilized. Needless to say, such various modifications as were described in connection with the ninth and tenth embodiments can be made.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical scanner comprising:

a support member for fixation on a given member;

a movable plate provided with a reflection surface for reflecting light; an elastic member coupling the movable plate and the support member, the elastic member comprising a plurality of laminated organic elastic insulating layers; and an electric element comprising (i) an actuator, provided on the movable plate, for making a driving force act between the movable plate and the support member, and (ii) wiring for use in supplying an electric signal to the actuator, the electric element being designed to supply a predetermined signal to the actuator through the wiring so that the elastic member is elastically deformed to deflect the movable plate, to thereby produce the driving force, the electric element being provided between the organic elastic insulating layers in the elastic member.

2. The optical scanner according to claim 1, further comprising another elastic member identical to the elastic member, and wherein the two elastic members are provided to connect both sides of the movable plate to the support member.

3. The optical scanner according to claim 2, wherein one of the elastic members is provided with the electric element for supplying the electric signal to the actuator, and the other is provided with a dummy electric element.

4. The optical scanner according to one of claims 1 and 2, wherein said electric element is provided in a position where the thickness of the elastic member in the direction of the lamination is substantially halved.

5. The optical scanner according to one of claims 1 and 2, wherein said electric element is provided in a position where the width of the elastic member is substantially halved, and the width direction of the elastic member is perpendicular to the thickness direction of the elastic member and to a direction of a line extending from the support member to the movable plate.

6. The optical scanner according to one of claims 1 and 2, wherein one of the elastic member and the movable plate is provided with detection means for detecting displacement of the movable plate, and the electric element includes wiring of the detection means.

7. The optical scanner according to claim 6, wherein said detection means includes a resistor capable of detecting a deflection angle of the movable plate on the basis of the state of deformation of the elastic member, and wherein the resistor is provided at the elastic member.

8. The optical scanner according to claim 7, wherein the resistor comprises a piezoresistor.

9. The optical scanner according to claim 7, wherein said detection means is provided within the elastic member and near a peripheral portion of the elastic member in the thickness direction and the width direction of the elastic member.

10. The optical scanner according to claim 6, further comprising at least one magnet, and wherein said detection means comprises a coil which is moved in a magnetic field produced by the magnet to produce an electromotive force, and the coil is provided at the movable plate.

11. The optical scanner according to claim 6, further comprising control means for controlling the electric signal supplied to the actuator on the basis of an output from the detection means, thereby driving the movable plate at a resonant frequency.

12. The optical scanner according to one of claims 1 and 2, wherein said support member, said movable plate, said elastic member and said electric element are monolithically formed as one body by a semiconductor fabrication process.

13. The optical scanner according to one of claims 1 and 2, wherein:

the actuator includes a part of a driving coil; and the optical scanner comprises an electromagnetic actuating type optical scanner.

14. The optical scanner according to claim 13, wherein the driving coil is formed in such a manner as to extend through the movable plate, the elastic member and the support member.

15. The optical scanner according to claim 13, wherein the driving coil is formed in such a manner as to extend through the movable plate only.

16. The optical scanner according to claim 13, wherein a pitch of those parts of said driving coil which function as the actuator is set at a smaller value than that of the other parts of said driving coil, and a width of those parts of said driving coil which function as the actuator is set at a smaller value than that of other parts of said driving coil.

17. The optical scanner according to one of claims 1 and 2, wherein the actuator includes at least one electrode, and the optical scanner comprises an electrostatic actuating type optical scanner.

18. The optical scanner according to claim 1, wherein:

the movable plate has an end supported by the elastic member; and the elastic member performs bending vibrations with the driving force.

19. The optical scanner according to claim 1, wherein:

the movable plate has an end supported by the elastic member; and the elastic member performs bending vibrations and torsion vibrations with the driving force.

20. An optical scanner comprising:

a support member for fixing the scanner to a given member;

a movable plate having at least one surface serving as a reflecting surface for reflecting light;

an elastic member for connecting said support member to said movable plate, said elastic member including a plurality of laminated elastic insulating layers, and an electric element comprising (i) an actuator, provided at least on the movable plate, for making a driving force act between the movable plate and the support member, and (ii) wiring for use in supplying an electric signal to the actuator, the electric element being designed to supply a predetermined signal to the actuator through the wiring so that the elastic member is elastically deformed to deflect the movable plate, to thereby produce the driving force, wherein the electric element is provided between the laminated/elastic insulating layers so that the electric element is covered by the laminated elastic insulating layers.

* * * * *